(12) United States Patent
Osada et al.

(10) Patent No.: US 7,219,360 B2
(45) Date of Patent: May 15, 2007

(54) DISC CHUCKING MECHANISM AND DISC DRIVE APPARATUS HAVING THE SAME

(75) Inventors: Yasuo Osada, Saitama (JP); Hiromu Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 10/864,294

(22) Filed: Jun. 9, 2004

(65) Prior Publication Data

US 2005/0010941 A1    Jan. 13, 2005

(30) Foreign Application Priority Data

Jun. 9, 2003    (JP)    ............... 2003-163791
Jun. 9, 2003    (JP)    ............... 2003-163792

(51) Int. Cl.
*G11B 23/00* (2006.01)

(52) U.S. Cl. ..................... 720/703; 720/715

(58) Field of Classification Search ............... 720/703, 720/715

See application file for complete search history.

(56) References Cited

U.S. PATENT DOCUMENTS

| | | | |
|---|---|---|---|
| 6,198,716 B1 | 3/2001 | Tadanori et al. | |
| 6,721,263 B1 | 4/2004 | Hidehiko et al. | |
| 2002/0150027 A1 | 10/2002 | Kazunari | |
| 2004/0111737 A1* | 6/2004 | Masaki et al. | 720/715 |

FOREIGN PATENT DOCUMENTS

| | | |
|---|---|---|
| EP | 02206055 | 8/1990 |
| EP | 0428382 A2 | 5/1991 |
| EP | 0700040 A2 | 3/1996 |
| EP | 0869492 A2 | 10/1998 |
| JP | 59-10191 | 1/1984 |
| JP | 61236059 | 4/1985 |
| JP | 63209057 | 2/1987 |
| JP | 63-113859 | 5/1988 |
| JP | 3-28546 | 3/1991 |
| JP | 06068567 | 8/1992 |
| JP | 09198757 | 7/1997 |

\* cited by examiner

*Primary Examiner*—Allen Cao
(74) *Attorney, Agent, or Firm*—Wolf, Greenfield & Sacks, P.C.

(57) ABSTRACT

A disc chucking mechanism is provided. The disc chucking mechanism includes: a central shaft that served as a motor shaft of a spindle motor; a table section, which is fixed to the central shaft and on which the inner circumferential section of a disc-shaped recording medium is placed; a chucking pulley for sandwiching the internal circumference portion of the disc-shaped recording medium together with the table section; a centering protrusion, which is movably supported by the central shaft in the shaft direction and inserted into a central hole of the disc-shaped recording medium, for centering the disc-shaped recording medium; a forcing means for forcing the centering protrusion to a direction away from the table section in the shaft direction of the central shaft; and a separation-stop shaft having a separation-stop section, which is positioned such that the separation-stop section is substantially parallel to the central shaft.

16 Claims, 37 Drawing Sheets

FIG.32

| ADDRESS | SIGNAL | CONTENT |
|---|---|---|
| CLOSE OVER | 1000 | POSITION PASSED FROM CLOSE POSITION |
| CLOSE | 1100 | CLOSE POSITION |
| CLOSE PWM | 0100 | DECELERATION START POSITION BEFORE STOP AT CLOSE POSITION |
| DC | 0110 | POSITION THAT CAN BE MOVED AT NORMAL SPEED |
| OPEN PWM | 0010 | DECELERATION START POSITION BEFORE STOP AT OPEN POSITION |
| OPEN | 0011 | OPEN POSITION |
| OPEN OVER | 0001 | POSITION PASSED FROM OPEN POSITION |
| OPEN NG | 1011 | POSITION WHERE FIRST SENSOR IS TURNED ON AT OPEN POSITION |
| OPEN PWM NG | 1010 | POSITION WHERE FIRST SENSOR IS TURNED ON AT [OPEN PWM] POSITION |
| DC NG | 1110 | POSITION WHERE FIRST SENSOR TURNED ON AT [DC] POSITION |
| EMPTY | 0000 | STATE IN WHICH COVER IS REMOVED OR COVER IS ATTACHED LEFT-SIDE RIGHT |

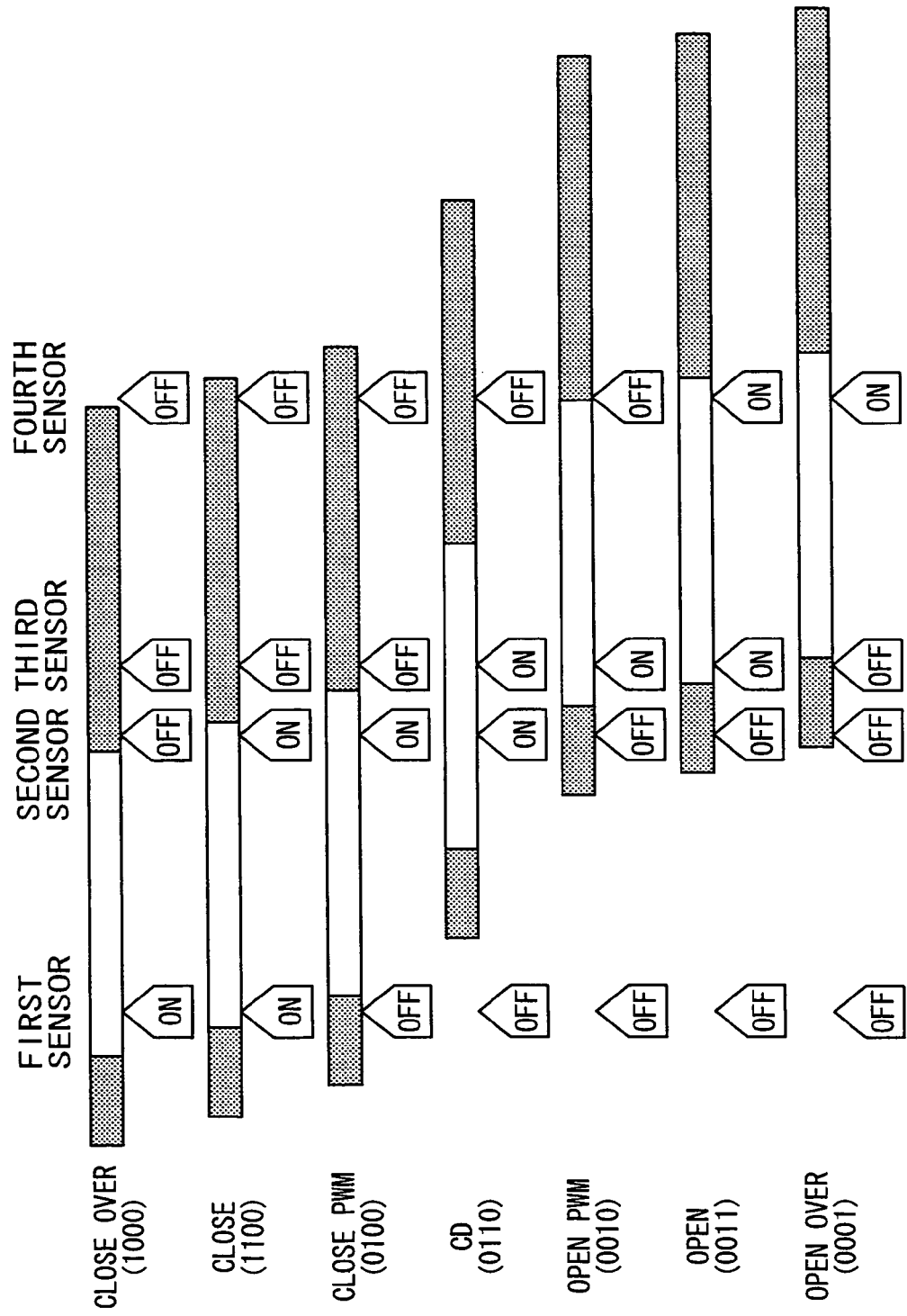

DISC CHUCKING MECHANISM AND DISC DRIVE APPARATUS HAVING THE SAME

CROSS REFERENCES TO RELATED APPLICATIONS

The present invention claims priority to its priority documents 2003-163791 filed in the Japanese Patent Office on Jun. 9, 2003 and 2003-163792 filed in the Japanese Patent Office on Jun. 9, 2003, the entire contents of which being incorporated by reference herein.

BACKGROUND OF THE INVENTION

1. Field of the Invention

The present invention relates to a disc chucking mechanism and a disc drive apparatus having the same. Specifically, the present invention relates to a technical field in which a separation-stop shaft different from a central shaft that served as a motor shaft of a spindle motor is provided so as to secure a stable rotation operation of a disc chucking mechanism and make a disc drive apparatus thinner.

2. Description of the Related Art

A disc chucking mechanism for centering a disc-shaped recording medium and carrying out a chucking is provided in a disc drive apparatus that can record and reproduce an information signal to and from the disc-shaped recording medium, such as a optical disc, a magneto-optical disc and the like.

In the disc chucking mechanism, there is a type, in which a disc table and a chucking pulley are used to chuck the disc-shaped recording medium, and a centering protrusion of the disc table is pushed by a spring (for example, see Japanese Patent Application Publications 09-265705, 07-121239, 06-229158).

A disc chucking mechanism a has a disc table b and a chucking pulley c.

The disc table b is provided with a table section d, a centering protrusion e and a forcing spring f, and the center of the table section d is fixed to a central shaft g that served as the motor shaft of the spindle motor. An arrangement recessed portion h that is open upward is formed on the table section d.

The centering protrusion e is set in such a way that it is movably supported by the central shaft g in its shaft direction, and a part thereof is inserted into the arrangement recessed portion h of the table section d. On the outer circumference surface of the centering protrusion e, a guiding inclination surface i and a centering inclination surface j are formed from the upper side. In the guiding inclination surface i, the inclination angle with respect to the shaft direction of the central shaft g is set to be larger, for the centering inclination surface j.

The forcing spring f is the compressing coil spring and arranged between the table section d and the centering protrusion e in the arrangement recessed portion h. Thus, the centering protrusion e is pushed upward against the table section d by the forcing spring f.

A separation-stop ring k is attached in externally engaged manner at the position near the top end of the central shaft g. The contact of the separation-stop ring k with the upper surface of the centering protrusion e leads to the regulation of the upward movement of the centering protrusion e pushed by the forcing spring f. The top end of the central shaft g is upwardly protruded from the centering protrusion e and placed as a positioning section 1 that is approximately conically formed.

The chucking pulley c is placed as a pressing section m in which the portion on the outer circumferential side presses a disc-shaped recording medium x, and a downwardly opened and recessed portion n is formed on the inner side of the pressing section m. A positioning cylinder section o that is downwardly protruded and approximately cylindrical is placed on the recessed portion n, and the inner circumferential edge at the low end of the positioning cylinder section o is formed as a guided edge p. The guided edge p is inclined so as to be displaced to a direction closer to the outer surface of the positioning cylinder section o, as it goes down.

In the above-mentioned disc chucking mechanism a, when the centering protrusion e is inserted into a central hole y of the disc-shaped recording medium x, the chucking pulley c is lowered, and the inner circumferential section of the disc-shaped recording medium x is put between the table section d of the disc table b and the chucking pulley c, and the disc-shaped recording medium x is then chucked.

At this time, since the guided edge p of the positioning cylinder section o of the chucking pulley c is guided to the positioning section 1 of the central shaft g and the central shaft g is inserted into the positioning cylinder section o, the positioning between the disc table b and the chucking pulley c is done. At the same time, the inner circumferential edge of the disc-shaped recording medium x is brought into contact with the centering inclination surface j of the centering protrusion e. In association with the lowering of the chucking pulley c, the disc-shaped recording medium x and the centering protrusion e are moved together downward against the forcing force of the forcing spring f. Consequently, the positioning is performed on the central shaft g of the disc-shaped recording medium x.

When the disc-shaped recording medium x is chucked by the disc chucking mechanism a, the chucking pulley c is pressed and fitted to the disc-shaped recording medium x placed on the table section d. In conjunction with the rotation of the spindle motor, the disc table b, the chucking pulley c and the disc-shaped recording medium x are integrally rotated.

Furthermore, some of disc chucking mechanisms in the related art is configured to perform chucking operation of a disc-shaped recording medium with using guide holes extending in a shaft direction of the disc table (up-down direction), cam holes having an inclination section inclined with respect to the guide holes, and guide shafts being slidably engaged with the guide hole and the cam hole (see Japanese Patent Application Publication 06-180913, which will be referred to as Patent Document 1).

In such disc chucking mechanisms, a plurality of the guide hole (guide hole 103 in Patent Document 1), a plurality of the cam hole (guide hole 11 in Patent Document 1) and a plurality of the guide shaft (guide shaft 206 in Patent Document 1) are provided in such a way that they are separated from each other in front-back direction.

The disc-shaped recording medium placed on a disc tray is moved in the horizontal direction and inserted between a chucking pulley (clamp 209 in Patent Document 1) and the disc table (turn table 406 in Patent Document 1). Upon the insertion of the disc-shaped medium, a member having the cam holes (side plate 10 in Patent Document 1) is moved in the front-back direction so that the inclination section of the cam hole causes a change of position in the guide hole of the guide shaft. As a result, the chucking pulley is moved downward and the chucking operation of the disc-shaped recording medium with the chucking pulley and the disc table is completed.

The cam hole has an upper-side horizontal section being located on the upper side and extending in the front-back direction, a bottom-side horizontal section being located on the bottom side and extending in the front-back direction and the inclination section formed in between the upper-side horizontal section and the bottom-side horizontal section. Accordingly, the chucking pulley positions at the top when the guide shaft is engaged with the upper-side horizontal section. The chucking pulley moves downward when the guide shaft moves the inclination section from the upper-side horizontal section to the bottom-side horizontal section. The chucking pulley positions at the bottom when the guide shaft is engaged with the bottom-side horizontal section.

SUMMARY OF THE INVENTION

In a disc chucking mechanism, in order to prevent occurrences of recording errors and reproducing errors of the information signal to and from a disc-shaped recording medium, it is necessary to secure a stable rotation operation by reducing an amount of surface swing of a disc-shaped recording medium, eccentricity or the like as much as possible at the time of rotation.

Typically, the occurrence rate of such surface swing and eccentricity becomes greater, as a contact length (the length of a bearing section) of the table section and centering protrusion with the central shaft becomes shorter. Thus, in order to secure the stable rotation operation, it is desirable that the contact length with the central shaft of the table section and centering protrusion is made as long as possible.

By lengthening the contact length with the central shaft of the table section and centering protrusion, it is possible to secure the stable rotation operation. However, correspondingly thereto, the central shaft becomes longer, and the thickness of the disc chucking mechanism becomes thicker, thereby preventing the disc drive apparatus to be made thinner.

More specifically, such as the above-mentioned disc chucking mechanism a, in which portions A, B, C and D performing at least four different functions of the portion A in contact with the table section d, the clearance portion B between the table section d and the centering protrusion e, the portion C in contact with the centering protrusion e, and the portion D to attach the separation-stop ring k are required on the central shaft g, the thickness of the disc chucking mechanism a becomes thicker, thereby preventing the disc drive apparatus to be made thinner.

On the other hand, in order to make the disc drive apparatus thinner, if the portion A in contact with the table section d and the portion C in contact with the centering protrusion e are made shorter, as mentioned above, there may be a fear that the stable rotation operation may not be secured.

In view of the above background, it is desirable to provide a disc chucking mechanism and/or a disc drive apparatus having a disc chucking mechanism that can secure a stable rotation operation in the disc chucking mechanism and make a disc table of the disc drive apparatus thinner.

According to an embodiment of the present invention, there is provided a disc chucking mechanism and a disc drive apparatus having a disc chucking mechanism, which include a disc table. The disc table includes: a central shaft that served as a motor shaft of a spindle motor; a table section, which is fixed to the central shaft and on which an inner circumferential section of a disc-shaped recording medium is placed, for sandwiching a disc-shaped recording medium together with a chucking pulley; a centering protrusion, which is movably supported by the central shaft in its shaft direction and inserted into a central hole of the disc-shaped recording medium, for centering the disc-shaped recording medium; a forcing means for forcing the centering protrusion to a direction away from the table section in the shaft direction of the central shaft; and a separation-stop shaft having a separation-stop section, which is positioned in such a way that the separation-stop section is approximately parallel to the central shaft, for preventing the centering protrusion from being separated from the central shaft.

Accordingly, in the disc chucking mechanism and the disc drive apparatus according to the present embodiment, the separation-stop shaft can prevent the centering protrusion from being separated from the central shaft.

According to an embodiment of the present invention, there is provided a disc chucking mechanism that chucks a disc-shaped recording medium by sandwiching an internal circumference portion of the disc-shaped recording medium with a disc table and a chucking pulley. The disc table includes: a central shaft that served as a motor shaft of a spindle motor; a table section, which is fixed to the central shaft and on which the inner circumferential section of a disc-shaped recording medium is placed, for sandwiching the disc-shaped recording medium together with the chucking pulley; a centering protrusion, which is movably supported by the central shaft in its shaft direction and inserted into a central hole of the disc-shaped recording medium, for centering the disc-shaped recording medium; a forcing means for forcing the centering protrusion to a direction away from the table section in the shaft direction of the central shaft; and a separation-stop shaft having a separation-stop section, which is positioned in such a way that the separation-stop section is approximately parallel to the central shaft, for preventing the centering protrusion from being separated from the central shaft.

According to the present embodiment, the portion to place the separation-stop section on the central shaft is not required, and the sufficient contact length of the table section and centering protrusion to the central shaft can be maintained. Furthermore, the stable rotation operation can be secured at the time of rotation of the disc-shaped recording medium, and the disc chucking mechanism can be made thinner.

According to an embodiment of the present invention, a positioning protrusion which is protruded to the disc table side is formed on the chucking pulley, and a position recessed portion into which the above-mentioned positioning protrusion is inserted is formed on the centering protrusion of the disc table. Accordingly, the central shaft to position the chucking pulley and the disc table need not be protruded from the disc table to the chucking pulley side. Correspondingly thereto, the disc chucking mechanism can be made thinner.

According to an embodiment of the present invention, a plurality of the separation-stop shafts are provided, and the plurality of separation-stop shafts are arranged at the equal interval in the direction around the shaft of the central shaft. Accordingly, preferable balance may be secured at the time of a rotation operation.

According to an embodiment of the present invention, the distances from the central shaft to the above-mentioned plurality of the separation-stop shafts are made equal. Accordingly, the further preferable balance may be secured at the time of the rotation operation.

According to an embodiment of the present invention, there is provided a disc drive apparatus including a disc chucking mechanism that chucks a disc-shaped recording medium by sandwiching an internal circumference portion of the disc-shaped recording medium with a disc table and a chucking pulley. The disc table includes: a central shaft that served as a motor shaft of a spindle motor; a table section, which is fixed to the central shaft and on which the inner circumferential section of a disc-shaped recording medium is placed, for sandwiching the disc-shaped recording medium together with the chucking pulley; a centering protrusion, which is movably supported by the central shaft in its shaft direction and inserted into a central hole of the disc-shaped recording medium, for centering the disc-shaped recording medium; a forcing means for forcing the centering protrusion to a direction away from the table section in the shaft direction of the central shaft; and a separation-stop shaft having a separation-stop section, which is positioned in such a way that the separation-stop section is approximately parallel to the central shaft, for preventing the centering protrusion from being separated from the central shaft.

Accordingly, the portion to place the separation-stop section on the central shaft is not required, and the sufficient contact length of the table section and centering protrusion to the central shaft can be maintained. Furthermore, the stable rotation operation can be secured at the time of rotation of the disc-shaped recording medium, and the disc drive apparatus can be made thinner.

According to an embodiment of the present invention, a positioning protrusion which is protruded to the disc table side is formed on the chucking pulley, and the position recessed portion into which the above-mentioned positioning protrusion is inserted is formed on the centering protrusion of the disc table. Accordingly, the central shaft to position the chucking pulley and the disc table need not be protruded from the disc table to the chucking pulley side. Correspondingly thereto, the disc drive apparatus can be made thinner.

According to an embodiment of the present invention, a plurality of the separation-stop shafts as mentioned above are placed, and the plurality of separation-stop shafts are arranged at the equal interval in the direction around the shaft of the central shaft. Accordingly, preferable balance may be secured at the time of the rotation operation.

According to an embodiment of the present invention, the distances from the central shaft to the above-mentioned plurality of the separation-stop shafts are made equal. Accordingly, further preferable balance may be secured at the time of the rotation operation.

According to an embodiment of the present invention, there is provided a disc chucking mechanism including: a central shaft that served as a motor shaft of a spindle motor; a table section, which is fixed to the central shaft and on which the inner circumferential section of a disc-shaped recording medium is placed; a chucking pulley for sandwiching the internal circumference portion of the disc-shaped recording medium together with the table section; a centering protrusion, which is movably supported by the central shaft in the shaft direction-and inserted into a central hole of the disc-shaped recording medium, for centering the disc-shaped recording medium; a forcing means for forcing the centering protrusion to a direction away from the table section in the shaft direction of the central shaft; and a separation-stop shaft having a separation-stop section, which is positioned in such a way that the separation-stop section is parallel or substantially parallel to the central shaft, for preventing the centering protrusion from being separated from the central shaft.

According to an embodiment of the present invention, there is provided a disc drive apparatus including: a spindle motor; a central shaft that served as a motor shaft of the spindle motor; a table section, which is fixed to the central shaft and on which the inner circumferential section of a disc-shaped recording medium is placed; a chucking pulley for sandwiching the internal circumference portion of the disc-shaped recording medium together with the table section; a centering protrusion, which is movably supported by the central shaft in the shaft direction and inserted into a central hole of the disc-shaped recording medium, for centering the disc-shaped recording medium; a forcing means for forcing the centering protrusion to a direction away from the table section in the shaft direction of the central shaft; a separation-stop shaft having a separation-stop section, which is positioned in such a way that the separation-stop section is parallel or substantially parallel to the central shaft, for preventing the centering protrusion from being separated from the central shaft; and a reproduction means for reproducing data from the disc-shaped recording medium placed on the table section.

In the related art as described in the above-mentioned Patent Document 1, the upper horizontal section of the cam hole has functions to cause positioning of a member (bracket tray 203 in Patent Document 1), in which the guide shaft is provided, to the top and to hold the chucking pulley at an end of the movement range in the top-side.

In some cases, a member (bracket tray 203 in Patent Document 1) including the chucking pulley may distort due to the pulley's own weight or elapse of the time. If there is such a distortion, the disc-shaped recording medium, which is moved horizontally and to be inserted between the chucking pulley and the disc table, may come into contact with the chucking pulley.

On the other hand, the inclination section of the cam hole has a function to move the chucking pulley downward. However, if the downward speed of the chucking pulley is large, it may make loud sound when the chucking pulley comes into contact with the disc-shaped recording medium. If force applied on the disc-shaped recording medium by the chucking pulley when they come into contact with is large, the disc-shaped recording medium may break, be damaged, distorted or the like.

In view of the above, it is desirable to provide a chucking mechanism and/or a disc drive apparatus including a chucking mechanism, which can prevent occurrence of technical difficulties such as described above in conjunction with an operation of the disc chucking mechanism.

According to an embodiment of the present invention, there is provided a disc chucking mechanism and/or a disc drive apparatus including a disc chucking mechanism for chucking a disc-shaped recording medium by sandwiching an internal circumference section of the disc-shaped recording medium with a chucking pulley and a disc table rotating in conjunction with a rotation of a spindle motor. The disc-chucking mechanism includes: a guiding member formed with at least two guide holes, the guide holes extending in a shaft direction of the disc table and being separated in a radial direction of the disc table; a cam slider adapted to be slidable in the radial direction of the disc table and formed with cam holes, the number of which being the same as that of the guide holes, the cam holes being separated from each other in the radial direction of the disc table; and a support arm including a supported shaft, rotatably supporting the chucking pulley and being adapted to be movable in a direction separating the chucking pulley to the disc table, the supported shaft being slidably engaged with the cam hole of the cam slider and the guide hole of the guide member. Further, in the disc chucking mechanism of the present embodiment, the cam hole of the cam slider is formed with a horizontal section extending the radial direction of the disc table and a inclination section for moving the support arm in the direction separating the chucking pulley to the disc table by guiding the supported shaft if the cam slider is moved in the radial direction of the disc table, the inclination section being continued from an edge section of the horizontal section, the edge section being at a side opposite to a side of the disc table; and at least the horizontal section of the cam hole that is formed at a most distant position from the disc table is formed at a side closer to the spindle motor in the shaft direction of the disc table in comparison with the horizontal section of another cam hole that is formed at a nearest position to the disc table.

According to an embodiment of the present invention, there is provided a disc chucking mechanism and/or a disc drive apparatus including a disc chucking mechanism for chucking a disc-shaped recording medium by sandwiching an internal circumference section of the disc-shaped recording medium with a chucking pulley and a disc table rotating in conjunction with a rotation of a spindle motor. The disc chucking mechanism includes: a guiding member formed with at least two guide holes, the guide holes extending in a shaft direction of the disc table and being separated in a radial direction of the disc table; a cam slider adapted to be slidable in the radial direction of the disc table and formed with cam holes, the number of which being the same as that of the guide holes, the cam holes being separated from each other in the radial direction of the disc table; and a support arm including a supported shaft, rotatably supporting the chucking pulley and being adapted to be movable in a direction separating the chucking pulley to the disc table, the supported shaft being slidably engaged with the cam hole of the cam slider and the guide hole of the guide member. Furthermore, in the disc chucking mechanism, the cam hole of the cam slider is formed with an inclination section for moving the support arm in the direction separating the chucking pulley to the disc table by guiding the supported shaft if the cam slider is moved in the radial direction of the disc table and an acting section that is continued from an edge section of the inclination section, the edge section being at a side opposite to a side of the disc table; at least the acting section of the cam hole at a most distant position from the disc table is formed so as to be extending in the radial direction of the disc table; and at least the acting section of the cam hole at a nearest position to the disc table is formed so as to incline to a same side of the inclination section, and the acting section of another cam hole at a most distant position from the disc table is formed with an inclination angle that is less than that of the inclination section.

BRIEF DESCRIPTION OF THE DRAWINGS

These and other objects, features and advantages of the present invention will become more apparent in light of the following detailed description of a best mode embodiment thereof, as illustrated in the accompanying drawings:

FIG. 32 is a graph showing an address to detect a position of a cover, and shows, together with FIG. 33 and FIG. 34, an operation of a cover;

FIG. 33 is a view showing a detection state of each sensor at each address;

DETAILED DESCRIPTION OF THE EMBODIMENTS

Embodiments of the present invention will be described below in accordance with the attached drawings.

A recording medium drive apparatus (disc drive apparatus) 1 is, for example, an apparatus for recording and/or reproducing an information signal to/from a recording medium such as a disc-shaped recording medium. The recording medium drive apparatus is provided with a cover 2, a base body 3, and appropriate respective members and respective mechanisms arranged in the base body 3 (refer to FIG. 1 and FIG. 2).

The cover 2 is made of transparent material, such as glass, resin and the like, and formed approximately as a semi cylindrical shape that is downwardly opened and longer in one direction. The cover 2 is configured such that a cover section 2a having a shape of an approximately circular arc as a laterally sectional shape and side sections 2b, 2b located at both ends in the long-side direction of the cover section 2a are integrally formed.

In the following explanation, the long-side direction of the cover 2 is assumed to be a front-back direction, and the directions orthogonal thereto are assumed to be an up-down direction and a left-right direction.

Figure 3:
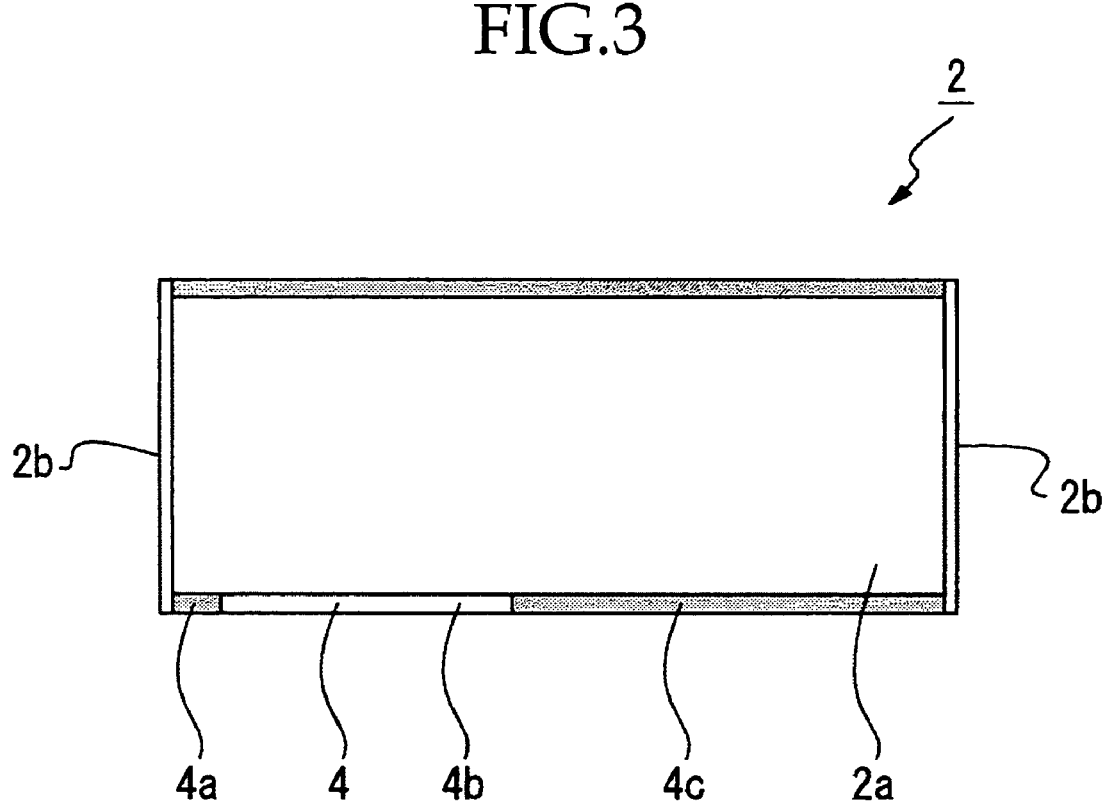
FIG. 3 is a schematic bottom plan view of a cover.

One lower surface extending in the long-side direction of the cover 2 is formed as a detected section 4 (refer to FIG. 3). The detected section 4 includes a first non-reflecting section 4a, a reflecting section 4b and a second non-reflecting section 4c from the front side. The first non-reflecting section 4a is formed on the front end of the detected section 4, the reflecting section 4b follows the first non-reflecting section 4a and is formed up to the approximate center in the long-side direction of the detected section 4, and the second non-reflecting section 4c is formed up to the back end of the cover 2 on the opposite side to the first non-reflecting section 4a with having the reflecting section 4b in between. The reflecting section 4b is formed, for example, by coating aluminum deposition and the like on the lower surface of the cover 2. The non-reflecting sections 4a, 4c are formed, for example, by coating optically absorbing film on the lower surface of the cover 2. The non-reflecting sections 4a, 4c may be formed, for example, by coating optically transparent film on the lower surface of the cover 2.

Figure 1:
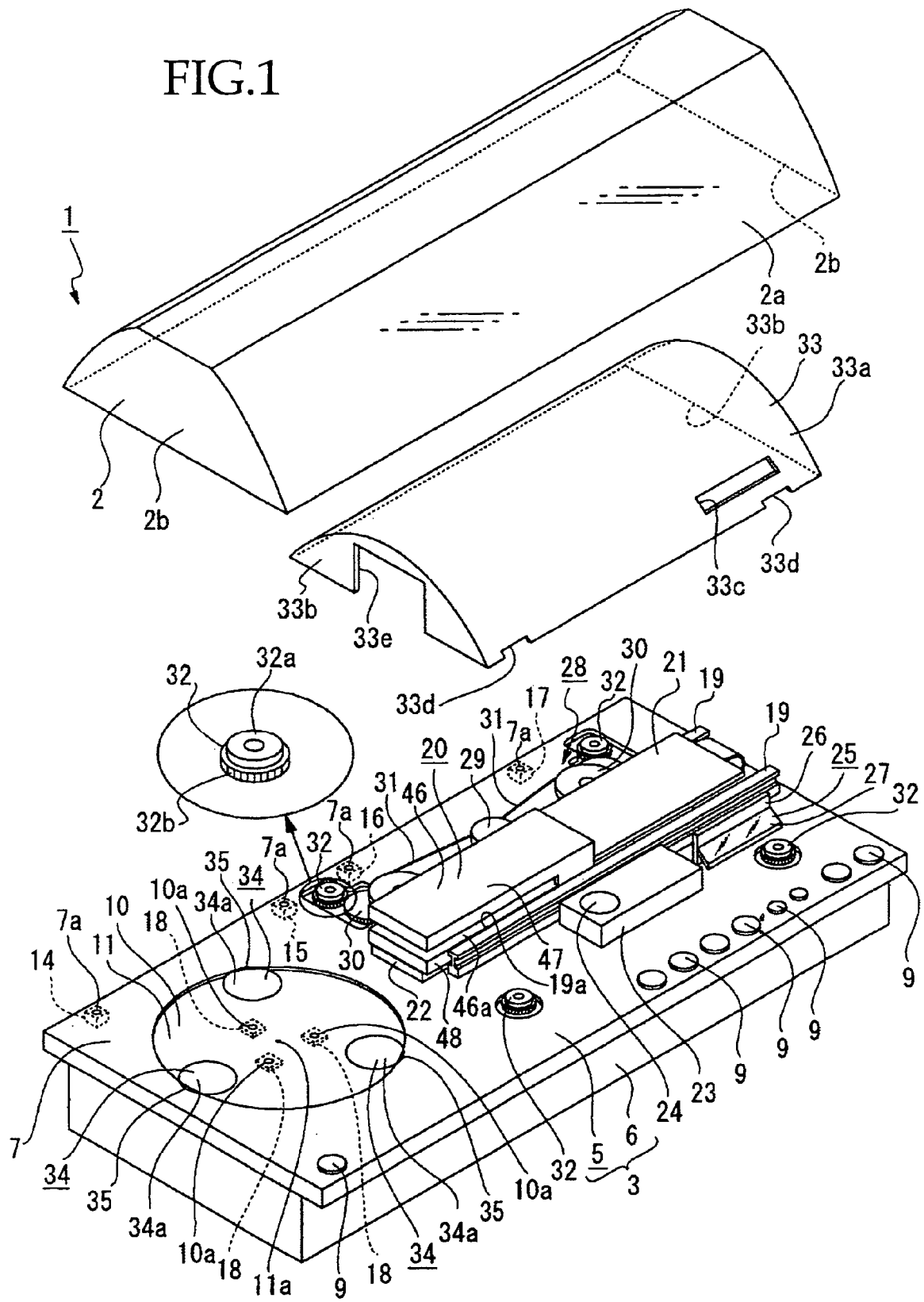
FIG. 1 is a perspective view of a recording medium driving apparatus (a disc drive apparatus) showing a cover and an inner cover in separated state, and shows, together with FIG. 2 to FIG. 36, an embodiment of the present invention.
Figure 2:
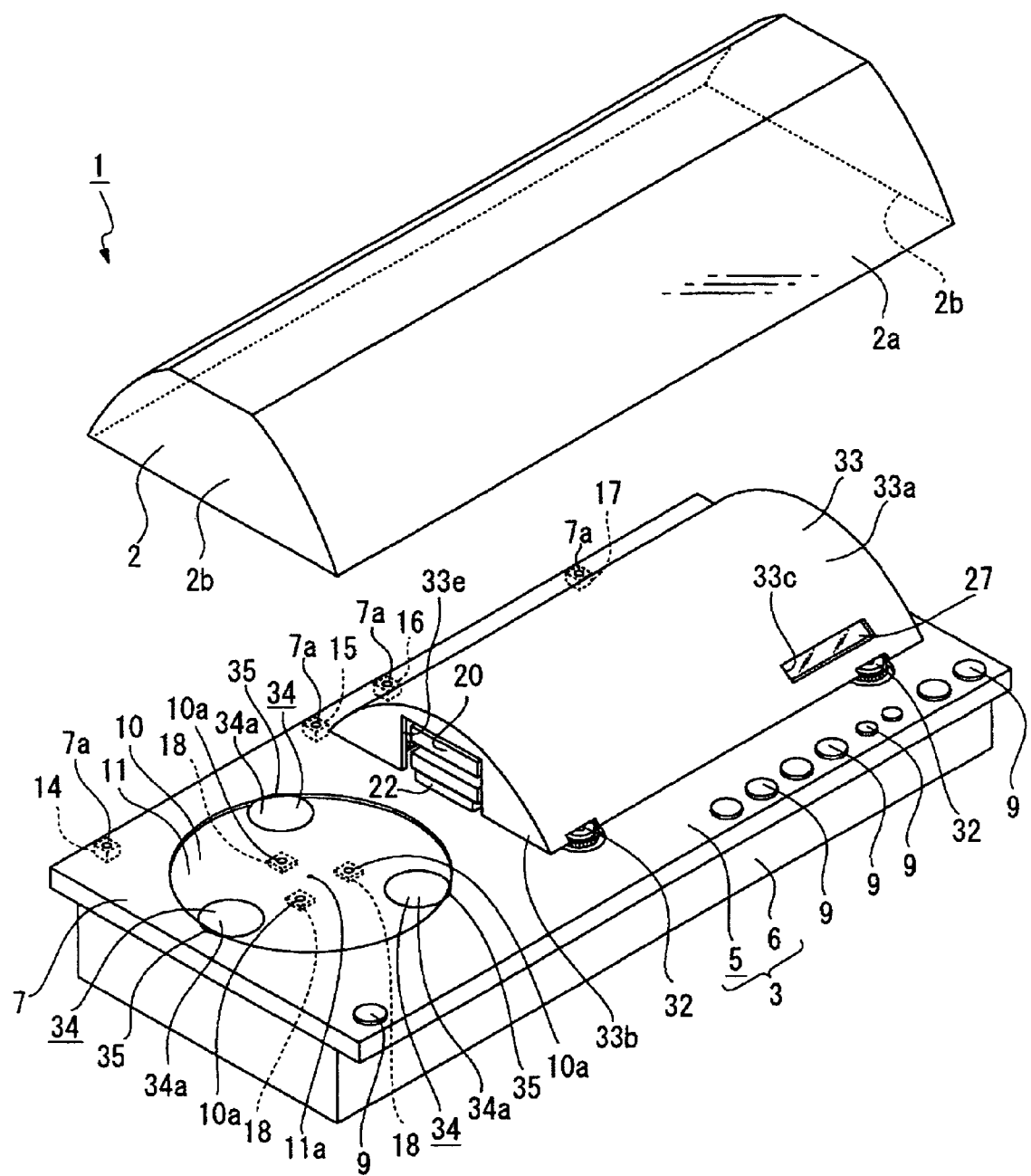
FIG. 2 is a perspective view of a recording medium driving apparatus showing a cover in separated state.

The base body 3 is formed, as shown in FIG. 1 and FIG. 2, such that a base panel 5 and a bottom panel 6 located on the lower side of the base panel 5 are combined, and the bottom panel 6 is formed as the shape of a box that is upwardly opened and longer in the front-back direction.

Figure 4:
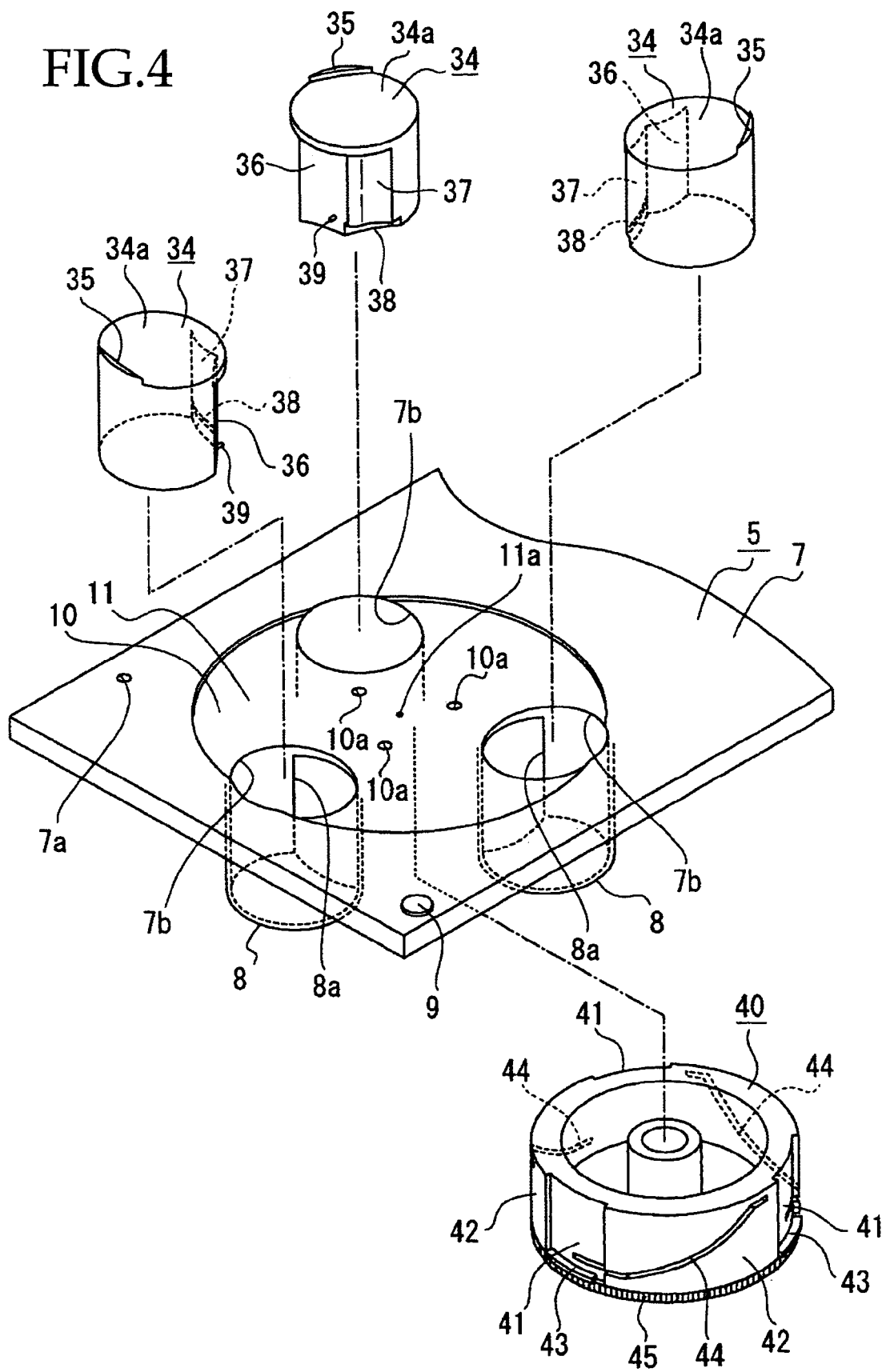
FIG. 4 is an exploded perspective view showing a recording medium placing section, a rotating body and a cam member.

The base panel 5 is formed, as shown in FIG. 4, such that a base section 7 formed as the shape of an approximately flat plate and support cylinder sections 8, 8, 8 protruded downwardly from the base section 7 are integrally formed.

Four transparent holes 7a, 7a, . . . which are separated in the long-side direction are formed on the left edge of the base section 7 (refer to FIG. 1 and FIG. 2).

A plurality of operation buttons 9, 9, . . . which are separated in the long-side direction are arranged on the right edge of the base section 7. As the operation buttons 9, 9, . . . , for example, there are placed a power source button to turn on and off a power source, an open button and a close button to carry out an opening closing operation of the cover 2, a play button to reproduce the information signal recorded in a disc-shaped recording medium 100, a transiently stopping button to transiently stop a reproduction state, a stopping button to stop a reproducing operation, a volume button to change a sound amount, and the like.

A recording medium placing section 10 is placed on the front end side in the long-side direction of the base section 7 (refer to FIG. 1, FIG. 2 and FIG. 4).

The recording medium placing section 10 is formed as the shape that is circular and shallowly recessed portion when it is viewed on the flat surface, and the bottom surface is formed as a disc placing surface 11. The disc placing surface 11 is formed as a slightly recessed and curved surface, for example, as a sphere, and its central point is formed as a standard point 11a located at the lowest portion. Sensor holes 10a, 10a, 10a, which are bored upward and downward, are formed in the recording medium placing section 10.

The support cylinder sections 8, 8, 8 of the base panel 5 are downwardly protruded from the portion on the outer circumferential side of the disc placing surface 11 and upwardly opened (refer to FIG. 4). Thus, three openings 7b, 7b, 7b are formed on the base section 7, and the openings 7b, 7b, 7b are formed while crossing over the disc placing surface 11 and the portion just outside it. The support cylinder sections 8, 8, 8 are placed while separated at an equal interval in the circumferential direction, and the distances in the radiation direction between the respective central shafts and the standard point 11a are equal.

The support cylinder section 8 includes: a circular arc surface section 12 that is longer in the up-down direction; and a closing surface section 13 that closes the lower opening of the circular arc surface section 12. The portion on the side of the standard point 11a of the closing surface section 13 and the circular arc surface section 12 is notched, and this notch is formed as an arranging notch 8a.

Inside the base body 3, a first sensor 14, a second sensor 15, a third sensor 16 and a fourth sensor 17 are arranged on the lower side of the transparent holes 7a, 7a . . . , respectively. The first sensor 14, the second sensor 15, the third sensor 16 and the fourth sensor 17 are, for example, reflection type light sensors, and they function as a detecting means for detecting the position of the detected section 4 of the cover 2, and they are turned on when a detection light emitted from a light emitting section is received by a light receiving section.

Inside the base body 3, detecting sensors 18, 18, 18 are arranged at the positions just under sensor holes 10a, 10a, 10a formed in the recording medium placing section 10, respectively. The detection sensors 18, 18, 18 have the functions of detecting the presence or absence of the disc-shaped recording medium 100. When the disc-shaped recording medium 100 is located above the disc placing surface 11, since the detection lights, which are outputted from the detection sensors 18, 18, 18 and transmitted through the sensor holes 10a, 10a, 10a, are reflected by the disc-shaped recording medium 100, the existence of the disc-shaped recording medium 100 is detected.

Parallel two guide members 19, 19 are placed on the upper surface of the base section 7 of the base body 3 (refer to FIG. 1). The guide members 19, 19 are placed on the back end side of the base section 7 and formed as being longer in the long-side direction of the base section 7. Guide grooves (not shown in the figure), which are extending forward and backward, respectively, are formed on the surfaces opposite to each other of the guide members 19, 19.

In the space between the guide members 19, 19, the approximate half of the side of the recording medium placing section 10 is formed as a unit storage section 19a. The unit storage section 19a can store a base unit 20. Between the guide members 19, 19, a control board 21 to carry out the operation control of the base unit 20 is arranged on the opposite side to the recording medium placing section 10 with having the unit storage section 19a in between.

The base unit 20 and the control board 21 are arranged on an arranging base 22 located below them. The arranging base 22 is formed as being longer in the front-back direction, and guided pins (not shown) which are protruded to the side directions, respectively, are placed on both of the left and right sides. In the arranging base 22, the guided pins are slidably fitted to the guide grooves of the guide members 19, 19, and can be guided by the guide members 19, 19 and moved to the front-back direction. A rack section (not shown) is formed on the right side of the arranging base 22.

On the base panel 5, a unit driving section 23 is arranged on the right portion of the guide member 19 located on the right side. The unit driving section 23 has a driving motor 24 and a deceleration gear group (not shown) that is rotated by the transmission of the driving force of the driving motor 24. The gear of the final stage of the deceleration gear group is engaged with the rack section of the arranging base 22. Thus, when the driving motor 24 is rotated, its driving force is transmitted through the deceleration gear group to the rack section of the arranging base 22. In the direction based on the rotation direction of the driving motor 24, the arranging base 22, the base unit 20 and the control board 21 are integrally moved to the front-back direction.

On the base panel 5, a display driving section 25 is arranged on the rear of the unit driving section 23. The display driving section 25 has a controlling circuit board 26 and a displaying section 27 on which the operation states of the respective sections and the like are displayed.

On the base panel 5, a cover driving section 28 is arranged on the left portion of the guide member 19 located on the left side. The cover driving section 28 has a moving motor 29 and deceleration gear groups 30, 30 that are rotated by the transmission of the driving force of the moving motor 29. The deceleration gear groups 30, 30 are placed back and forth with having the moving motor 29 in between.

Pulleys (not shown in the figure) are set in the moving motor 29 and the deceleration gear groups 30, 30, respectively. The pulley of the moving motor 29 and the pulleys of the deceleration gear groups 30, 30 are linked through belts 31, 31, respectively. Thus, when the moving motor 29 is rotated, its driving force is transmitted through the belts 31, 31 to the deceleration gear groups 30, 30. The deceleration gear groups 30, 30 are rotated in synchronization to the same direction corresponding to the rotation direction of the moving motor 29.

On the base panel 5, gear bodies 32, 32, . . . are rotatably supported. Each two gear bodies 32, 32 are placed on left and right both ends of the base panel 5, and have roller sections 32a, 32a, . . . located on the upper side and gear sections 32b, 32b, . . . located on the lower side. The roller sections 32a, 32a, . . . are made of material having a high friction coefficient, for example, rubber material and the like.

In the gear bodies 32, 32 located on the left side, the gear sections 32b, 32b are engaged with the gears of the final stage of the deceleration gear groups 30, 30, respectively.

In the gear bodies 32, 32, . . . , in a state in which the cover 2 is attached to the base panel 5, the roller sections 32a, 32a, . . . are pressed and fitted to the inner surface of the bottom end on both the sides of the cover section 2a of the cover 2. Thus, when the driving force of the moving motor 29 is transmitted through the deceleration gear groups 30, 30 to the gear bodies 32, 32 located on the left side, the cover 2 is moved to the direction based on the rotation direction of the moving motor 29.

An inner cover 33 is arranged inside the cover 2. The inner cover 33 is made of opaque material such as resin and the like and formed as being approximately cylindrical in shape, which is downwardly opened and longer in the front-back direction. The inner cover 33 is made such that a closing section 33a having a shape of a circular arc as a laterally sectional shape and side wall sections 33b, 33b located at both ends in the long-side direction of the closing section 33a are integrally formed. A transmission hole 33c is formed on the back end of the closing section 33a. Each two arranging notches 33d, 33d, . . . are formed on the left and right sides, respectively, on the bottom end of the closing section 33a while separated in front-back direction. A downwardly opened notch is formed on the side wall 33b on the front side, and the notch is formed as a detachment port 33e.

The inner cover 33 is attached to the base panel 5 so as to close the guide members 19, 19, the base unit 20, the control board 21, the arranging base 22, the unit driving section 23, the display driving section 25 and the cover driving section 28. In a state in which the inner cover 33 is attached to the base panel 5, the displaying section 27 of the display driving section 25 is located correspondingly to the transmission hole 33c so that the displaying of the displaying section 27 can be viewed from the exterior. In a state in which the inner cover 33 is attached to the base panel 5, the arranging notches 33d, 33d, . . . are located correspondingly to the gear bodies 32, 32, . . . , respectively, and a part of the gear bodies 32, 32, . . . is protruded from the inner cover 33 to the exterior. The base unit 20 can be passed through the detachment port 33e of the inner cover 33 and moved forward.

Rotating bodies 34, 34, 34 are rotatably supported by the support cylinder sections 8, 8, 8 of the base panel 5 (refer to FIG. 4). The rotating bodies 34, 34, 34 have the function of centering the disc-shaped recording medium 100 and also have the function of lifting up the disc-shaped recording medium 100.

The rotation body 34 is formed as the shape of an approximately circular cylinder, and a top surface 34a is formed as the slightly curved surface corresponding to the disc placing surface 11 of the base panel 5. A disc centering section 35, which is upwardly protruded, is formed on one end of the top surface 34a of the rotation body 34. The disc centering section 35 is formed correspondingly to the spreading portion just outside the disc placing surface 11 in the opening 7b of the base section 7.

On the circumferential surface of the rotation body 34, the portion except the top end is notched. Around the rotation body 34, due to this notch, a first Geneva surface 36 and a pushed surface 37 are continuously formed on the circumferential direction. The first Geneva surface 36 is formed on the circular arc surface that is recessed-shaped. The pushed surface 37 is formed on the curved surface that is formed as a predetermined shape. The bottom end of the pushed surface 37 is further notched inward. Due to this notch, a second Geneva surface 38 is formed.

A sliding pin 39 protruded from the bottom end of the first Geneva surface 36 is placed on the rotation body 34.

The rotation bodies 34, 34, 34 are inserted from the upper side into the support cylinder sections 8, 8, 8, respectively, and rotatably supported (refer to FIG. 1 and FIG. 2).

Figure 5:
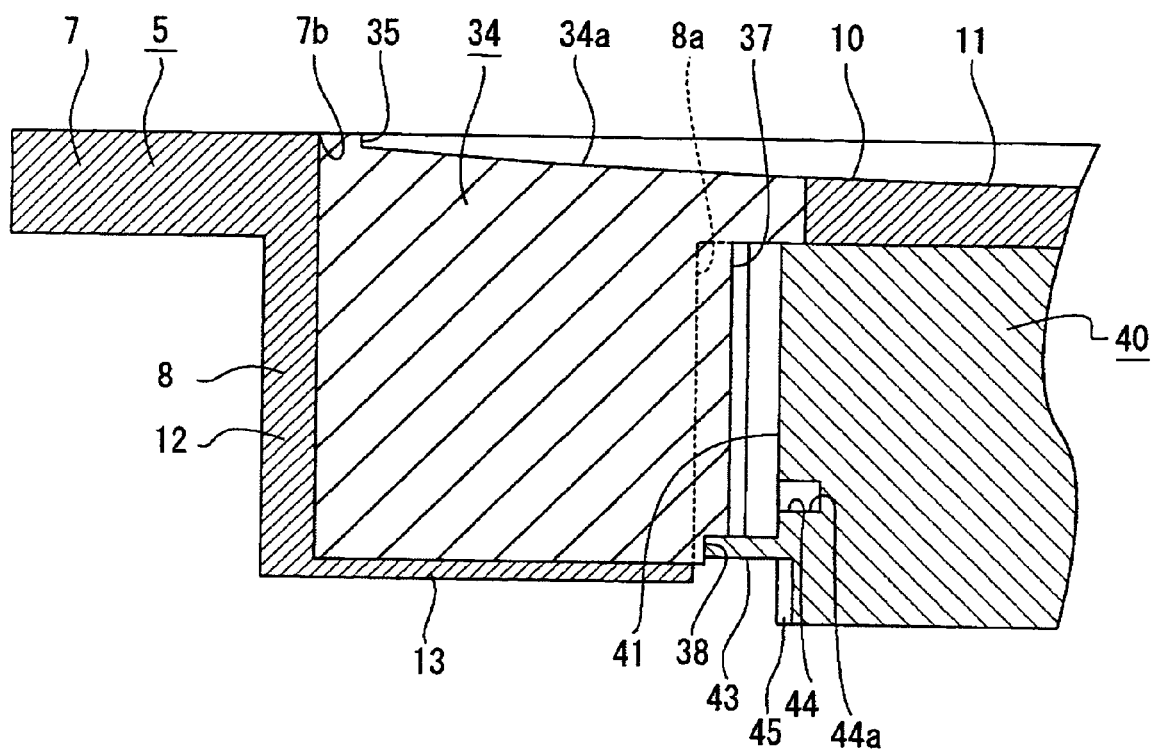
FIG. 5 is an enlarged sectional view showing a relation between a rotating body and a cam member.

In a state in which the rotation bodies 34, 34, 34 are supported by the support cylinder sections 8, 8, 8, respectively, and the disc centering sections 35, 35, 35 are located correspondingly to the portion just outside the disc placing surface 11 in the base panel 5, as shown in FIG. 5, the disc placing surface 11 of the base panel 5 and the top surfaces 34a, 34a, 34a of the rotation bodies 34, 34, 34 are defined as the continuous curved surfaces.

On the lower surface of the base section 7 of the base panel 5, a cam member 40 formed as being approximately circular cylindrical is rotatably supported (refer to FIG. 4).

Figure 6:
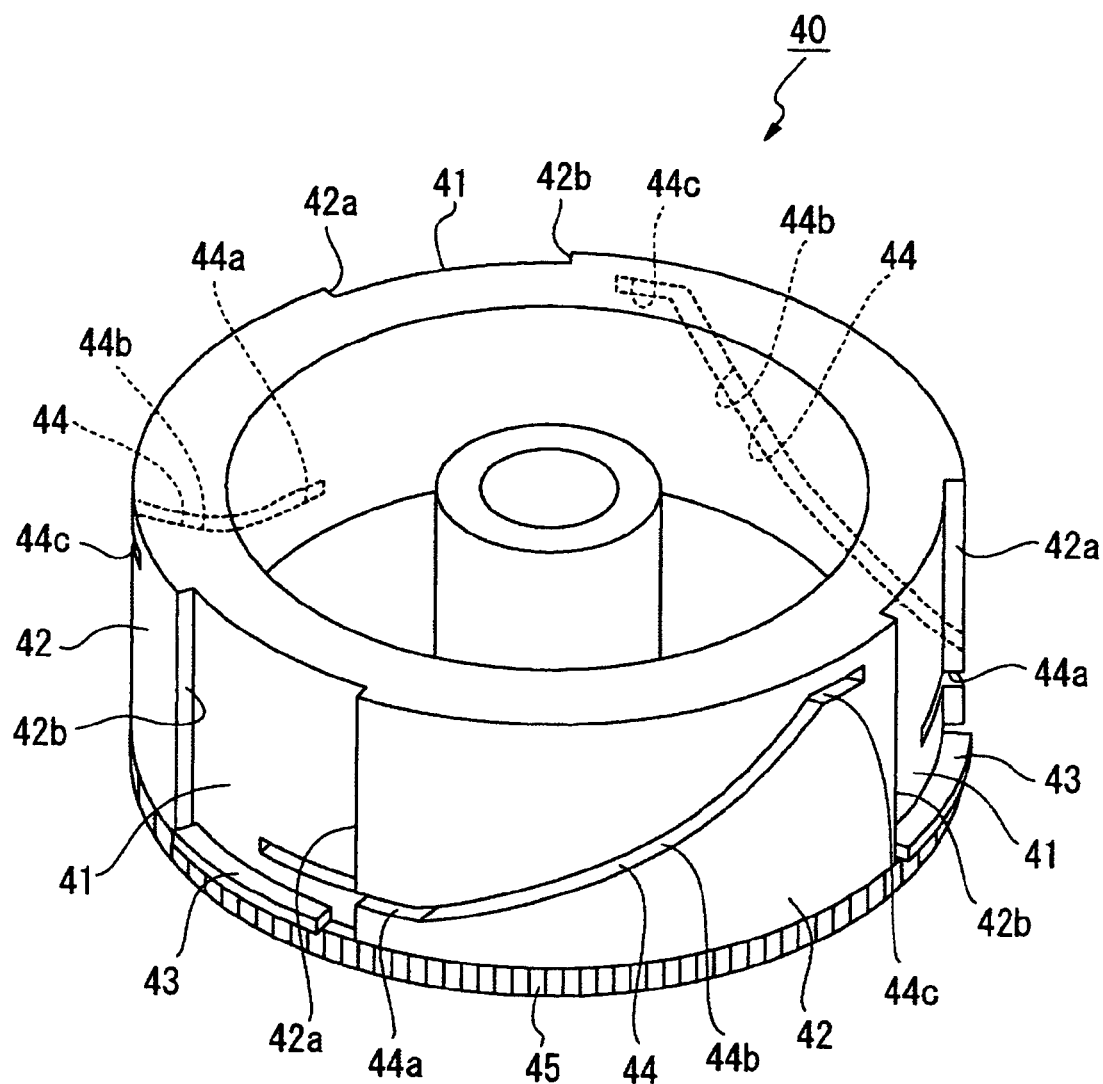
FIG. 6 is an enlarged perspective view of a cam member.

On the cam member 40, three recessed portions 41, 41, 41 are formed on its circumferential surface (refer to FIG. 6). The outer surfaces of the recessed portions 41, 41, 41 are formed on the circular arc surfaces which are externally protruded. On the circumferential surface of the cam member 40, the surfaces except the recessed portions 41, 41, 41 are formed as outer circumferential sections 42, 42, 42.

Since the recessed portions 41, 41, 41 are formed on the cam member 40, each two stage difference sections, which are separated in the circumferential direction, are formed between the recessed portions 41, 41, 41 and the outer circumferential sections 42, 42, 42, respectively. One of those step difference sections is formed as each of first pressing sections 42a, 42a, 42a, and the other is formed as each of second pressing sections 42b, 42b, 42b.

Protrusion pieces 43, 43, 43, each having the shape of a circular arc that is protruded outward, are formed on the bottom ends of the recessed portions 41, 41, 41 of the cam member 40, and the outer surfaces of the protrusion pieces 43, 43, 43 are formed on the circular arc surfaces that are protruded outward. The outer surfaces of the protrusion pieces 43, 43, 43 are located on the side slightly outer than the outer circumferential sections 42, 42, 42.

Cam grooves 44, 44, 44, which are separated at an equal interval in the circumferential direction, are formed on the circumferential surface of the cam member 40. The cam groove 44 includes: a lower horizontal section 44a; an inclination section 44b that is inclined so as to be displaced outward as it is separated from the lower horizontal section 44a; and an upper horizontal section 44c following the inclination section 44b. The lower horizontal section 44a is formed at the position crossing over the recessed portion 41 and the outer circumferential section 42, and the inclination section 44b and the upper horizontal section 44c are formed on the outer circumferential section 42.

A gear section 45 extending in the circumferential direction is placed on the bottom end of the cam member 40.

The cam member 40 is rotatably supported through a support shaft (not shown) by the base panel 5.

In a state in which the cam member 40 is supported by the base panel 5, the outer circumferential sections of the cam member 40 are located correspondingly to the arranging notches 8a, 8a, 8a.

The cam member 40 is rotated when the driving force of an operating motor (not shown) is transmitted to the gear section 45, and it is rotated in the direction based on the rotation direction of the operating motor.

Figure 7:
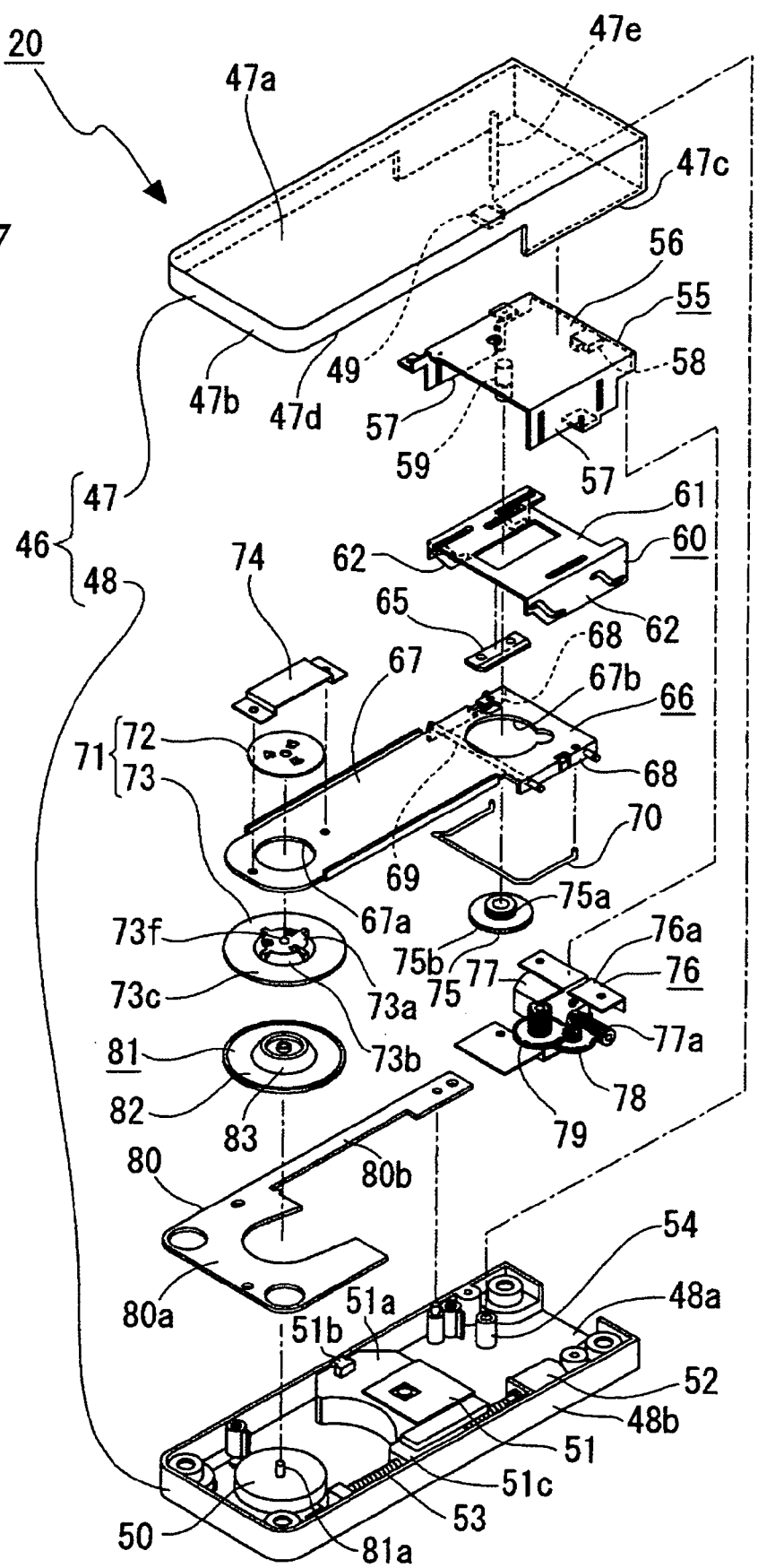
FIG. 7 is an exploded perspective view of a base unit.

The base unit 20 is configured such that respective appropriate sections are arranged or supported on a body 46, and the body 46 is configured such that an upper case 47 and a bottom case 48 are combined in the up and low portions (refer to FIG. 1 and FIG. 7).

The upper case 47 is formed as the shape of a box, which is downwardly opened, longer in the front-back direction and approximately rectangular, and it is configured such that a top plate section 47a, a circumferential section 47b which is downwardly protruded from the circumferential edge of the top plate section 47a, and a protrusion 47c which is further downwardly protruded from the circumferential section 47b are integrally formed. The protrusion 47c is formed on the back end side. Thus, on the upper case 47, a notch 47d corresponding to the height of the protrusion 47c is formed on the portion on which the protrusion 47c is not formed.

A first detection switch 49 is arranged on the lower surface of the top plate section 47a of the upper case 47. A positioning shaft 47e is downwardly protruded from the lower surface of the top plate section 47a.

The bottom case 48 is formed as the shape of a box which is longer in the front-back direction, approximately rectangular and shallow, and configured such that a bottom wall section 48a and a circumferential wall section 48b protruded upwardly from the circumferential edge of the bottom wall section 48a are integrally formed, and it is upwardly opened. Inside the bottom case 48, a spindle motor 50 is arranged in its front end.

Inside the bottom case 48, an optical pickup 51 is movably supported in the long-side direction of the bottom case 48, and guided sections 51b, 51c are formed on both left and right edges of a movement base 51a of the optical pickup 51, respectively.

Inside the bottom case 48, a stepping motor 52 and a lead screw 53 that is rotated by the stepping motor 52 are arranged. The lead screw 52 is screwed in a penetrated state to one guided section 51c of the optical pickup 51. As for the optical pickup 51, when the stepping motor is rotated, the movement base 51a is fed to the direction based on the rotation direction, and it is moved to the front-back direction.

A positioning cylinder 54 that is upwardly protruded is placed at the position closer to the back end of the bottom wall section 48a of the bottom case 48.

The upper case 47 and the bottom case 48 are coupled, for example, in a state in which the lower surface of the protrusion 48c and the upper surface of the circumferential wall section 48b are in contact through the screwing, and the body 46 is formed. In a state in which the body 46 is configured, correspondingly to the fact that a notch 47d is formed in the upper case 47, an insertion space 46a into which the disc-shaped recording medium 100 is inserted is formed between the upper case 47 and the bottom case 48 (refer to FIG. 1).

Figure 8:
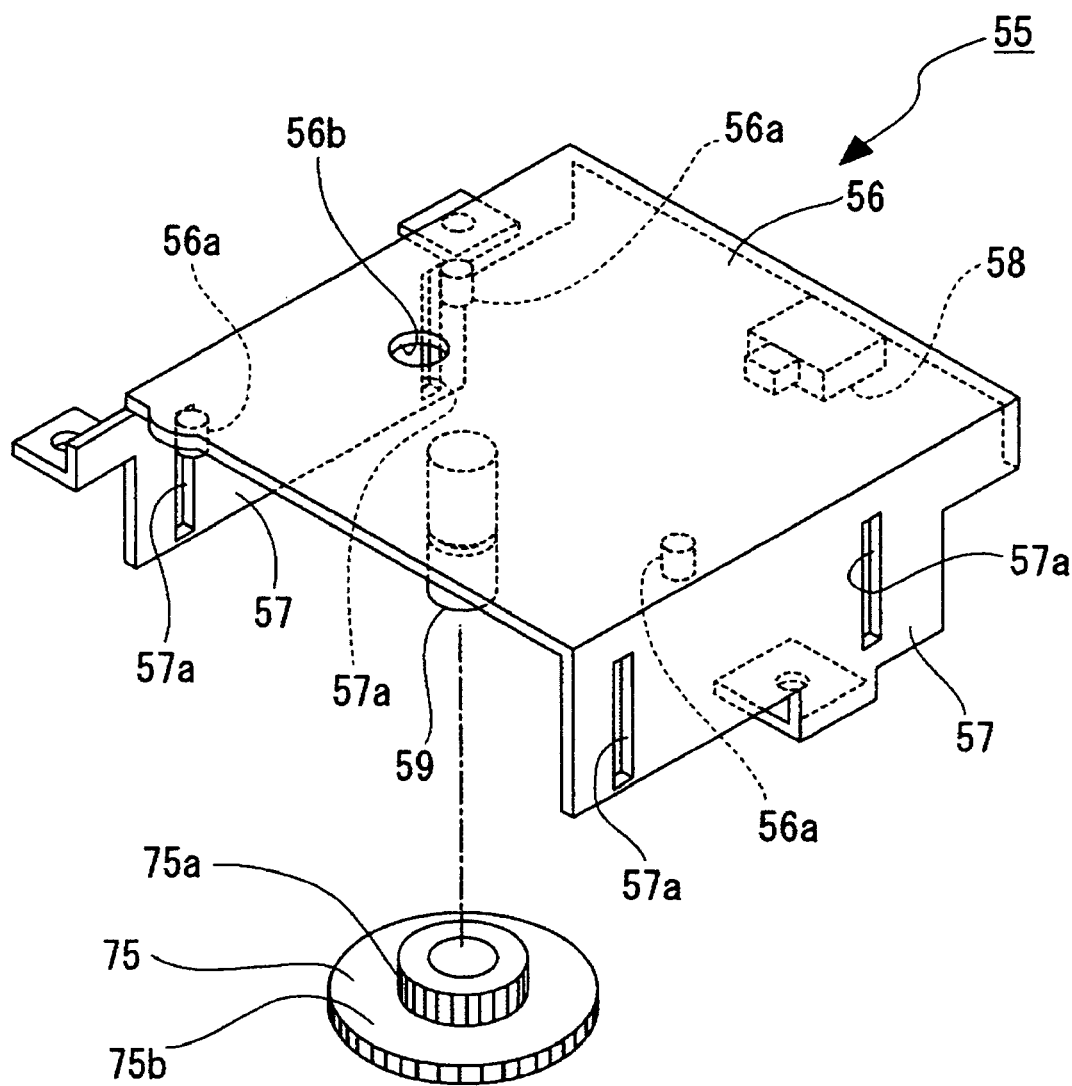
FIG. 8 is an enlarged perspective view showing a guiding member and a driving gear.

A guiding member 55 is attached to the lower surface of the upper case 47 (refer to FIG. 7). The guiding member 55 is configured, as shown in FIG. 8, such that a flat plate section 56 and side plate sections 57, 57, which are downwardly protruded from both left and right edges of the flat plate section 56, respectively, are integrally formed.

On the lower surface of the flat plate section 56, a second detection switch 58 is attached to its back end. Guide pins 56*a*, 56*a*, 56*a* which are downwardly protruded are placed on the lower surface of the flat plate section 56. A gear support shaft 59 is placed on the flat plate section 56, and the gear support shaft 59 is downwardly protruded from the lower surface of the flat plate section 56. The gear support shaft 59 is placed on the flat plate section 56, and the gear support shaft 59 is downwardly protruded from the lower surface of the flat plate section 56. A shaft insertion hole 56*b* is formed in the flat plate section 56.

On the side plate sections 57, 57, guide holes 57*a*, 57*a*, . . . , which are respectively separated in the front-back direction, are formed in pairs. The guide holes 57*a*, 57*a*, . . . are made longer in the up-down direction.

On the guiding member 55, a cam slider 60 is movably supported in the front-back direction (refer to FIG. 7). The cam slider 60 is configured, as shown in FIG. 9, such that a flat plate section 61 and side plate sections 62, 62, which are downwardly protruded from both left and right edges of the flat plate section 61, respectively, are integrally formed.

A first escape hole 61*a* and a second escape hole 61*b*, which are separated in the left-right direction, are formed in the flat plate section 61. Both of the first escape hole 61*a* and second escape hole 61*b* are made longer in the front-back direction. Guide holes 61*c*, 61*c*, 61*c* are formed in both left and right ends of the flat plate section 61, respectively.

Figure 9:
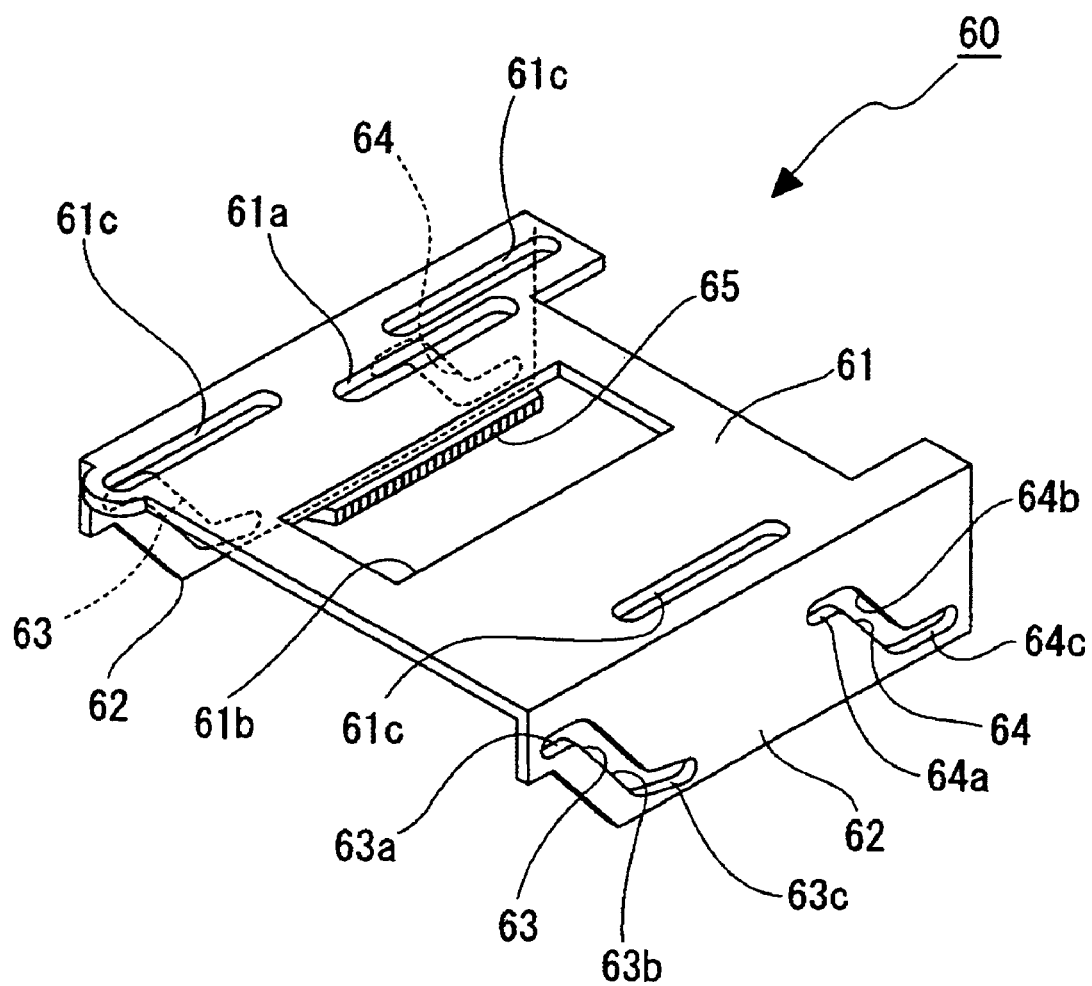
FIG. 9 is an enlarged perspective view showing a cam slider.
Figure 10:
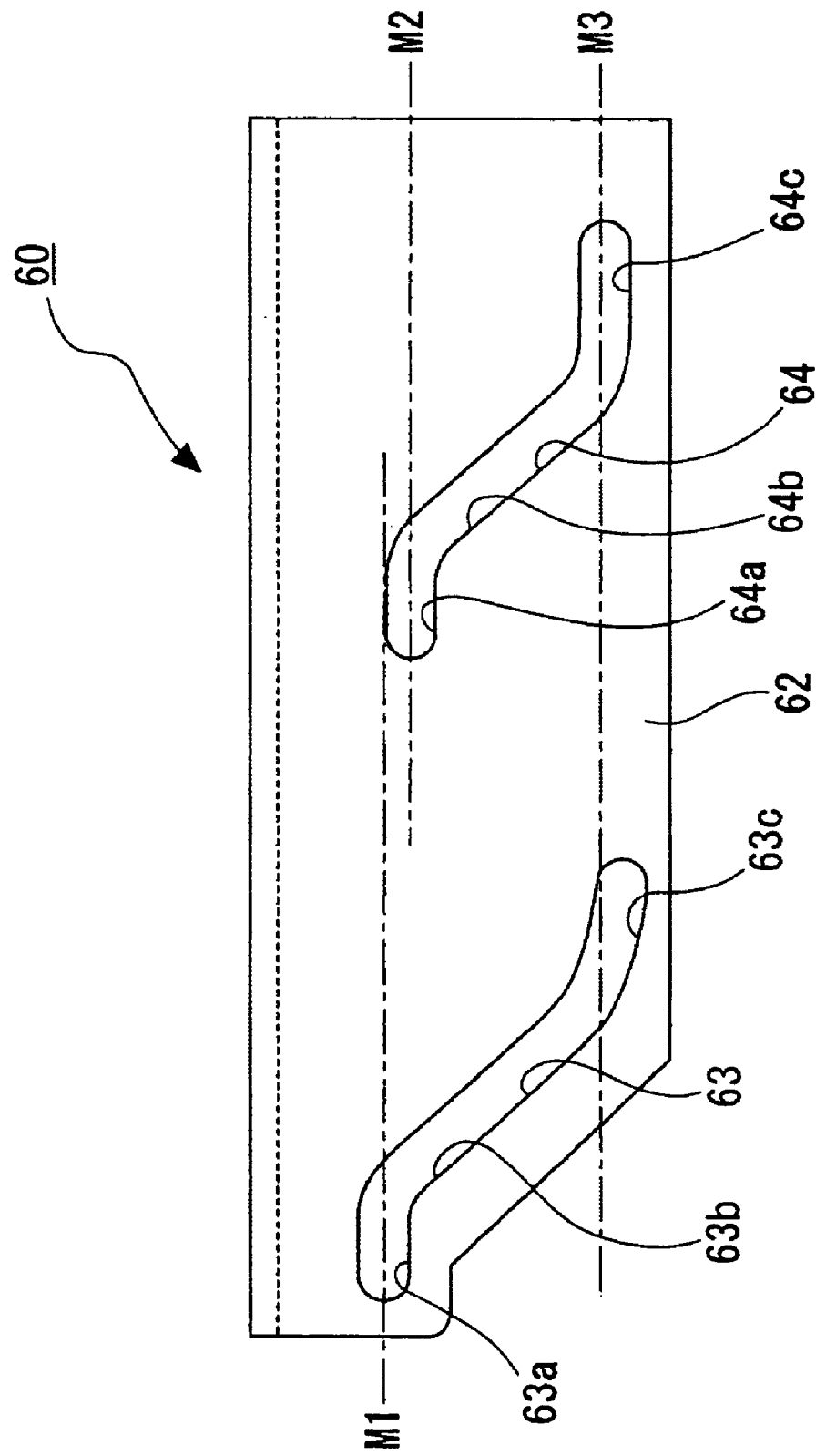
FIG. 10 is an enlarged side view of a cam slider.

On the side plate sections 62, 62, front cam holes 63, 63 and rear cam holes 64, 64, which are separated in the front-back direction, respectively, are formed (refer to FIG. 9 and FIG. 10). The front cam hole 63 includes: a horizontal section 63*a* extending in the front-back direction; an inclination section 63*b* that follows the back end of the horizontal section 63*a* and is inclined downward as it goes backward; and an acting section 63*c* that follows the back end of the inclination section 63*b* and is inclined slightly downward as it goes backward. Thus, the acting section 63*c* has the inclination angle with respect to the horizontal section 63*a*, which is smaller than the inclination section 63*b*. The rear cam hole 64 includes: a horizontal section 64*a* extending in the front-back direction; an inclination section 64*b* that follows the back end of the horizontal section 64*a* and is displaced downward as it goes backward; and an acting section 64*c* that follows the back end of the inclination section 64*b* and extends in the front-back direction.

The horizontal sections 63*a*, 63*a* of the front cam holes 63, 63 are located at the slightly higher portions than the horizontal sections 64*a*, 64*a* of the rear cam holes 64, 64. Thus, as shown in FIG. 10, a middle line M1 in the height direction of the horizontal sections 63*a*, 63*a* is located at the position higher than a middle line M2 in the height direction of the horizontal sections 64*a*, 64*a*.

The acting sections 63*c*, 63*c* of the front cam holes 63, 63 are slightly inclined so as to be displaced downward as it goes backward, as mentioned above, and its front end is located at the same position as the acting sections 64*c*, 64*c* of the rear cam holes 64, 64. Thus, as shown in FIG. 10, the back ends of the acting sections 63*c*, 63*c* are located at the positions lower than a middle line M3 in the height direction of the acting sections 64*c*, 64*c*.

On the cam slider 60, a rack member 65 is attached to the lower surface of the flat plate section 61 (refer to FIG. 7 and FIG. 9).

Figure 11:
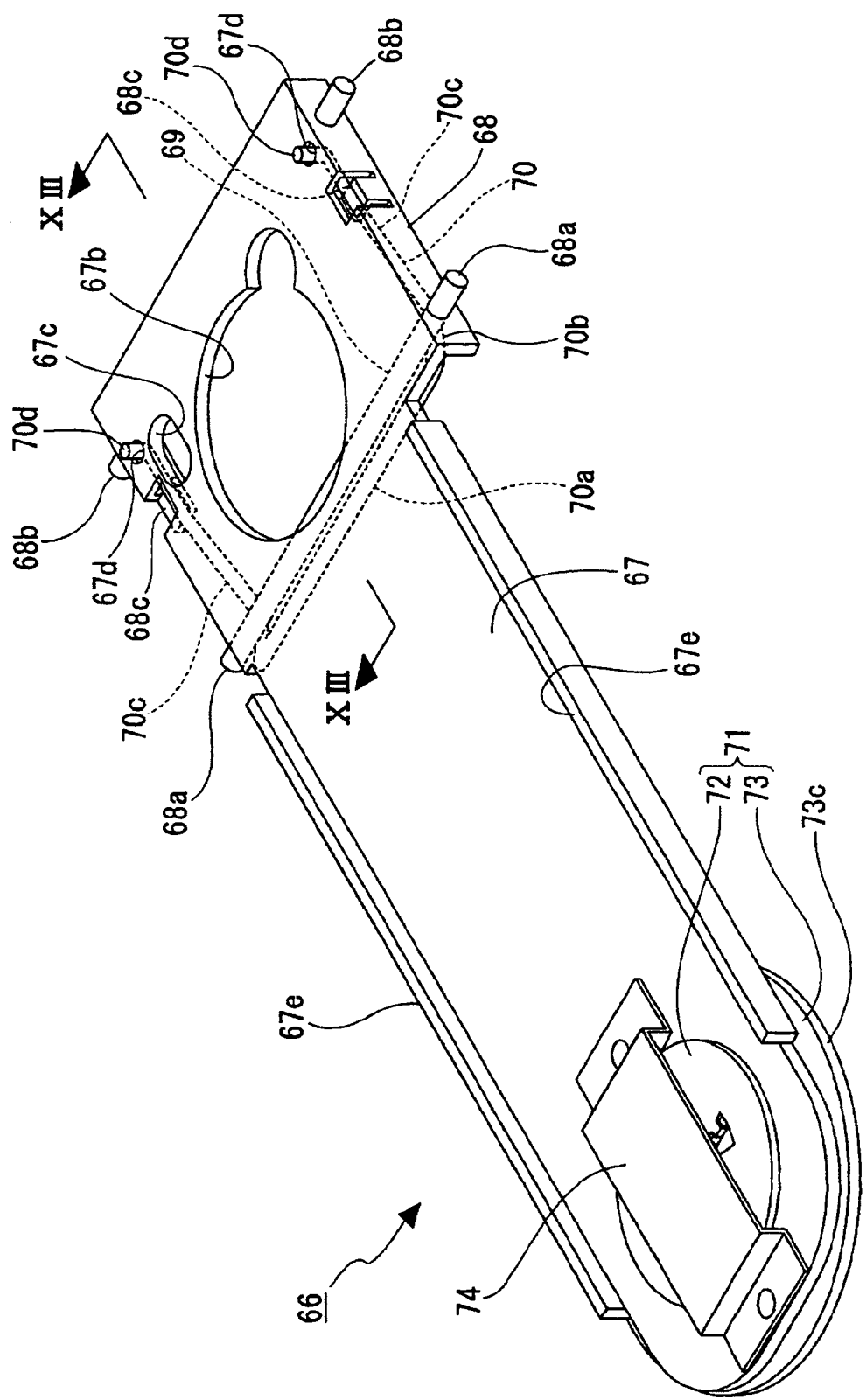
FIG. 11 is an enlarged perspective view showing a support arm and a chucking pulley.

A support arm 66 is supported by the cam slider 60 and the guide member 55 (refer to FIG. 7). The support arm 66 is configured, as shown in FIG. 11, such that an arm plate 67 which is longer in the front-back direction, and side plates 68, 68, which are downwardly protruded from both left and right edges of the back end of the arm plate 67, respectively, are integrally formed.

A support hole 67*a* is formed on the front end of the arm plate 67, and a gear arrangement hole 67*b* is formed on the back end. A shaft penetration hole 67*c* is formed at the position near the gear arrangement hole 67*b* of the arm plate 67. At the position closer to the back end of the arm plate 67, spring support holes 67*d*, 67*d* are formed on both left and right edges thereof.

In the portions except both the front and back ends of the arm plate 67, reinforcement ribs 67*e*, 67*e* are placed. The reinforcement ribs 67*e*, 67*e* are placed on both the left and right edges of the arm plate 67, and they are formed by bending a part of the arm plate 67 by 90° towards to the upper side.

On the side plates 68, 68, supported shafts 68*a*, 68*a*, 68*b*, 68*b* are placed which are separated before and behind, respectively, and protruded exteriorly. Between the side plates 68, 68, a linking shaft 69 is placed for linking between the supported shafts 68*a*, 68*a* located on the front. Thus, the linking shaft 69 is located between the inner surfaces of the side plates 68, 68.

On the top ends of the side plates 68, 68, spring support pieces 68*c*, 68*c* are placed. The spring support pieces 68*c*, 68*c* are configured such that parts of the side plates 68, 68 are interiorly bent, and predetermined intervals are formed between the spring support pieces 68*c*, 68*c* and the arm plate 67 (refer to FIG. 13).

Figure 13:
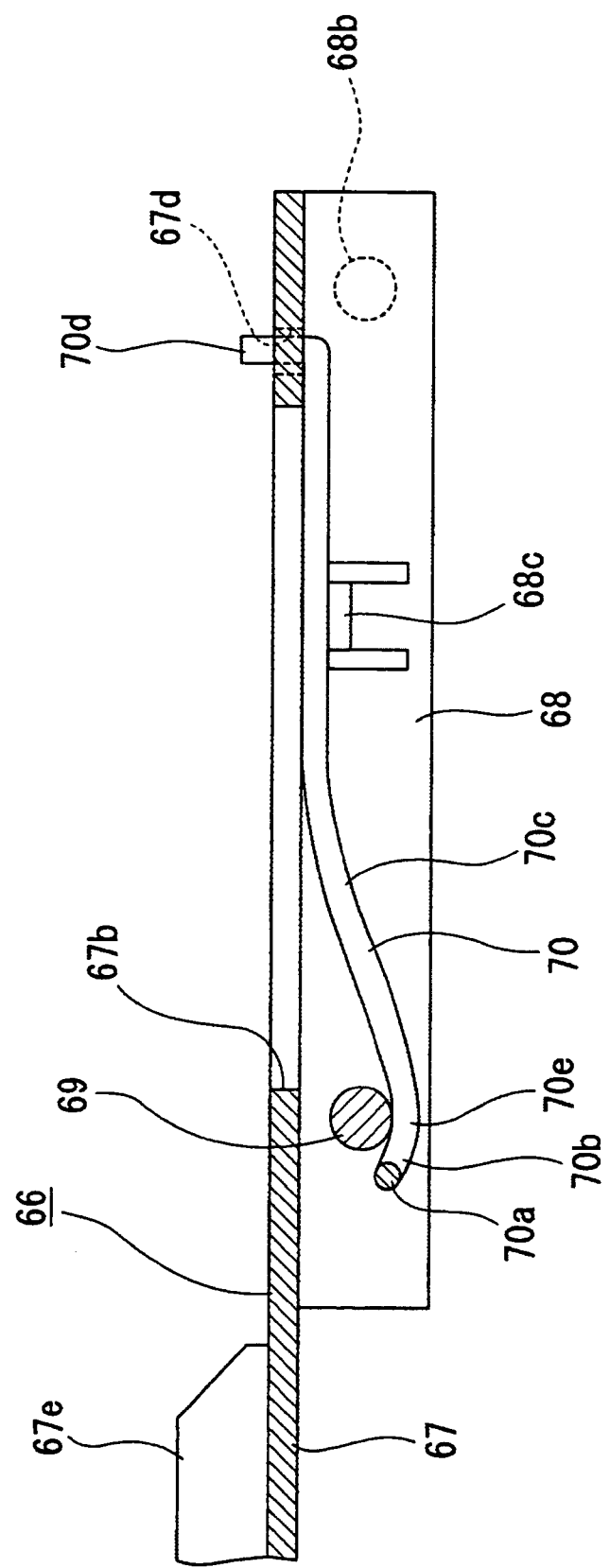
FIG. 13 is an enlarged sectional view along an XIII—XIII line of FIG. 11.

A wire spring 70 is supported by the support arm 66 (refer to FIG. 7, FIG. 11 and FIG. 13). The wire spring 70 is configured such that a base section 70*a* which is longer in the left-right direction, front deformation sections 70*b*, 70*b* which are approximately protruded backward from both of the left and right ends of the base section 70*a*, respectively, back deformation sections 70*c*, 70*c* which are approximately protruded backward from the back ends of the front deformation sections 70*b*, 70*b*, respectively, and supported sections 70*d*, 70*d* which is upwardly protruded from the back ends of the back deformation sections 70*c*, 70*c* are integrally formed. The linkage portions between the front deformation sections 70*b*, 70*b* and the back deformation sections 70*c*, 70*c* are formed as elastic contacts 70*e*, 70*e* which are slightly bent.

In the wire spring 70, the supported sections 70*d*, 70*d* are inserted into the spring support holes 67*d*, 67*d* of the arm plate 67, respectively, and the portions closer to the back ends of the back deformation sections 70*c*, 70*c* are inserted between the spring support pieces 68*c*, 68*c* and the arm plate 67, respectively, and the elastic contacts 70*e*, 70*e* are elastically brought into contact with the linking shaft 69 from below and supported by the support arm 66.

Figure 12:
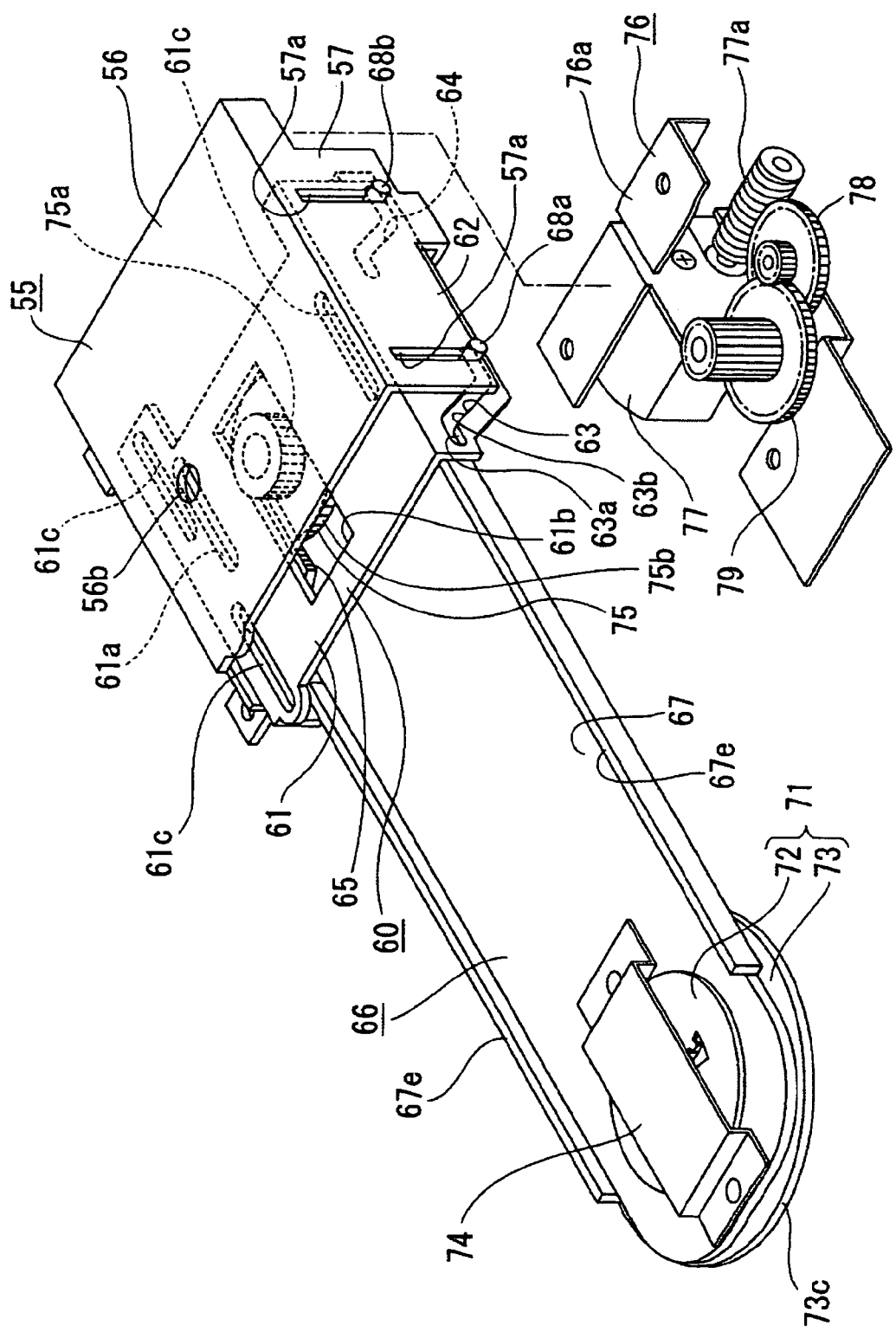
FIG. 12 is an enlarged perspective view showing a state in which the support arm is supported by the guiding member and the cam slider, in a state in which a driving unit is separated.

The support arm 66 is supported, as shown in FIG. 12, after the supported shafts 68*a*, 68*a* located on the front are inserted into the front cam holes 63, 63 of the cam slider 60 and the front guide holes 57*a*, 57*a* of the guide member 55, respectively, and the supported shafts 68*b*, 68*b* located on the rear are inserted into the rear cam holes 64, 64 of the cam slider 60 and the rear guide holes 57a, 57a of the guide member 55, respectively. Thus, when the cam slider 60 is moved to the front-back direction with respect to the guide member 55, depending on the positions with regard to the front cam holes 63, 63 and rear cam holes 64, 64 of the supported shafts 68a, 68a and supported shafts 68b, 68b, the supported shafts 68a, 68a and the supported shafts 68b, 68b are guided to the guide holes 57a, 57a, . . . , and the support arm 66 is moved to the approximately up-down direction.

A chucking pulley 71 is supported by the support arm 66 (refer to FIG. 7, FIG. 11, FIG. 12 and FIG. 14). The chucking pulley 71 is configured such that a supporting plate 72 and a pressing member 73 are coupled up and down.

The supporting plate 72 is formed as the shape of an approximately circular plate and is larger than a support hole 67a of the support arm 66. A protrusion insertion hole 72a is formed on the center of the supporting plate 72.

Figure 14:
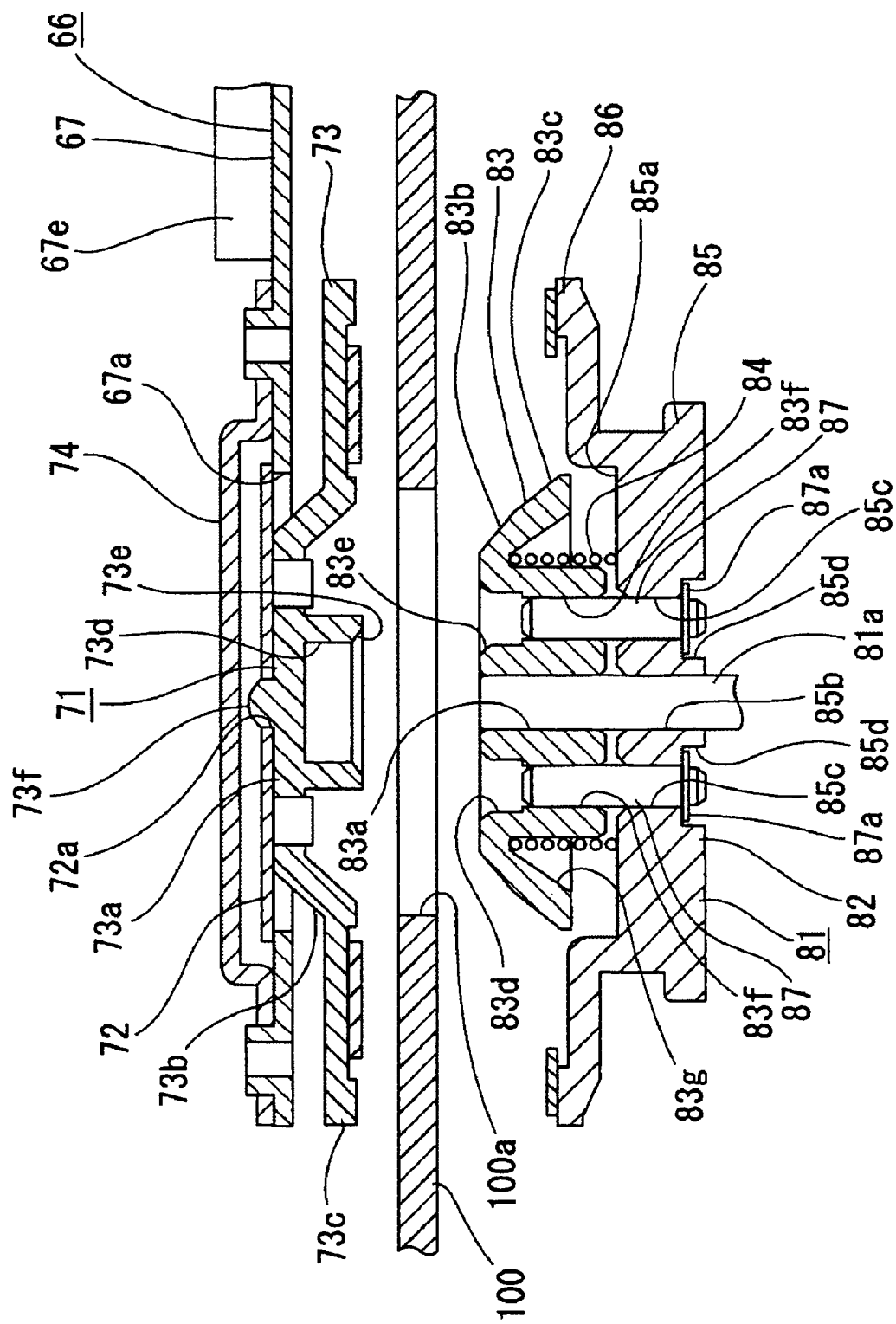
FIG. 14 is an enlarged sectional view showing a chucking pulley and a disc table.

As shown in FIG. 14, the pressing member 73 includes: a circular attached section 73a; a circumferential section 73b which is protruded obliquely downward from the circumferential edge of the attached section 73a; an annular pressing section 73c which follows the bottom edge of the circumferential section 73b; and a cylindrical positioning protrusion 73d which is downwardly protruded from the lower surface of the attached section 73a. A guided edge 73e, which is inclined to the direction closer to the outer circumferential surface of the positioning protrusion 73d as it goes down, is formed on the inner circumferential edge on the lower side of the positioning protrusion 73d. A pivot protrusion 73f, which is approximately hemispheric in shape and upwardly protruded, is formed on the center of the attached section 73a.

The chucking pulley 71 is supported by the support arm 66 in such a way that the attached section 73a and circumferential section 73b of the pressing member 73 are inserted into the support hole 67a from below and the attached section 73a is attached to the supporting plate 72. In a state in which the pressing member 73 is attached to the supporting plate 72, the pivot protrusion 73f is upwardly protruded from the supporting plate 72. In a state in which the chucking pulley 71 is supported by the support arm 66, it can be rotated in the direction around the shaft and moved to the shaft direction (the up-down direction).

In a state in which the chucking pulley 71 is supported by the support arm 66, so as to cover the supporting plate 72 from above, a pressing plate 74 is attached to the upper surface of the arm plate 67.

In a state in which the support arm 66 is supported by the guide member 55 and the cam slider 60, the gear support shaft 59 of the guide member 55 is inserted into the second escape hole 61b of the cam slider 60. A driving gear 75 that is a two-stage gear is supported by the gear support shaft 59 (refer to FIG. 7). The driving gear 75 is arranged in the gear arrangement hole 67b of the support arm 66, and its small diameter section 75a is engaged with the rack member 65 attached to the cam slider 60.

A driving unit 76 is attached to the lower surface of the back end of the flat plate section 56 of the guide member 55 (refer to FIG. 7). As shown in FIG. 12, the driving unit 76 includes an attachment plate 76a, a lifting motor 77 attached to the attachment plate 76a, and a first deceleration gear 78 and second deceleration gear 79 which are supported by the attachment plate 76a. A worm 77a is fixed to the motor shaft of the lifting motor 77. The first deceleration gear 78 is engaged with the worm 77a, and the second deceleration gear 79 is engaged with the first deceleration gear 78.

The second deceleration gear 79 is engaged with a large diameter section 75b of the driving gear 75, in a state in which the driving unit 76 is attached to the guide member 55. Thus, when the lifting motor is rotated, its driving force is sequentially transmitted through the first deceleration gear 78, the second deceleration gear 79 and the driving gear 75 to the rack member 65, and the cam slider 60 is moved to the direction (the front-back direction) based on the rotation direction of the lifting motor 77.

An assembling plate 80 is attached to the bottom case 48 of the body 46. The assembling plate 80 is configured such that a pressing section 80a located on the front end side and an extending section 80b protruded backwardly from the left end of the pressing section 80a are integrally formed. The guided section 51b of the movement base 51a of the optical pickup 51 is slidably supported by the extending section 80b.

In a state in which the support arm 66 is supported by the guide member 55 and the cam slider 60, the positioning shaft 47e placed in the upper case 47 is inserted into the shaft insertion hole 56b of the guide member 55, the first escape hole 61a of the cam slider 60 and the gear arrangement hole 67b of the support arm 66. When the upper case 47 and the bottom case 48 are coupled, the positioning shaft 47e is inserted into the positioning cylinder 54 of the bottom case 48, and the upper case 47 and the bottom case 48 are positioned. Thus, the upper case 47 and the bottom case 48 are easily positioned, which can improve the working property in the assembling work for the base unit 20.

A disc table 81 is supported in the spindle motor 50 arranged inside the body 46 (refer to FIG. 7).

The disc table 81 includes a central shaft 81a that served as the motor shaft of the spindle motor 50, a table section 82, a centering protrusion 83 and a forcing spring 84 (refer to FIG. 14). The forcing spring 84 functions as the forcing means for forcing the centering protrusion 83 upward against the table section 82.

The table section 82 includes: a base section 85 whose outer shape is circle-shaped; and a placing section 86 that is pulled out, such as flange, to the exterior from the outer circumferential edge of the base section 85. An arrangement recessed portion 85a, which is upwardly opened, is formed on the base section 85. A fixing hole 85b, which is penetrating upward and downward, is formed on the center of the base section 85. Shaft support holes 85c, 85c, which are penetrating upward and downward, respectively, are formed at the positions on the opposite side by 180°, with having the fixing hole 85b of the base section 85 in between. On the base section 85, regulation recessed portions 85d, 85d are formed, which follow the shaft support holes 85c, 85c and are formed on the lower side thereof, respectively. The regulation recessed portions 85d, 85d are downwardly opened. Their open areas are set to be larger than the shaft support holes 85c, 85c.

The central shaft 81a is inserted into and fixed to the fixing hole 85b of the table section 82.

The centering protrusion 83 is set at a state in which a part thereof is arranged on the arrangement recessed portion 85a of the table section 82. A supported hole 83a penetrating up and down is formed on the center of the centering protrusion 83, and the top end of the central shaft 81a is inserted into the supported hole 83a, and the centering protrusion 83 is movably supported by the central shaft 81 in its shaft direction. On the circumferential surface of the centering protrusion 83, a guiding inclination surface 83b and a centering inclination surface 83c are formed from the upper side. As for the guiding inclination surface 83b, the inclination angle with respect to the shaft direction of the central shaft 81*a* is set to be larger for the centering inclination surface 83*c*.

A position recessed portion 83*d* is formed on the centering protrusion 83, and the position recessed portion 83*d* is formed around the supported hole 83*a* and upwardly opened. A guiding edge 83*e*, which is inclined so as to be further inwardly displaced as it goes up, is formed around the inner circumferential edge on the upper side of the position recessed portion 83*d*.

On the centering protrusion 83, shaft fixing holes 83*g*, 83*g* are formed at the positions on the sides opposite to each other by 180°, respectively, with having the supported hole 83*a* in between, and the shaft fixing holes 83*g*, 83*g* are extending upward and downward, and downwardly opened.

On the centering protrusion 83, a spring support recessed portion 83*h* is formed which is downwardly opened around the supported hole 83*a*.

The forcing spring 84 that is the compressing coil spring is arranged in the spring support recessed portion 83*h*, and the forcing spring 84 is in elastic contact with the table section 82 and the centering protrusion 83. Thus, the centering protrusion 83 is pushed up against the table section 82 by the forcing spring 84. Between the bottom surface of the arrangement recessed portion 82*a* of the table section 82 and the lower surface of the centering protrusion 83, a certain interval is formed to move the centering protrusion 83.

Separation stop shafts 87, 87 are inserted into the shaft support holes 85*c*, 85*c* of the table section 82, respectively, and the portions on the top end sides of the separation-stop shafts 87, 87 are inserted into and fixed to the shaft fixing holes 83*g*, 83*g* of the centering protrusion 83. The separation-stop shafts 87, 87 can be slid for the shaft support holes 85*c*, 85*c*.

Separation stop sections 87*a*, 87*a* are placed on the bottom ends of the separation-stop shafts 87, 87, respectively. The separation-stop sections 87*a*, 87*a* are, for example, so-called E-rings. The separation-stop sections 87*a*, 87*a* are located at the regulation recessed portions 85*d*, 85*d* of the table section 82, respectively. Since the separation-stop sections 87*a*, 87*a* are brought into contact with the upper surfaces of the regulation recessed portions 85*d*, 85*d*, it is possible to prevent the drop from the centering shaft 81*a* of the centering protrusion 83 pushed upward by the forcing spring 84.

When the centering protrusion 83 is inserted into a central hole 100*a* of the disc-shaped recording medium 100 from below, the inner circumferential edge of the disc-shaped recording medium 100 is guided to the guiding inclination surface 83*b* of the centering protrusion 83 and brought into contact with the centering inclination surface 83*c*. When the centering protrusion 83 is inserted into the central hole 100*a* of the disc-shaped recording medium 100, the above-mentioned chucking pulley 71 is lowered, and the inner circumferential section of the disc-shaped recording medium 100 is put between the disc table 81 and the chucking pulley 71, and the disc-shaped recording medium 100 is chucked.

At this time, the guided edge 73*e* of the positioning protrusion 73*d* of the chucking pulley 71 is guided to the guiding edge 83*e* of the position recessed portion 83*d* of the disc table 81, the positioning protrusion 73*d* is inserted into the position recessed portion 83*d*, and the chucking pulley 71 and the disc table 81 are positioned. At the same time, in a state in which the inner circumferential edge of the disc-shaped recording medium 100 is in contact with the centering inclination surface 83*c* of the centering protrusion 83, in association with the lowering of the chucking pulley

71, the disc-shaped recording medium 100 and the centering protrusion 83 are moved together downward against force of the forcing spring 84. Consequently, the positioning (centering) of the disc-shaped recording medium 100 to the central shaft 81 a is done.

As mentioned above, the centering protrusion 83 can be moved to the shaft direction of the central shaft 81*a* with respect to the table section 82. Thus, the variation in the diameter of the central hole 100*a* of the disc-shaped recording medium 100 is absorbed, and the centering with respect to the central shaft 81*a* of the disc-shaped recording medium 100 can be done at an excellent precision.

In a state in which the disc-shaped recording medium 100 is chucked, the chucking pulley 71 is pressed and fitted to the disc-shaped recording medium 100 pushed against the placing section 86 of the table section 82.

As mentioned above, in the disc table 81, the separation-stop shafts 87, 87 having the separation-stop sections 87*a*, 87*a* located in the state parallel to the central shaft 81*a* is used to prevent the centering protrusion 83 from being separated from the central shaft 81*a*. Thus, the portion to place the separation-stop section on the central shaft 81*a* is not needed, and the sufficient contact length of the table section 82 and the centering protrusion 83 with the central shaft 81*a* can be maintained. The stable rotation operation may be secured at the time of rotation of the disc-shaped recording medium 100 through the chucking pulley 71 and the disc table 81. Also, the recording medium driving apparatus 1 can be made thinner.

Also, the positioning protrusion 73*d* is formed on the chucking pulley 71. The position recessed portion 83*d* into which the positioning protrusion 73*d* is inserted is formed on the disc table 81. Thus, in order to position the chucking pulley 71 and the disc table 81, it is not necessary to protrude the central shaft 81 a upward from the disc table 81. Correspondingly thereto, the recording medium driving apparatus 1 can be made thinner.

Moreover, in the disc table 81, the two separation-stop shafts 87, 87 are placed on the sides opposite to each other by 180° with having the central shaft 81*a* in between. Thus, the excellent balance may be secured at the time of rotation operation.

In addition, in the disc table 81, the distances between the two separation-stop shafts 87, 87 and the central shaft 81*a* are made equal. Thus, the further excellent balance may be secured at the time of rotation operation.

In the above-mentioned description, the example is described in which the two separation-stop shafts 87, 87 are placed in the disc table 81. However, the number of the separation-stop shafts 87, 87 is arbitrary. If three or more are placed, they are desired to be placed in the periphery with the central shaft 81*a* as the center, in the circumferential direction and in the equal interval, and at the positions whose distances from the central shaft 81*a* are equal.

The operation of the recording medium driving apparatus 1 will be described below (refer to FIG. 15 to FIG. 34).

In the recording medium driving apparatus 1, the operation can be started when the power source button among the operation buttons 9, 9, . . . is operated and the electrically conductive state is established. At first, the initial states of the respective sections before the operation is started are explained.

Figure 15:
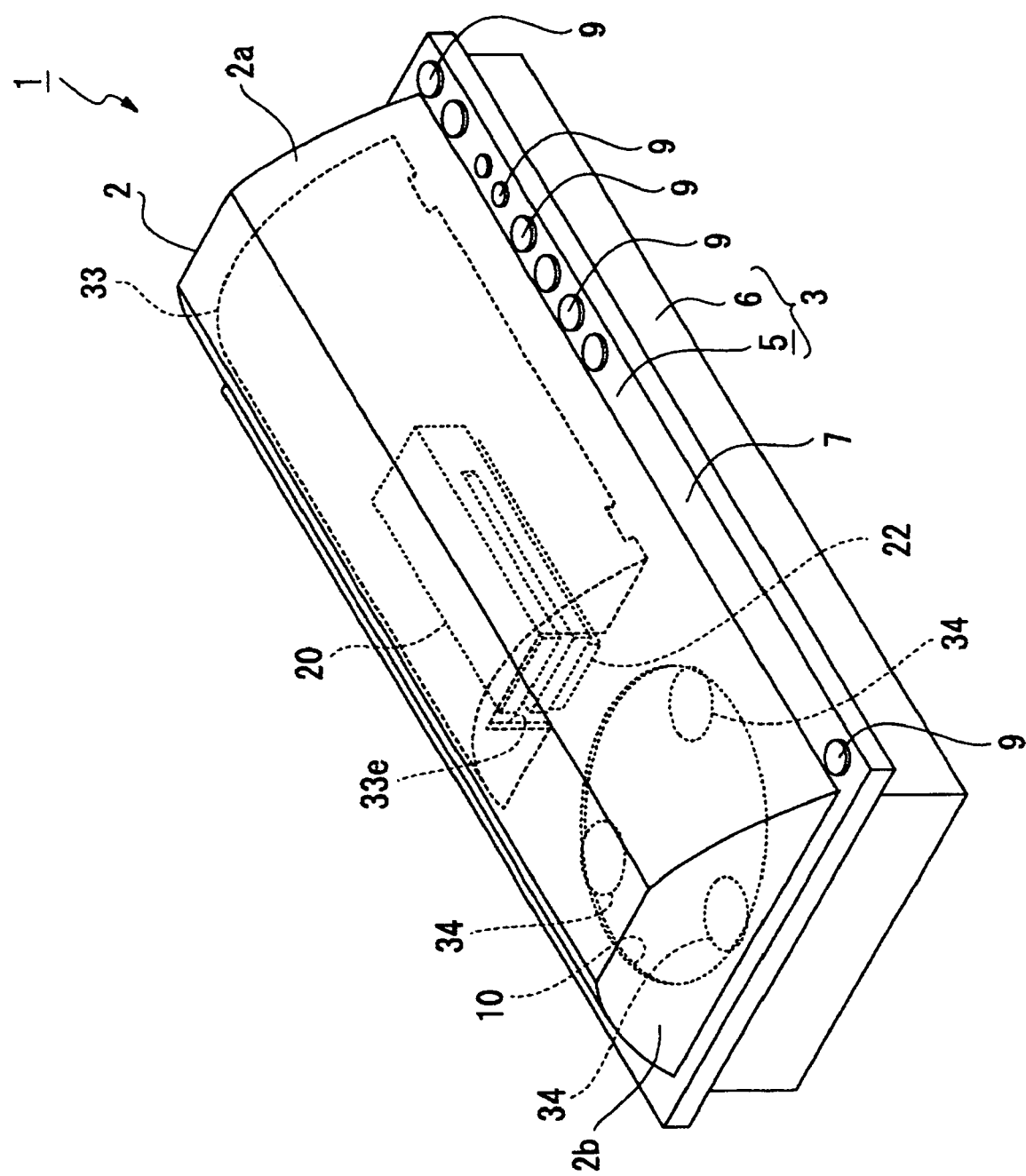
FIG. 15 is a perspective view of a recording medium driving apparatus showing an initial state, and shows, together with FIG. 16 to FIG. 34, an operation of a recording medium driving apparatus.
Figure 16:
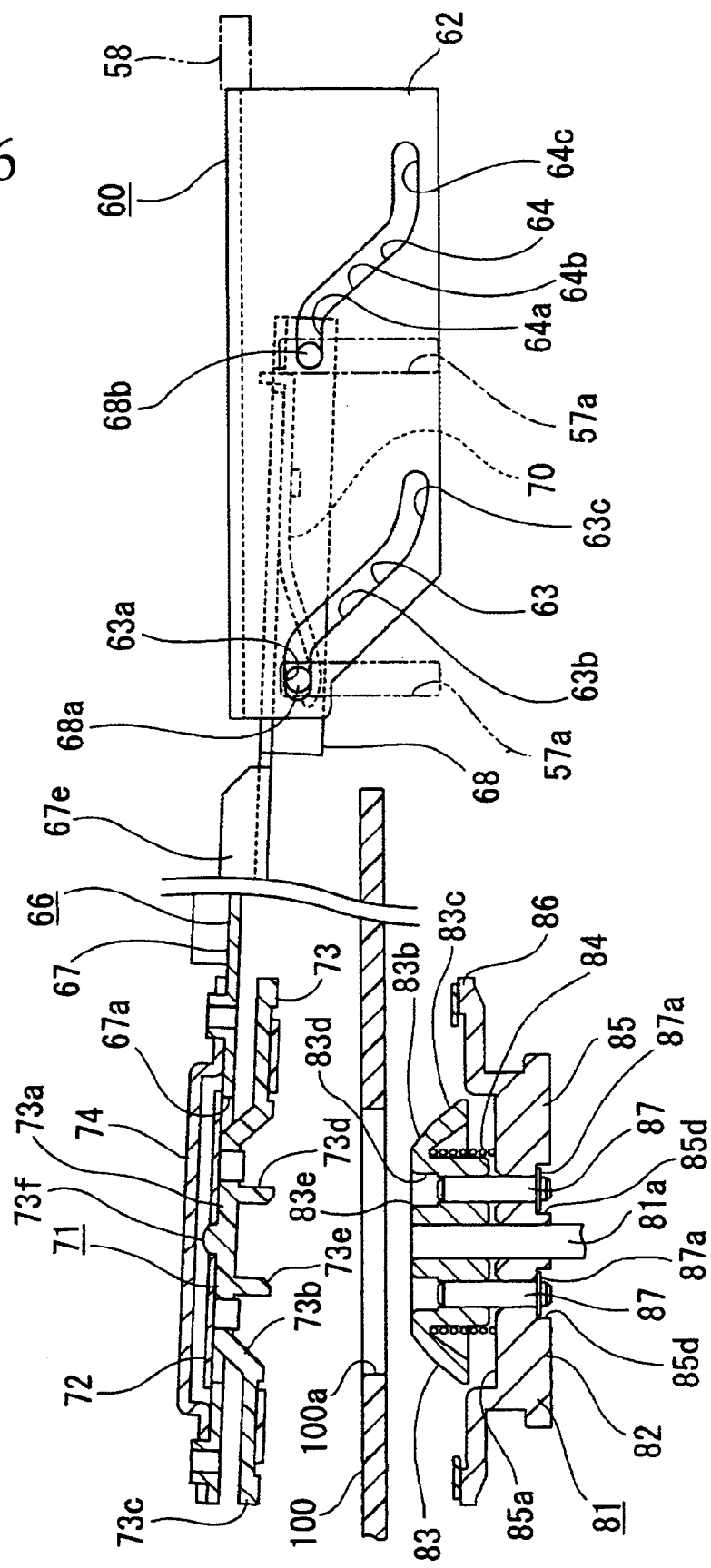
FIG. 16 is a side view showing a state in which a disc-shaped recording medium is inserted between a chucking pulley and a disc table, in which the part thereof is illustrated as a cross-section.

In the initial state, as shown in FIG. 15, the base unit 20 is stored in the unit storage section 19*a* between the guide members 19, 19 inside the inner cover 33. In a state in which the base unit 20 is stored in the unit storage section 19*a*, as shown in FIG. 16, the supported shafts 68*a*, 68*a*, 68*b*, 68*b* of the support arm 66 are fitted to the top ends of the guide holes 57a, 57a of the guide member 55, respectively, and also fitted to the horizontal sections 63a, 63a of the front cam holes 63, 63 of the cam slider 60 and the horizontal sections 64a, 64a of the rear cam holes 64, 64. Thus, the cam slider 60 is held at the movement end on the rear side in the movement range, and the support arm 66 is held at the movement end on the upper side in the movement range. At this time, the second detection switch 58 placed in the guide member 55 is operated by the back end surface of the flat plate section 61 of the cam slider 60 (refer to FIG. 16). The fact that the cam slider 60 is located at the movement end on the rear side in the movement range is detected.

As mentioned above, the horizontal sections 63a, 63a of the front cam holes 63, 63 are located at the positions slightly higher than the horizontal sections 64a, 64a of the rear cam holes 64, 64. Thus, in a state in which the support arm 66 is held at the movement end on the upper side in the movement range, the support arm 66 is set at a state in which the front thereof is slightly up (refer to FIG. 16).

In the initial state, the cover 2 is located at the close position at which the recording medium placing section 10 and the inner cover 33 are closed (refer to FIG. 15).

Figure 17:
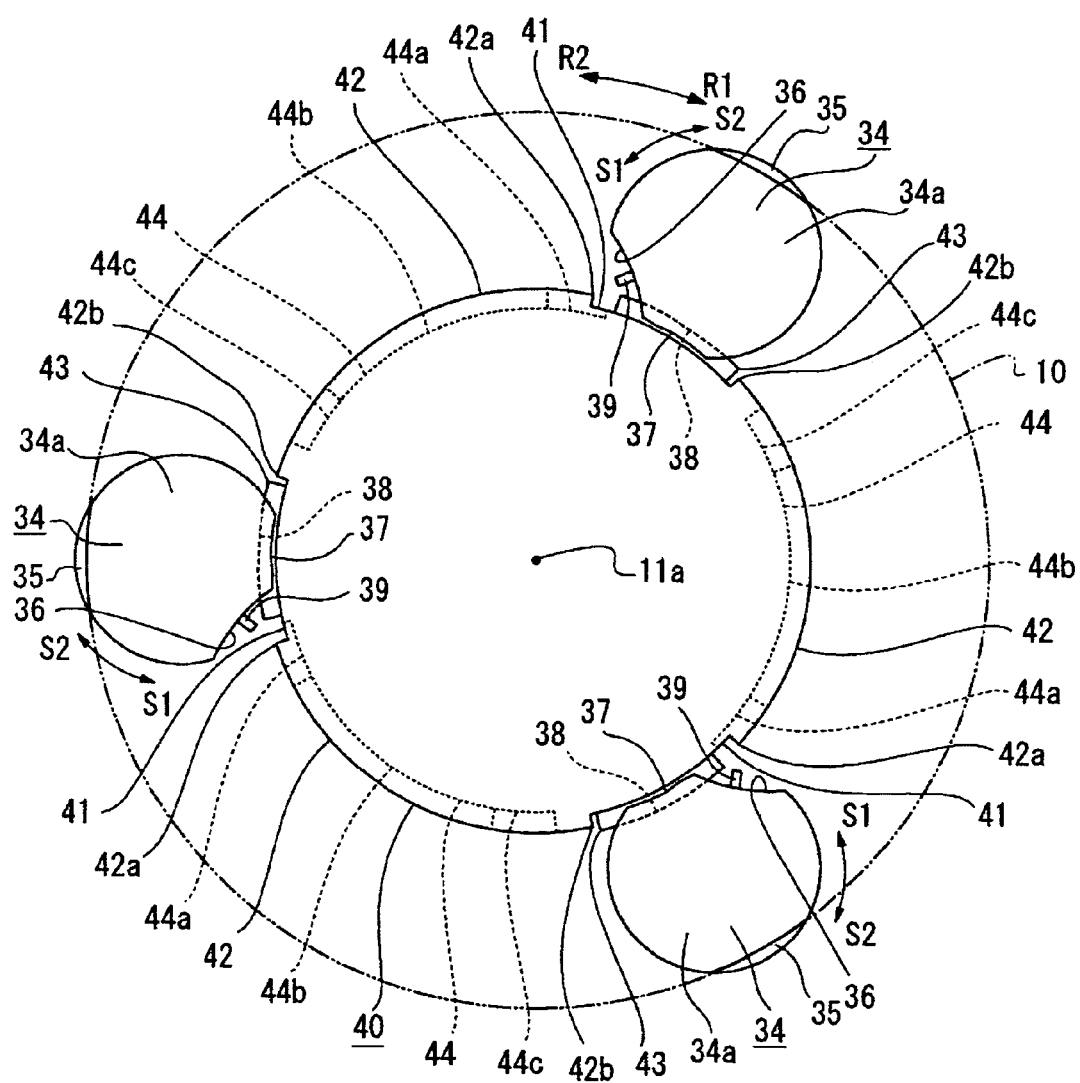
FIG. 17 is a plan view showing an initial state before a centering operation is performed.

In the initial state, as shown in FIG. 17, the protrusion pieces 43, 43, 43 of the cam member 40 are located correspondingly to the arranging notches 8a, 8a, 8a of the support cylinder sections 8, 8, 8 of the base panel 5, respectively, and the protrusion pieces 43, 43, 43 are fitted to the second Geneva surfaces 38, 38, 38 of the rotation bodies 34, 34, 34, respectively. Thus, the rotations of the rotation bodies 34, 34, 34 are regulated. The rotation bodies 34, 34, 34 are located at the movement ends on the lower side and are not upwardly protruded from the disc placing surface 11 of the base panel 5, as shown in FIG. 18.

Figure 18:
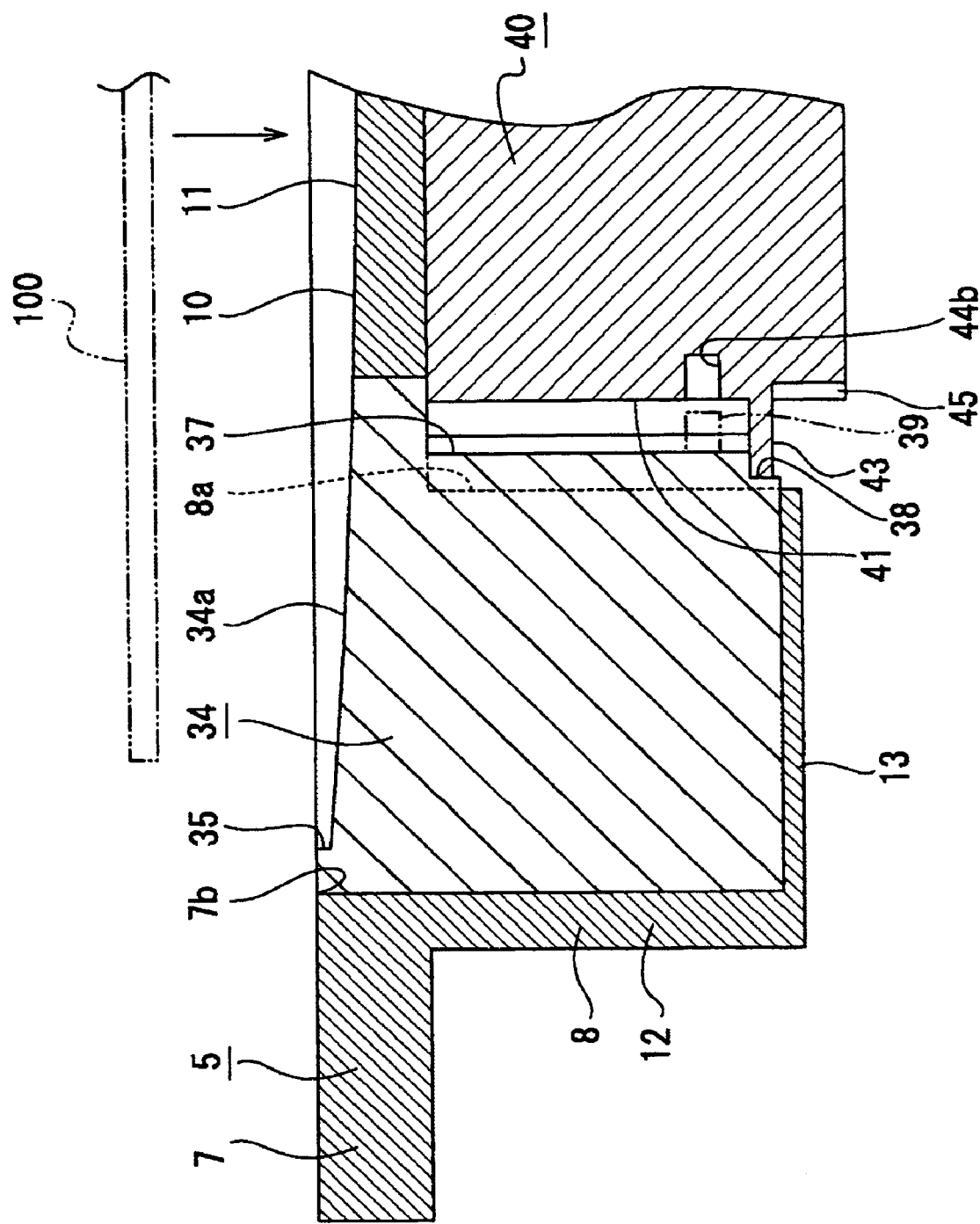
FIG. 18 is an enlarged sectional view showing a state before a centering operation is performed.

The sliding pins 39, 39, 39 of the rotation bodies 34, 34, 34 are not inserted into the cam grooves 44, 44, 44 of the cam members 40 (refer to FIG. 18).

The rotations of the rotation bodies 34, 34, 34 are regulated as mentioned above, and the disc centering sections 35, 35, 35 are located at the outermost sides (refer to FIG. 17). Thus, the disc centering sections 35, 35, 35 are located just outside the disc placing surface 11.

In the recording medium driving apparatus 1, as mentioned above, the cover 2 can be attached to and detached from the base panel 5. The operations are different in a state in which the cover 2 is detached from the base panel 5 and a state in which the cover 2 is attached to the base panel 5. However, hereafter, at fist, the operation that the cover 2 is attached to the base panel 5 is explained.

Figure 19:
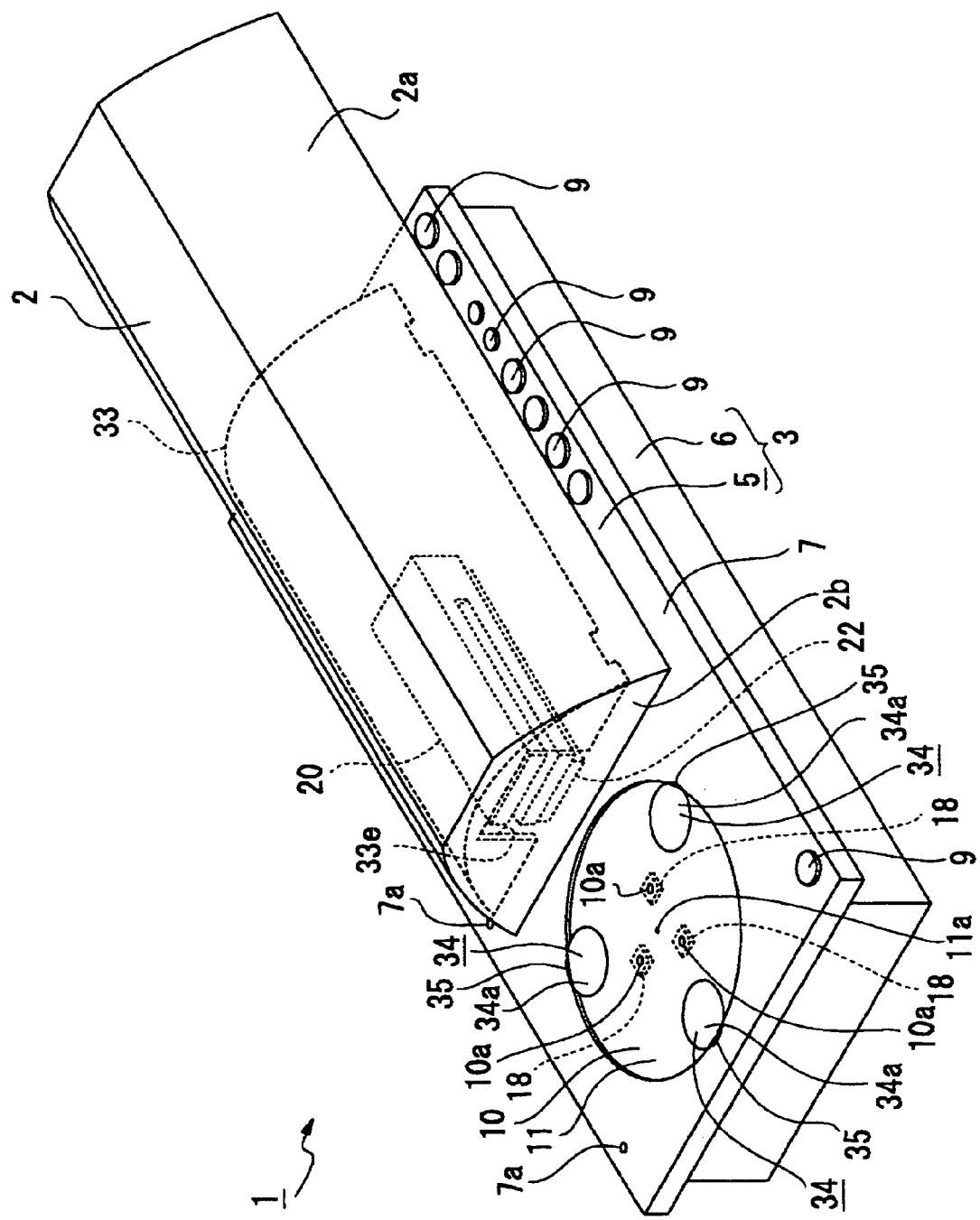
FIG. 19 is a perspective view showing a state in which a cover is moved to an open position.
Figure 20:
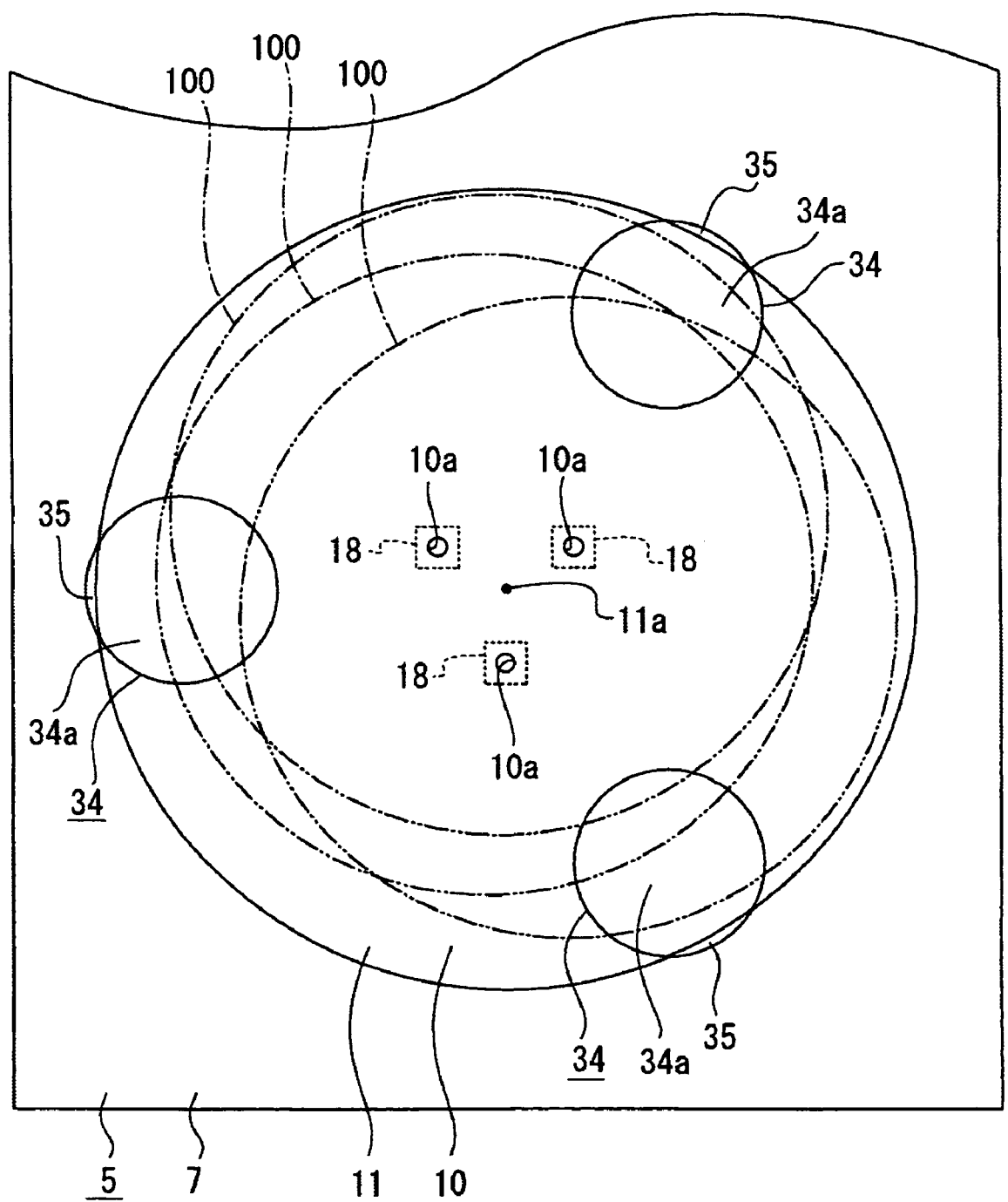
FIG. 20 is a schematic plan view showing a position at which a disc-shaped recording medium can be placed on a disc placing surface.

In a state in which the power source button is operated and the electric conductivity is established, when the open button is operated, the cover 2 is moved by the cover driving section 28, and the cover 2 is moved up to the open position at which the recording medium placing section 10 is opened (refer to FIG. 19).

In a state in which the cover 2 is moved to the open position, the disc-shaped recording medium 100 is placed at any position on the disc placing surface 11 (refer to FIG. 20) and the close button is operated.

In the recording medium driving apparatus 1, as described later, the disc centering sections 35, 35, 35 of the rotation bodies 34, 34, 34 are moved towards the centering position and brought into contact with the outer circumferential edge of the disc-shaped recording medium 100 placed on the disc placing surface 11 to then carry out the centering. Thus, the disc-shaped recording medium 100 can be placed at any position on the disc placing surface 11. Hence, the user's treatment of the disc-shaped recording medium 100 is easy.

When the disc-shaped recording medium 100 is placed on the disc placing surface 11, the existence of the disc-shaped recording medium 100 is detected by the detecting sensors 18, 18, 18.

Figure 21:
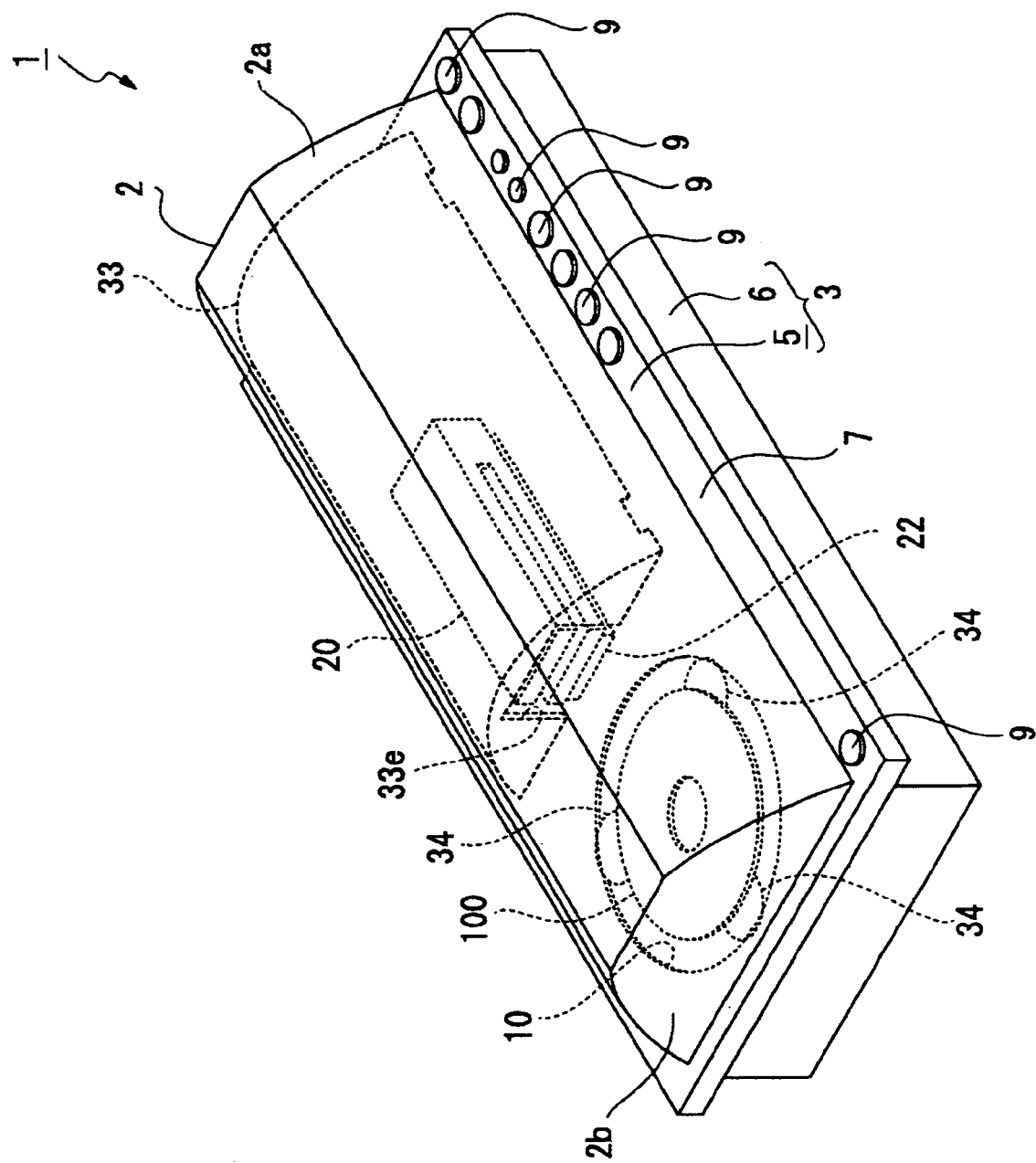
FIG. 21 is a perspective view showing a state in which a cover is moved to a close position when a disc-shaped recording medium is placed on a disc placing surface.

When the close button is operated, the cover 2 is moved up to the close position by the cover driving section 28, and the recording medium placing section 10 is closed (refer to FIG. 21). The recording medium placing section 10 is formed as being shallow recessed portion, as mentioned above. Thus, the disc-shaped recording medium 100 is not upwardly protruded from the upper surface of the base panel 5. When the cover 2 is moved towards the close position, it is not brought into contact with the disc-shaped recording medium 100 placed on the disc placing surface 11.

Next, when the play button is operated, the operating motor is started, and the centering operation of the disc-shaped recording medium 100 through the rotation bodies 34, 34, 34 is started. In this way, after the operation of the close button, when the play button is operated, the centering operation may be started. However, when the cover 2 is located at the open position, by operating the play button, the movement to the close position from the open position of the cover 2 and the centering operation through the rotation bodies 34, 34, 34 may be continuously done.

When the centering operation is started, the cam member 40 is rotated in an R1 direction shown in FIG. 17.

When the cam member 40 is rotated in the R1 direction shown in FIG. 17, the protrusion pieces 43, 43, 43 are brought into sliding contact with the second Geneva surfaces 38, 38, 38 of the rotation bodies 34, 34, 34, respectively, and the rotation bodies 34, 34, 34 are not rotated. The first pressing sections 42a, 42a, 42a of the cam member 40 are made closer to the rotation bodies 34, 34, 34.

Figure 22:
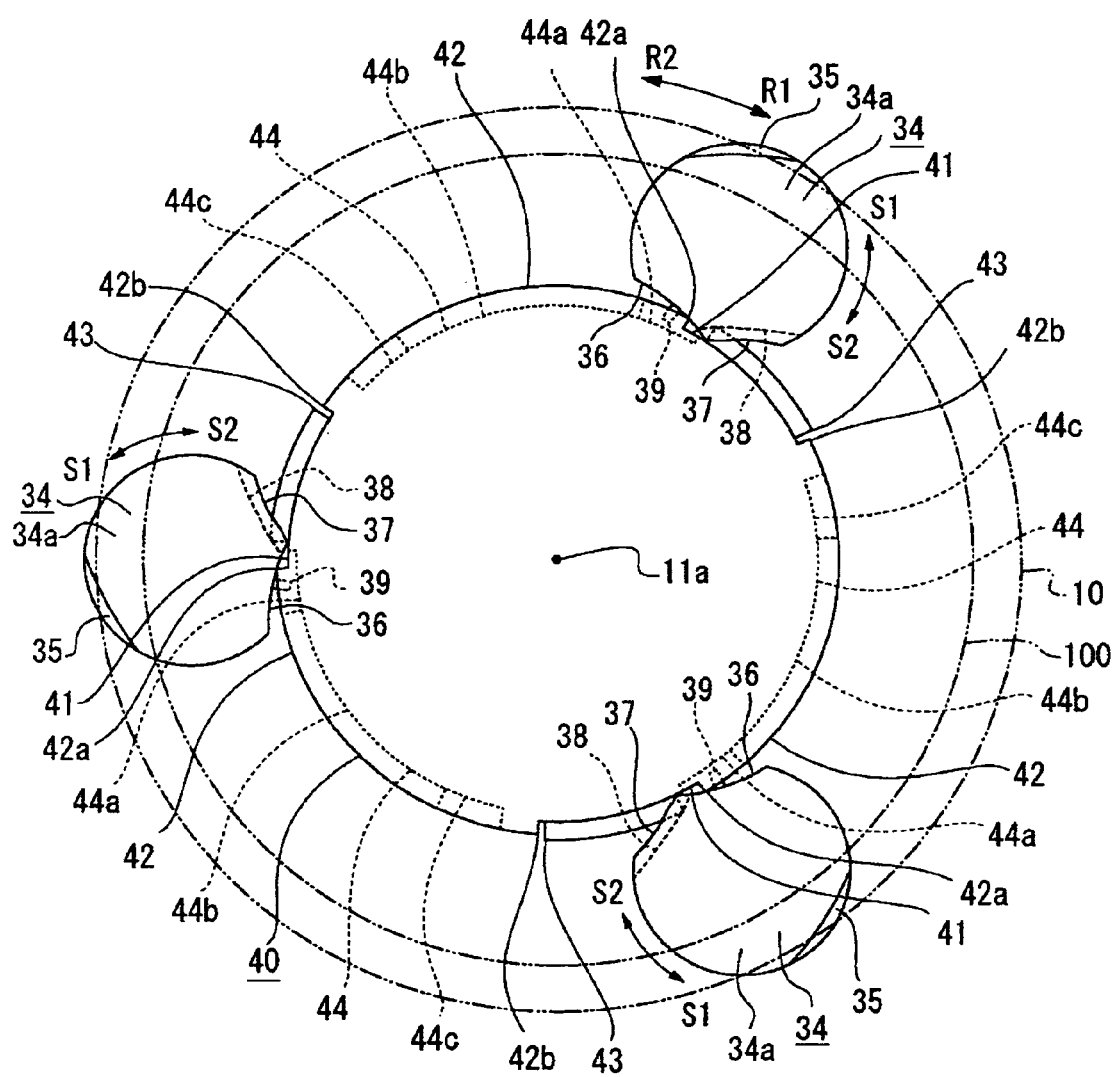
FIG. 22 is a plan view showing a state immediately after a centering operation is started.
Figure 23:
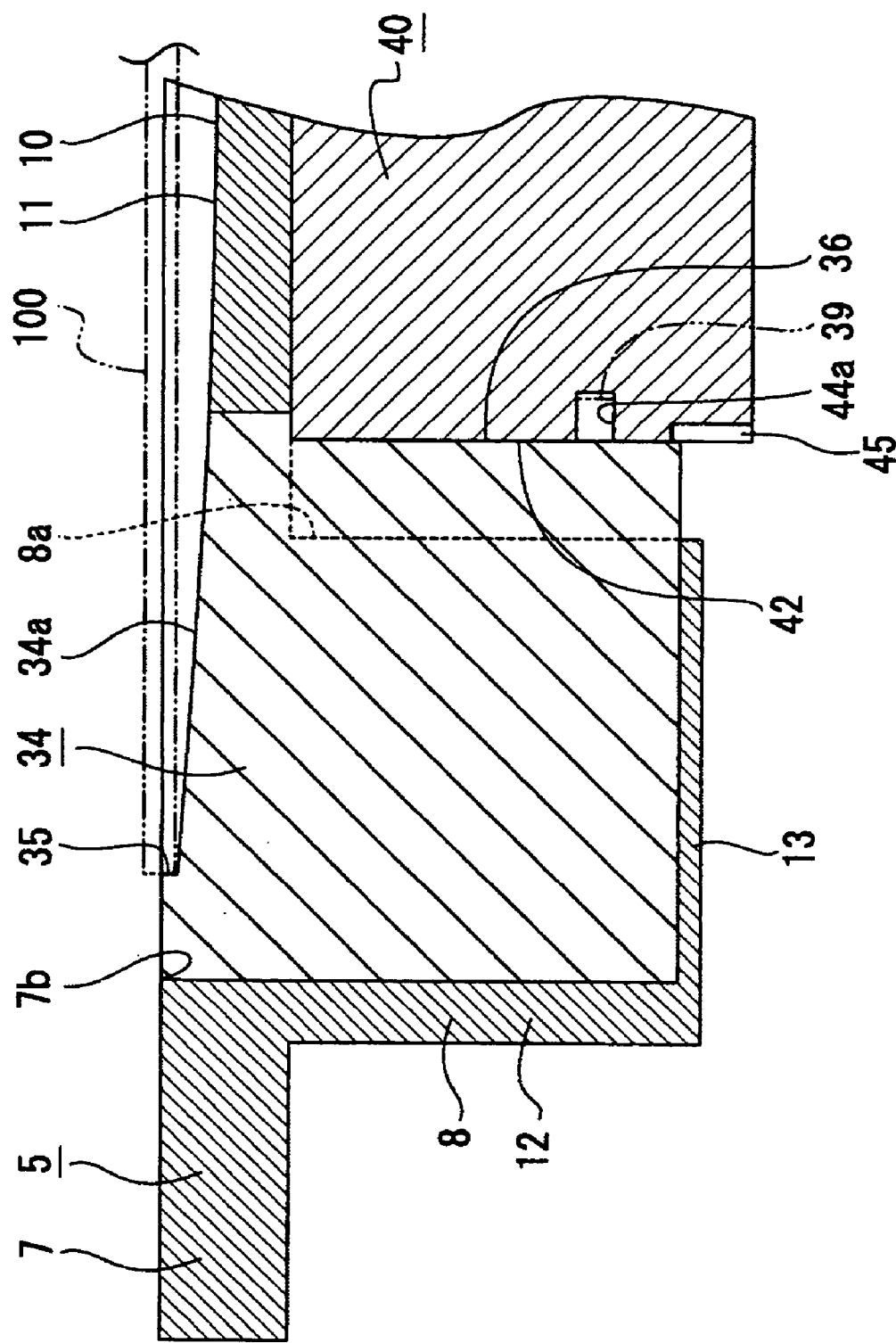
FIG. 23 is an enlarged sectional view showing a state in which a centering operation is started and a sliding pin of a disc centering member is inserted into a lower horizontal section of a cam groove of a cam member.

The rotation of the cam member 40 causes the first pressing sections 42a, 42a, 42a to press the first Geneva surfaces 36, 36, 36 of the rotation bodies 34, 34, 34 (refer to FIG. 22), and the rotation bodies 34, 34, 34 are rotated in an S1 direction shown in FIG. 22. When the rotation bodies 34, 34, 34 are rotated in the S1 direction, the sliding pins 39, 39, 39 of the rotation bodies 34, 34, 34 are inserted into the lower horizontal sections 44a, 44a, 44a of the cam grooves 44, 44, 44 of the cam member 40, respectively (refer to FIG. 23).

Due to the rotation in the S1 direction of the rotation bodies 34, 34, 34, the disc centering sections 35, 35, 35 are rotated towards the centering position at which the disc-shaped recording medium 100 is centered. The disc-shaped recording medium 100 is pressed and moved to the disc centering sections 35, 35, 35 in such a way that the center is brought into coincidence with the standard point 1a (refer to FIG. 22).

Figure 24:
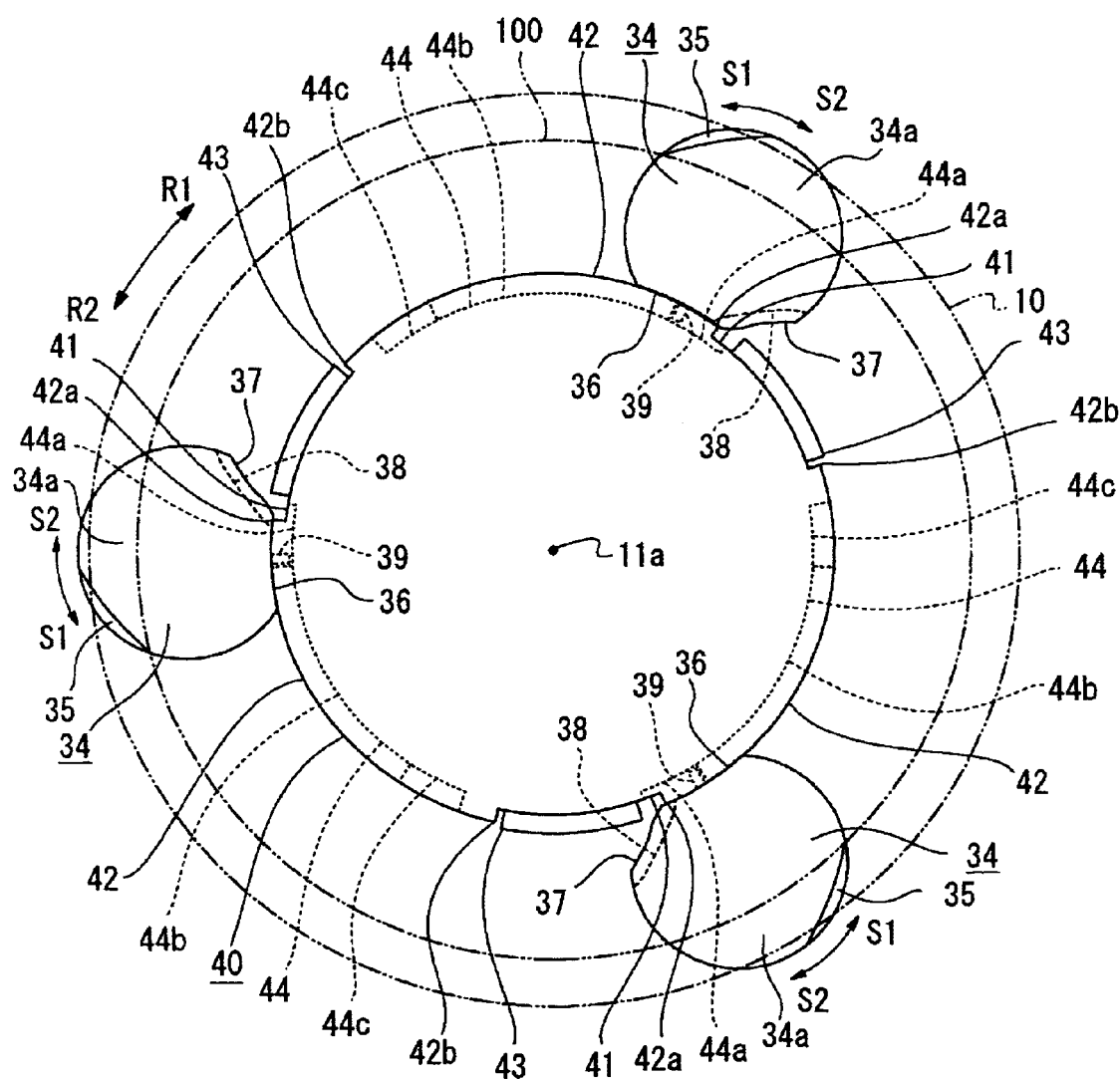
FIG. 24 is a plan view showing a state in which a centering of a disc-shaped recording medium is completed.

When the central shaft of the disc-shaped recording medium 100 is brought into contact with the standard point 11a, the centering of the disc-shaped recording medium 100 is completed (Refer to FIG. 24).

Figure 25:
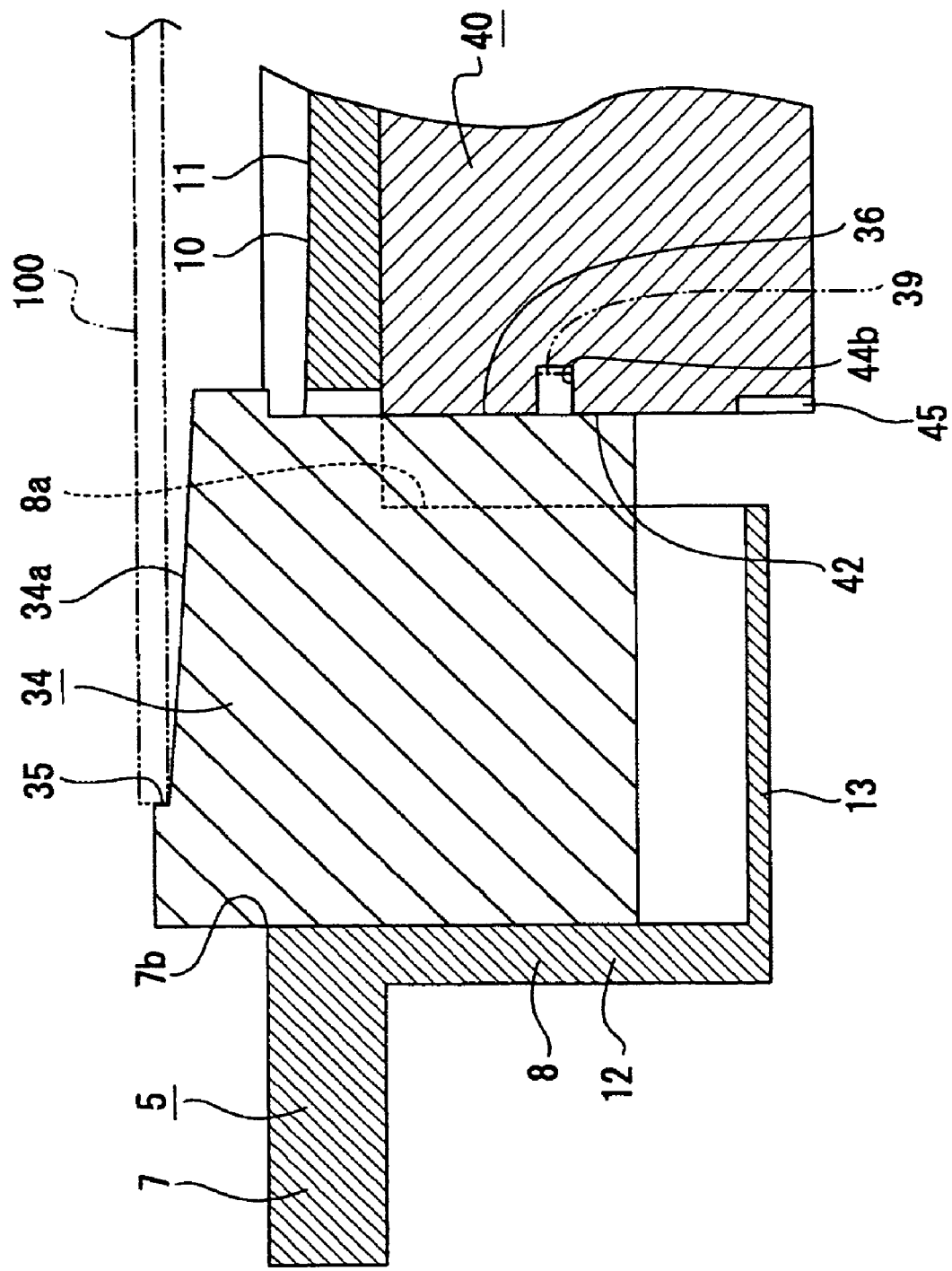
FIG. 25 is an enlarged sectional view showing a state in which a sliding pin is inserted into an inclination section of a cam groove and a disc-shaped recording medium is lifted up by a disc centering member.
Figure 26:
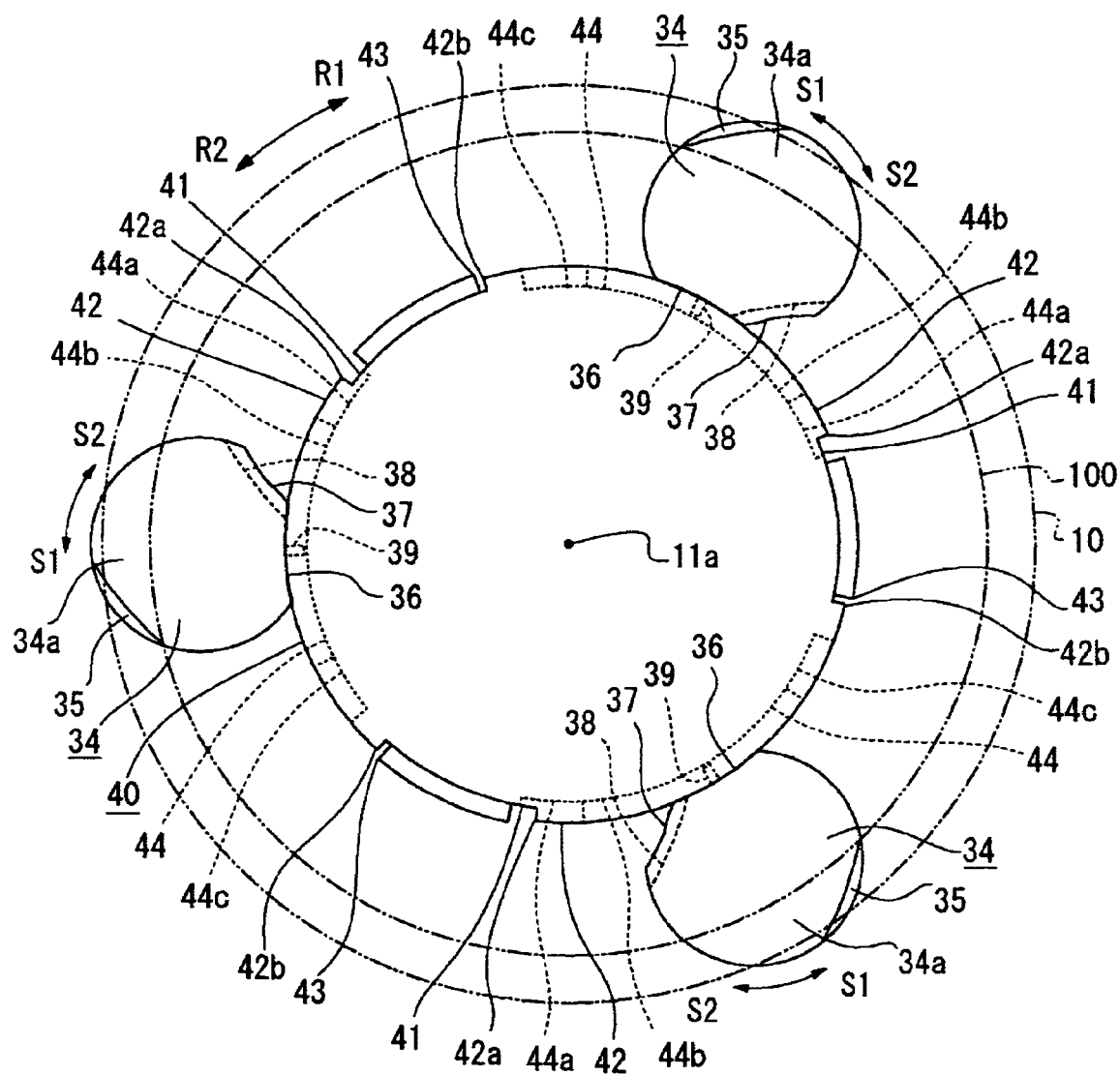
FIG. 26 is a plan view showing a state in which a rotation of a disc centering member is regulated when the disc-shaped recording medium is lifted up by the disc centering member.

When the cam member 40 is rotated in succession, the sliding pins 39, 39, 39 of the rotation bodies 34, 34, 34 are relatively moved from the lower horizontal sections 44a, 44a, 44a of the cam grooves 44, 44, 44 to the inclination sections 44b, 44b, 44b (Refer to FIG. 25). Thus, the rotation bodies 34, 34, 34 are moved upward and upwardly protruded from the disc placing surface 11, and the disc-shaped recording medium 100 is lifted up. At this time, as for the rotation bodies 34, 34, 34, as shown in FIG. 26, since the first Geneva surfaces 36, 36, 36 are in sliding contact with the outer circumferential sections 42, 42, 42 of the cam member 40, respectively, the rotation bodies 34, 34, 34 are not rotated.

Figure 27:
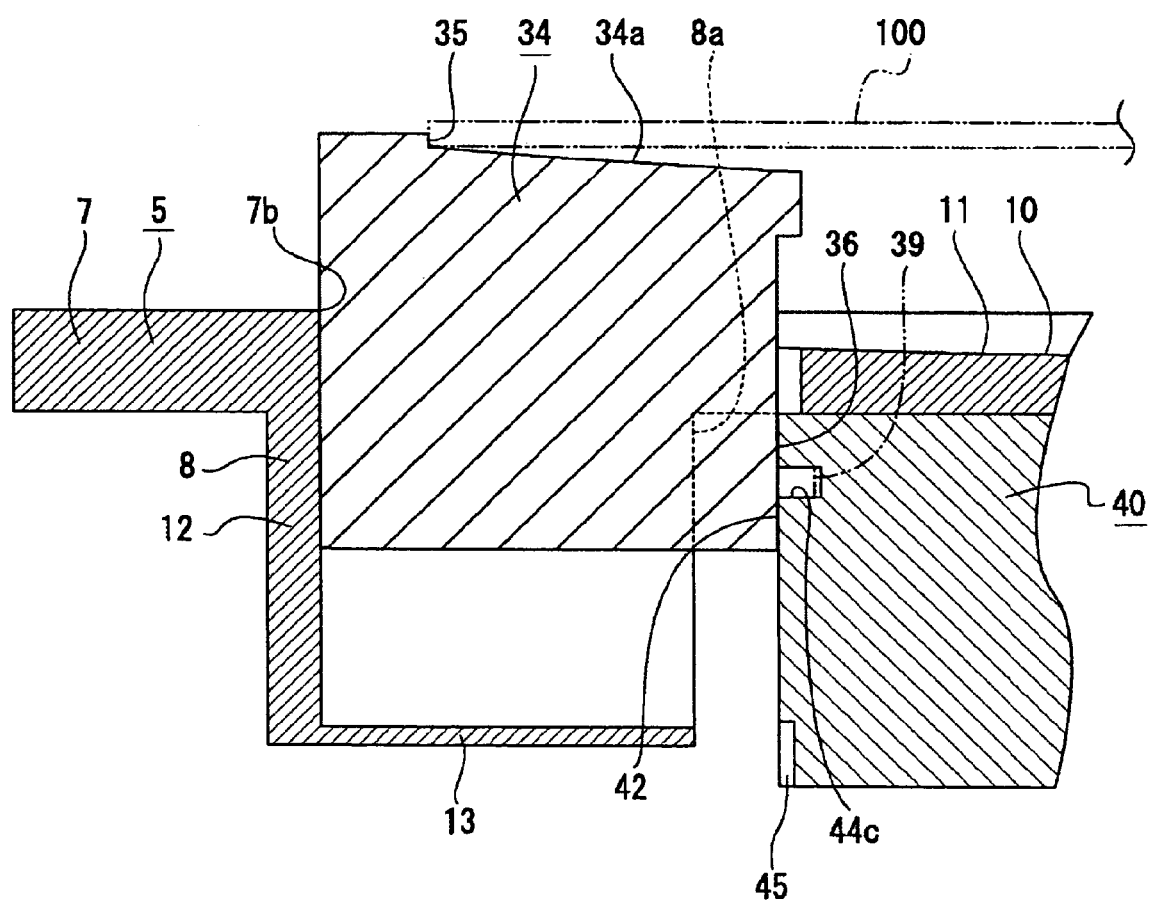
FIG. 27 is an enlarged sectional view showing a state in which a sliding pin is inserted into an upper horizontal section of a cam groove and a disc-shaped recording medium is lifted up to a chucking position.
Figure 28:
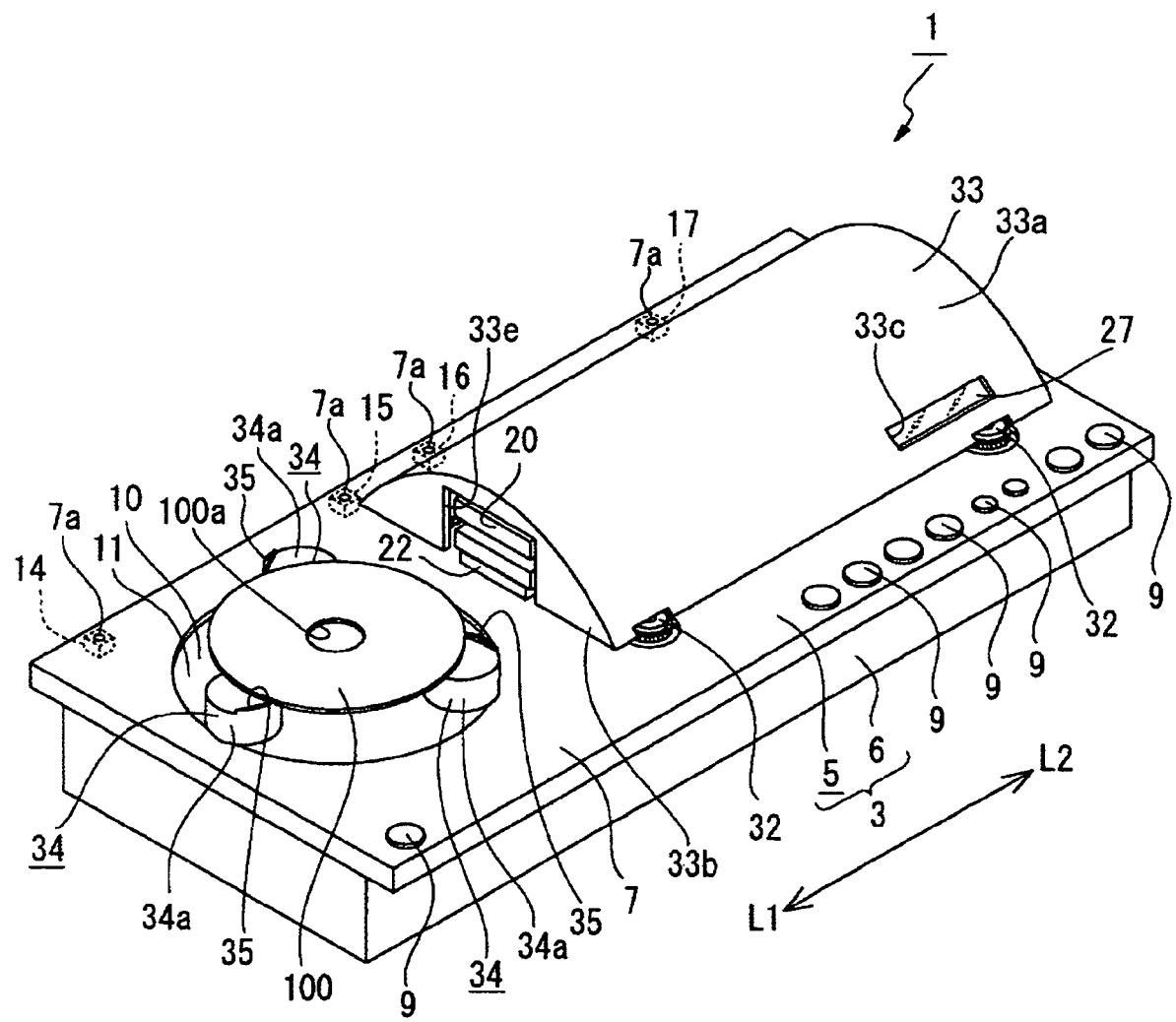
FIG. 28 is a perspective view showing a state in which a centering of a disc-shaped recording medium is completed, in which a cover is removed.

When the cam member 40 is rotated in succession and the sliding pins 39, 39, 39 of the rotation bodies 34, 34, 34 are relatively moved from the inclination sections 44b, 44b, 44b of cam grooves 44, 44, 44 up to the upper horizontal sections 44c, 44c, 44c, respectively, the rotation bodies 34, 34, 34 are moved up to the movement end on the upper side, and the disc-shaped recording medium 100 arrives at the centering position (Refer to FIG. 27 and FIG. 28). When the sliding pins 39, 39, 39 of the rotation bodies 34, 34, 34 are relatively moved up to the upper horizontal sections 44c, 44c, 44c, respectively, the rotation of the operating motor is stopped, and the rotation of the cam member 40 is stopped.

In succession, by the unit driving section 23, the base unit 20, the control board 21 and the arranging base 22 are integrally moved to the direction (an L1 direction shown in FIG. 28) approaching the disc-shaped recording medium 100 lifted up by the rotation bodies 34, 34, 34.

Figure 29:
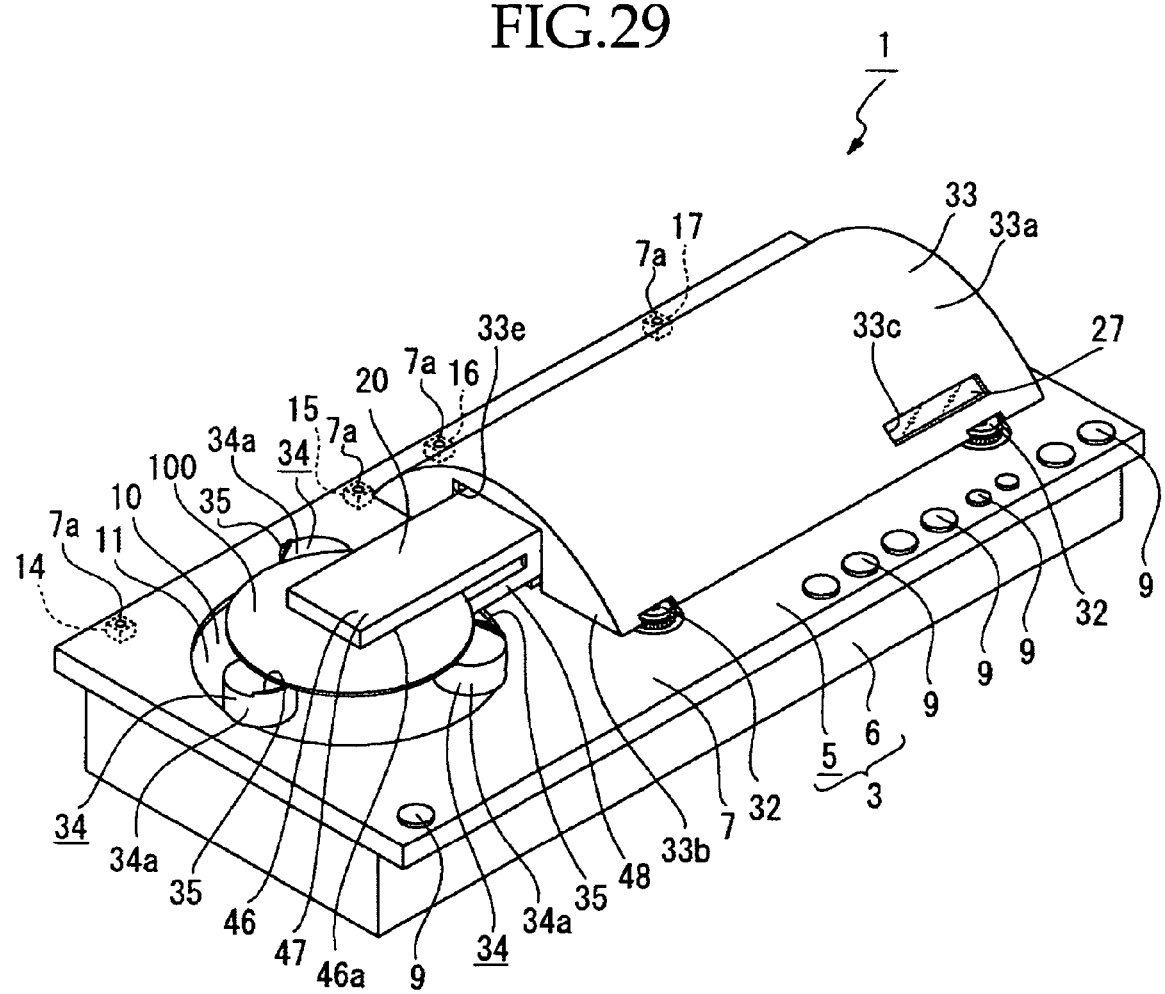
FIG. 29 is a perspective view showing a state in which a centering of a disc-shaped recording medium is completed and a base unit is pulled out from a unit storage section, in which a cover is removed.

When the movement of the base unit 20 causes the disc table 81 and the chucking pulley 71 to be located at the center of the disc-shaped recording medium 100, the movement to the L1 direction of the base unit 20 is stopped (Refer to FIG. 29). At this time, the disc-shaped recording medium 100 is lifted up from the disc placing surface 11 by the rotation bodies 34, 34, 34, and the disc-shaped recording medium 100 is relatively inserted between the chucking pulley 71 and the disc table 81.

When the base unit 20 is moved to the L1 direction, as mentioned above, the support arm 66 is at a state in which its front is slightly up. Thus, the interval between the chucking pulley 71 and the disc table 81 is made wide. Even if slight distortion is induced in the support arm 66 because of its self-weight and the like, without any contact of the chucking pulley 71 with the disc-shaped recording medium 100, the disc-shaped recording medium 100 can be smoothly inserted between the chucking pulley 71 and the disc table 81, thereby improving the reliability of the operation.

When the movement to the L1 direction of the base unit 20 is stopped, in succession, the operating motor is rotated in the direction opposite to the previous case, and the cam member 40 is rotated in an R2 direction shown in FIG. 26. The sliding pins 39, 39, 39 of the rotation bodies 34, 34, 34 are relatively moved from the upper horizontal sections 44c, 44c, 44c of the cam grooves 44, 44, 44 towards the inclination sections 44b, 44b, 44b, and the rotation bodies 34, 34, 34 are lowered while being rotated, and returned back to the initial states. The cam member 40 is also returned back to the initial state when the operating motor is stopped.

When the rotation bodies 34, 34, 34 are lowered, the disc-shaped recording medium 100 is lowered in association with the rotation bodies 34, 34, 34. The centering protrusion 83 of the disc table 81 is inserted into the central shaft 100a, and the inner circumferential edge of the disc-shaped recording medium 100 is brought into contact with the centering inclination surface 83c. Thus, the rotation bodies 34, 34, 34 are separated in downward direction from the disc-shaped recording medium 100.

When the rotation bodies 34, 34, 34 are separated in downward direction from the disc-shaped recording medium 100 and returned back to the initial state, the lifting motor 77 of the driving unit 76 attached to the guide member 55 is rotated. When the lifting motor 77 is rotated, the rack member 65 engaged with the driving gear 75 is sent forward, and the cam slider 60 is slid forward.

Figure 30:
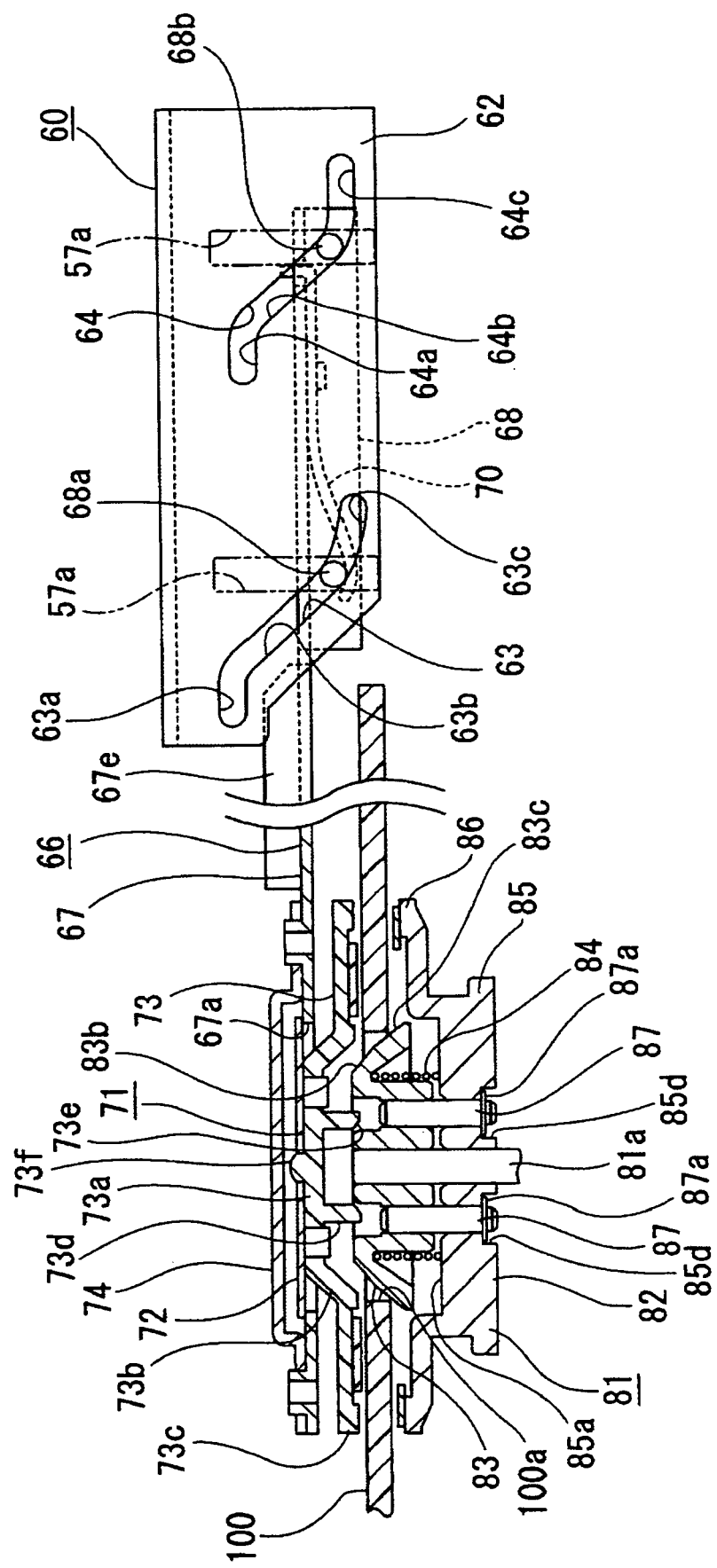
FIG. 30 is a side view showing a halfway state in which a chucking operation is being performed, in which the part thereof is illustrated as a cross-section.

When the cam slider 60 is slid forward, the supported shafts 68a, 68a, 68b, 68b of the support arm 66 are relatively moved inside the front cam holes 63, 63 and rear cam holes 64, 64 of the cam slider 60 and the guide holes 57a, 57a of the guide member 55. As shown in FIG. 30, the supported shafts 68a, 68a, 68b, 68b are moved from the horizontal sections 63a, 63a of the front cam holes 63, 63 inside the inclination sections 63b, 63b and from the horizontal sections 64a, 64a of the rear cam holes 64, 64 inside the inclination sections 64b, 64b, and moved downward inside the guide holes 57a, 57a. Thus, the cam slider 60 is guided to the guide holes 57a, 57a and moved downward, and the chucking pulley 71 supported by the cam slider 60 is moved to the direction approaching the disc-shaped recording medium 100.

Figure 31:
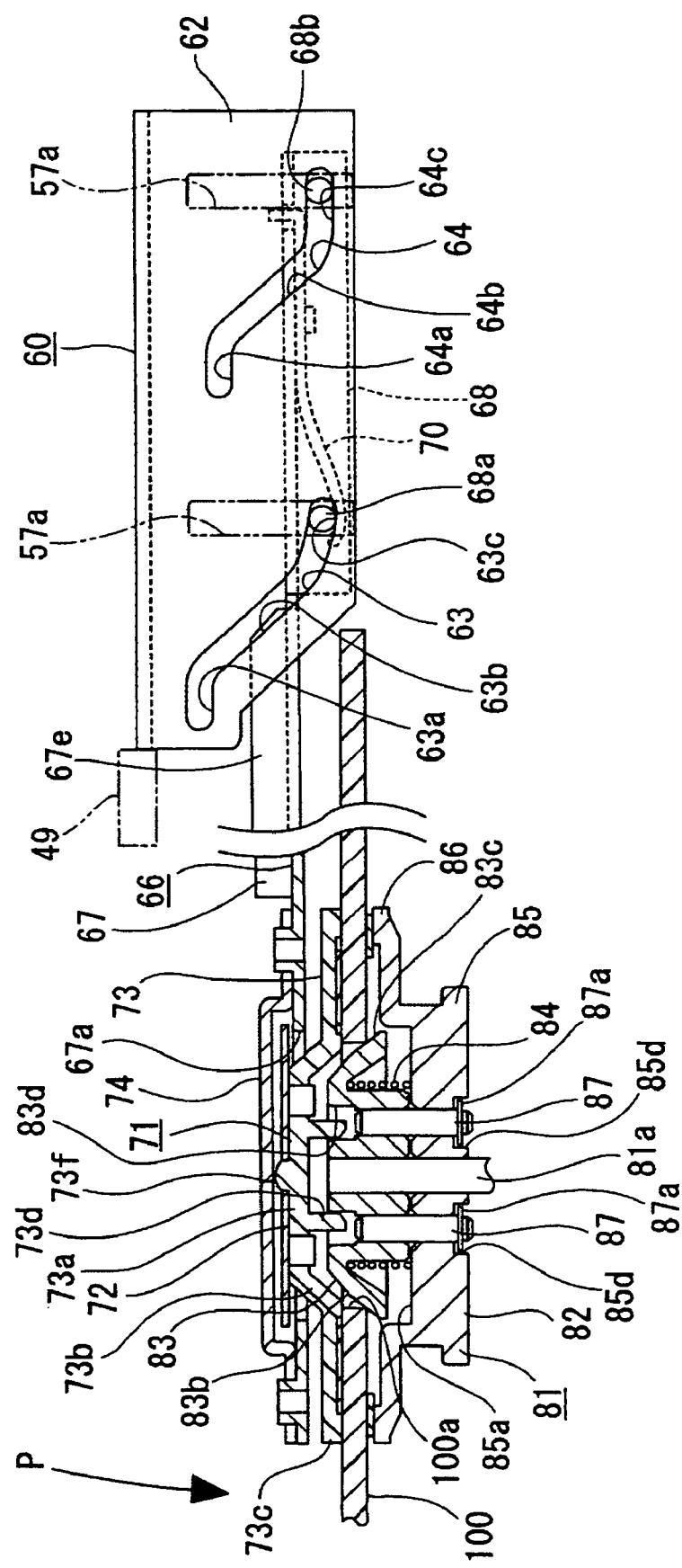
FIG. 31 is a side view showing a state in which a chucking operation is completed, in which the part thereof is illustrated as a cross-section.

When the cam slider 60 is further moved forward, as shown in FIG. 31, the supported shafts 68a, 68a, 68b, 68b are moved from the inclination sections 63b, 63b of the front cam holes 63, 63 inside the acting sections 63c, 63c and from the inclination sections 64b, 64b of the rear cam holes 64, 64 inside the acting sections 64c, 64c, and moved further downward inside the guide holes 57a, 57a. Thus, the support arm 66 is moved further downward, the chucking pulley 71 is lowered, and the disc-shaped recording medium 100 is pressed downward by the pressing section 73c. The disc-shaped recording medium 100 and the centering protrusion 83 are integrally and moved downward against the force of the forcing spring 84.

When the support arm 66 is further moved downward, the supported shafts 68a, 68a are moved inside the acting sections 63c, 63c whose rears are slightly inclined downward, and the supported shafts 68b, 68b are moved inside the horizontal acting sections 64c, 64c. Thus, the support arm 66 is rotated at a low speed in a P-direction shown in FIG. 31 with the supported shafts 68b, 68b as fulcrums, namely, in a direction in which the chucking pulley 71 approaches the disc-shaped recording medium 100. Since the support arm 66 is rotated with the supported shafts 68b, 68b as the fulcrums, the chucking pulley 71 is pressed and fitted to the disc-shaped recording medium 100 pushed against the placing section 86 of the disc table 81, and the inner circumferential section of the disc-shaped recording medium 100 is put between the disc table 81 and the chucking pulley 71, and the disc-shaped recording medium 100 is chucked. In a state in which the disc-shaped recording medium 100 is chucked, the pivot protrusion 73f of the chucking pulley 71 is in contact with the lower surface of the pressing plate 74, and the chucking pulley 71 is pressed by the pressing plate 74.

As mentioned above, when the disc-shaped recording medium 100 is chucked, the support arm 66 is rotated at the low speed. Thus, it is possible to improve the silent sound property when the chucking pulley 71 is pressed and fitted to the disc-shaped recording medium 100, and also possible to prevent the scratch, damage and deformation of the disc-shaped recording medium 100 caused by the contact of the chucking pulley 71.

Also, the acting sections 63c, 63c of the front cam holes 63, 63 are inclined. Thus, it is enough that the driving force of the lifting motor 77 to move the supported shafts 68a, 68a of the support arm 66 inside the acting sections 63c, 63c is small. Hence, the smooth operation of the recording medium driving apparatus 1 may be secured.

When the disc-shaped recording medium 100 is chucked, the cam slider 60 is located at the movement end on the front side in the movement range. The first detection switch 49 attached to the upper case 47 is operated by the front end of the flat plate section 61 of the cam slider 60 (Refer to FIG. 31). Thus, the first detection switch 49 detects the fact that the cam slider 60 is located at the movement end on the front side in the movement range, and the rotation of the lifting motor 77 is stopped.

When the chucking of the disc-shaped recording medium 100 is completed, the spindle motor 50 is rotated. In association with the rotation of the spindle motor 50, the disc table 81, the disc-shaped recording medium 100 and the chucking pulley 71 are integrally rotated. Also, the driving of the optical pickup 51, for example, leads to the reproduction of the information signal from the disc-shaped recording medium 100. The chucking pulley 71 is rotated in a state in which the pivot protrusion 73f is in contact with the lower surface of the pressing plate 74.

When the reproduction of the information signal from the disc-shaped recording medium 100 is ended, the lifting motor 77 is rotated in the direction opposite to the previous case. The cam slider 60 is backwardly moved, and the support arm 66 is moved upward. Thus, the chucking of the disc-shaped recording medium 100 through the chucking pulley 71 and the disc table 81 is released. When the chucking of the disc-shaped recording medium 100 is released, the disc-shaped recording medium 100 becomes in a state in which it is placed on the disc table 81.

From the backward movement of the cam slider 60, the fact that the second detection switch 58 is operated by the back end surface of the flat plate section 61 and the cam slider 60 is located at the movement end on the rear side in the movement range is detected. Thus, the lifting motor 77 is stopped, and the cam slider 60 and the support arm 66 are returned back to the initial states.

In succession, the operating motor is rotated, the cam member 40 is rotated in the R1 direction, the sliding pins 39, 39, 39 of the rotation bodies 34, 34, 34 are relatively moved from the inclination sections 44b, 44b, 44b of the cam grooves 44, 44, 44 up to the upper horizontal sections 44c, 44c, 44c, and the upper surfaces 34a, 34a, 34a of the rotation bodies 34, 34, 34 are brought into contact with the lower surface of the disc-shaped recording medium 100, and the disc-shaped recording medium 100 is lifted up, and then, the disc centering sections 35, 35, 35 are brought into contact with the outer circumferential line of the disc-shaped recording medium 100. Thus, the disc-shaped recording medium 100 is lifted upward from the disc table 81. When the upper surfaces 34a, 34a, 34a of the rotation bodies 34, 34, 34 are brought into contact with the lower surface of the disc-shaped recording medium 100, the disc-shaped recording medium 100 is lifted up, and the disc centering sections 35, 35, 35 are brought into contact with the outer circumferential edge of the disc-shaped recording medium 100, the rotation of operating motor is stopped, and the rotation of the cam member 40 is stopped.

When the disc-shaped recording medium 100 is lifted up by the rotation bodies 34, 34, 34, the base unit 20, the control board 21 and the arranging base 22 are integrally moved to the L2 direction shown in FIG. 28 by the unit driving section 23, and the base unit 20 is stored in the unit storage section 19a.

When the base unit 20 is backwardly moved and stored in the unit storage section 19a, the disc-shaped recording medium 100 is already lifted up by the rotation bodies 34, 34, 34. By operating the open button and moving the cover 2 to the open position, the user can grasp the disc-shaped recording medium 100 and take out from the recording medium driving apparatus 1.

When the disc-shaped recording medium 100 is taken out from the recording medium driving apparatus 1, the fact that the disc-shaped recording medium 100 does not exist is detected by the detection sensors 18, 18, 18.

When the fact that the disc-shaped recording medium 100 does not exist is detected by the detection sensors 18, 18, 18, the operating motor is rotated, and the cam member 40 is rotated in the R2 direction. The rotation bodies 34, 34, 34 are moved downward and returned back to the initial state.

In the above-mentioned description, the example is explained in which the disc-shaped recording medium 100 is taken out from the recording medium driving apparatus 1 immediately after the backward movement of the base unit 20. However, instead of this, for example, following the backward movement of the base unit 20, the rotation bodies 34, 34, 34 may be moved downward, and the disc-shaped recording medium 100 may be once placed on the disc placing surface 11.

In this case, it is enough that the disc-shaped recording medium 100 is again lifted up by the rotation bodies 34, 34, 34 and stopped at a predetermined position, and certain space is consequently formed between the disc-shaped recording medium 100 and the disc placing surface 11 of the base panel 5, and the user can easily take out the disc-shaped recording medium 100.

The operation of the cover 2 will be described below. As mentioned above, the cover 2 can be attached to and detached from the base panel 5. For example, the removal of the cover 2 enables the maintenance work to be made easier and enables the cover 2 to be washed.

As mentioned above, since the driving force of the moving motor 29 is transmitted through the deceleration gear groups 30, 30 to the gear bodies 32, 32 located on the left, the cover 2 is moved to the direction (the front-back direction) based on the rotation direction of the moving motor 29 in association with the gear bodies 32, 32.

The moving motor 29 is started and stopped in accordance with the position detection result of the cover 2 from the first sensor 14, second sensor 15, third sensor 16 and fourth sensor 17, which are arranged on the lower surface side of the base panel 5.

As an address to detect the position of the cover 2, as shown in FIG. 32, for example, 11 addresses are set. FIG. 33 shows the detection states of the respective sensors 14, 15, 16 and 17. For example, at an address "CLOSE OVER", the first sensor is set at an ON state, and the second sensor 15, the third sensor 16 and the fourth sensor 17 are set at an OFF state, and an address signal is set at "1000". Thus, in the cover 2, the reflecting section 4b is located above the first sensor 14, and the second non-reflecting section 4c is located above the second sensor 15, the third sensor 16 and the fourth sensor 17.

In FIG. 32, addresses "OPEN NG", "OPEN PWM NG", and "DC NG" are addresses when at the predetermined respective positions, the first sensor 14 is set at the ON state. However, for example, the ON state of the first sensor 14 can be generated when detection light is reflected by a hand, a finger and the like.

Figure 34:
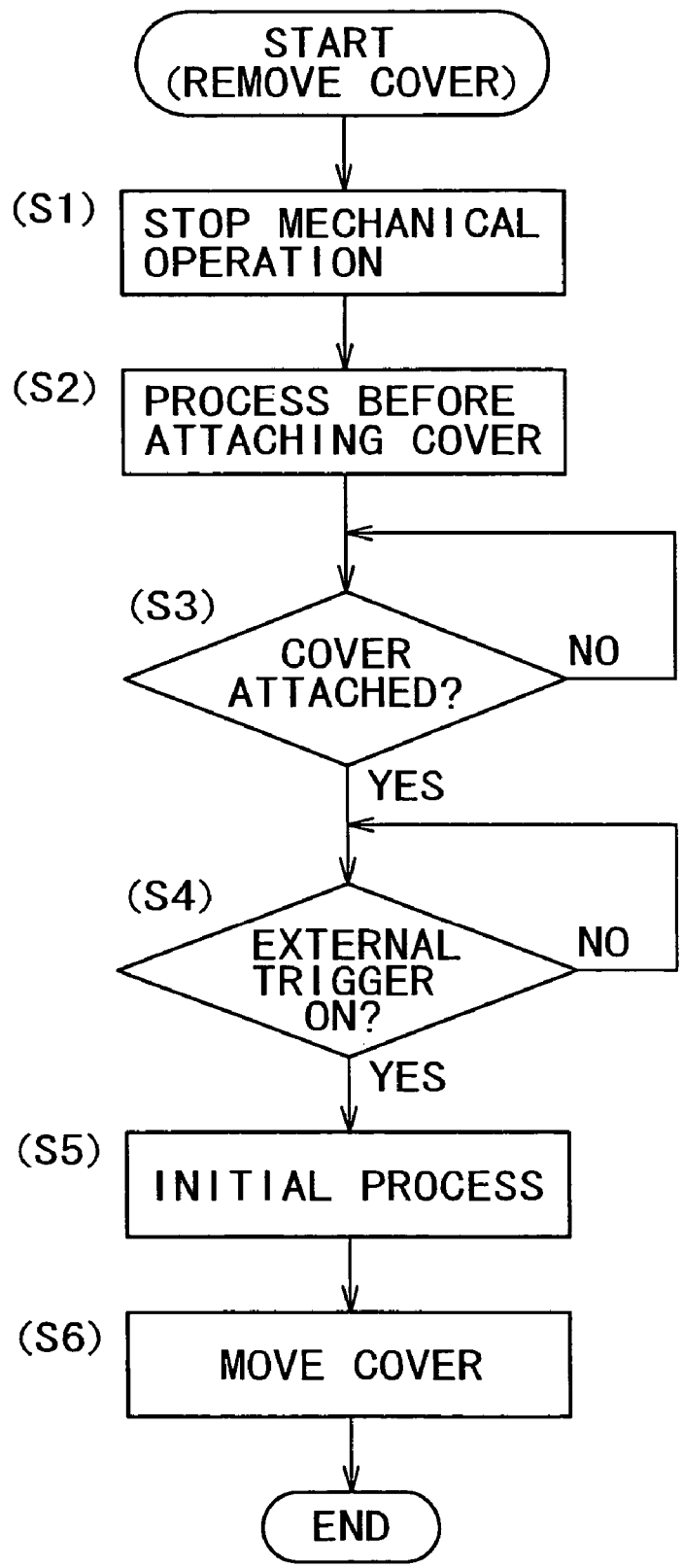
FIG. 34 is a flowchart view showing a flow of operations.

The flow of the operation will be described below in accordance with a flowchart view of FIG. 34.

(S1) When the cover 2 is removed from the base panel 5, the operation is started. The removal of the cover 2 leads to the detection of an address "EMPTY (0000)", which stops the mechanic operation. The stop of the mechanic operation implies, for example, the stop when the driving motor 24, the moving motor 29, the operating motor, the spindle motor 50 and the lifting motor 77 are rotated. When the mechanic operation is stopped, the flow proceeds to (S2).

(S2) The process (pre-process) before the cover 2 is attached to the base panel 5 is executed. The process before the attachment is the process for returning each section back to the above-mentioned initial state. For example, when the disc-shaped recording medium 100 was lifted up by the rotation bodies 34, 34, 34, the operating motor is started to lower the rotation bodies 34, 34, 34 and place the disc-shaped recording medium 100 on the disc placing surface 11. When the disc-shaped recording medium 100 was chucked, the lifting motor 77 is started to release the chucking of the disc-shaped recording medium 100. When the base unit 20 was moved forward, the driving motor 24 is started to store the base unit 20 in the unit storage section 19a. When the pre-process is ended, the flow proceeds to (S3).

(S3) Whether or not the cover 2 is attached to the base panel 5 is detected. The detection of the attached state to the base panel 5 of the cover 2 is done by the first sensor 14, the second sensor 15, the third sensor 16 or the fourth sensor 17. If at least one sensor is set at the ON state, the fact that the cover 2 is attached to the base panel 5 is detected. If the fact that the cover 2 is attached to the base panel 5 is detected, the flow proceeds to (S4). If the fact that the cover 2 is attached to the base panel 5 is not detected, the (S3) is executed continuously.

(S4) Whether or not an external trigger is turned ON is detected. The external trigger is, for example, a timer, the open button, the close button, the play button and the like. In the case of the timer, the timer counts the time from the attachment of the cover 2, and the ON is detected from the elapse of a predetermined time. In the case of the open button, the close button and the play button, the ON is detected from the operations of those respective buttons. Also, as the external trigger, a human body sensing sensor may be used. If the human body sensing sensor is provided in the recording medium driving apparatus 1 and the user attaching the cover 2 goes away from the recording medium driving apparatus 1 by a certain distance, the ON is detected. If the fact that the external trigger is turned ON is detected, the flow proceeds to (S5). If the fact that the external trigger is turned ON is not detected, the (S4) is executed in succession.

(S5) The initial process is performed. The initial process is the process similar to the pre-process at the (S2). Each process at the (S2) can be carried out as the initial process at this (S5). For example, by omitting the pre-process at the (S2), the process similar to the pre-process may be carried out as the initial process at the (S5). In the case of the pre-process, since the cover 2 is removed, there may be a fear that the user touches the respective sections and the respective mechanisms during the pre-process, which may hinders the process. However, in the case of the initial process, the cover 2 is attached. Accordingly, the possibility of user's touching on respective mechanisms becomes small, and thus the possibility of hindering the process becomes small as well. Hence, the content of the pre-process at the (S2) and the content of the initial process at the (S5) can be selectively set. When the initial process is ended, the flow proceeds to (S6).

(S6) The cover 2 is moved. The cover 2, even if any address is detected, for example, is moved to the close position. The movement of the cover 2 is done by rotating the moving motor 29 in one direction, if the address other than "CLOSE OVER" and "CLOSE" is detected, and it is done at a decelerated speed when "CLOSE PWM" is halfway detected. If the address of "CLOSE OVER" is detected, it is done by rotating the moving motor 29 in the other direction. If the cover 2 passes the close position, the moving motor 29 is inverted. Until it can stop at "CLOSE", while the deceleration value is modified, the cover 2 is moved.

In the above-mentioned description, the example is explained in which when the cover 2 is attached to the base panel 5, irrespectively of its attachment position, the cover 2 is always moved to the close position. However, the position to which the cover 2 is moved is not limited to the close position. For example, it may be the open position, or the close position or the other positions other than the open position.

As mentioned above, in the recording medium driving apparatus 1, when the cover 2 is attached to the base panel 5, irrespectively of its attachment position, the cover 2 is moved to the predetermined position. Thus, the user need not take care of the attachment position of the cover 2. The usability of the recording medium driving apparatus 1 can be improved.

Also, when the cover 2 is designed to be moved to the close position or open position irrespectively of the attachment position of the cover 2 to the base panel 5, in the case of the movement to the close position, the cover 2 closes the respective sections, which prevents the respective sections and prevents dust from depositing on the respective sections. In the case of the movement to the open position, the disc-shaped recording medium 100 can be immediately placed on the disc placing surface 11. Thus, the further improvement of the usability of the recording medium driving apparatus 1 can be attained.

Moreover, in the recording medium driving apparatus 1, the first non-reflecting section 4a, the reflecting section 4b and the second non-reflecting section 4c are placed on the detected section 4 of the cover 2, and the attachment position to the base panel 5 of the cover 2 is detected by the first sensor 14, second sensor 15, third sensor 16 and fourth sensor 17 that are the reflection type of the light sensor. Thus, the attachment position of the cover 2 can be surely detected by the simple configuration.

Figure 35:
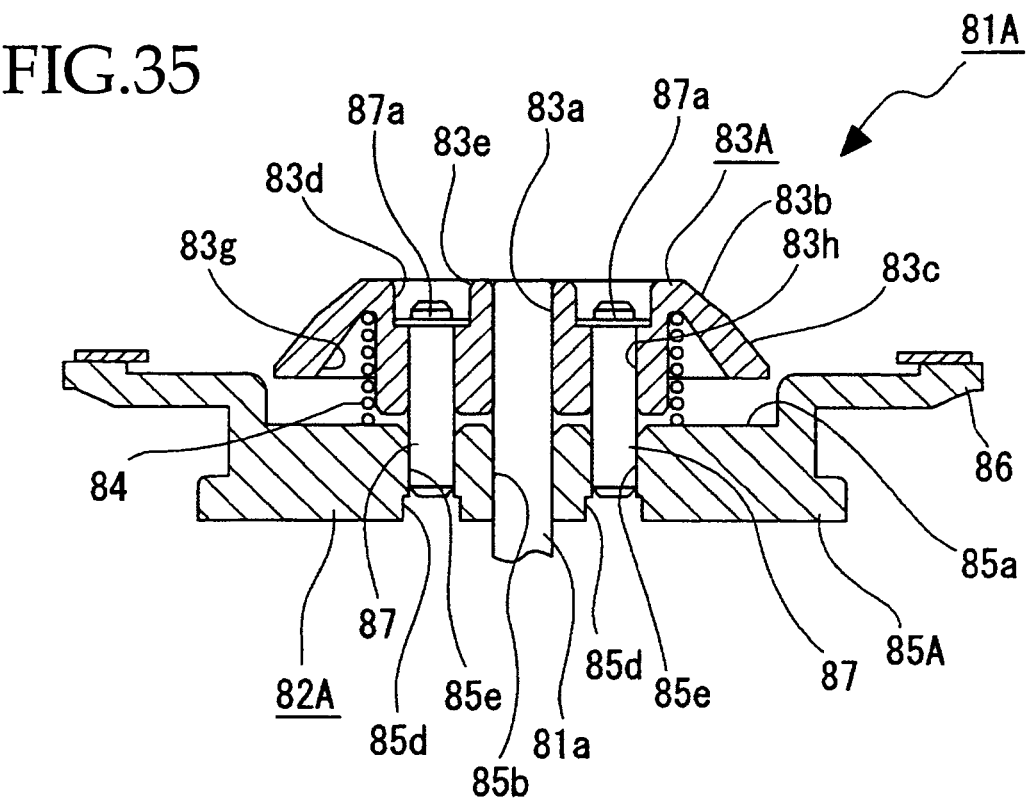
FIG. 35 is an enlarged sectional view showing a first variation example of a disc table.

A first variation example of the disc table will be described below (Refer to FIG. 35). A disc table 81A according to the first variation example which will be described below is different only in that the orientation of the separation-stop shaft is different, as compared with the above-mentioned disc table 81. Thus, as compared with the disc table 81, only the different portions are described in detail. The same symbols as the symbols given to the similar portions in the disc table 81 are given to the other portions, and their explanations are omitted.

The disc table 81A includes a table section 82A, a centering protrusion 83A and the forcing spring 84.

The table section 82A has a base section 85A. On the base section 85A, shaft fixing holes 85e, 85e are formed at the positions on the sides opposite to each other by 180°, respectively, with having the fixing hole 85b in between.

On the centering protrusion 83A, the shaft support holes 83h, 83h are formed at the positions on the sides opposite to each other by 180°, respectively, with having the supported hole 83a in between. The position recessed portion 83d formed on the centering protrusion 83A has the function as the regulation recessed portion.

The separation-stop shafts 87, 87 are inserted into the shaft support holes 83h, 83h of the centering protrusion 83A, respectively, and the portions on the bottom end sides of the separation-stop shafts 87, 87 are inserted into and fixed to the shaft fixing holes 85e, 85e of the disc table 82A. The separation-stop shafts 87, 87 can be slid for the shaft support holes 83h, 83h.

The separation-stop sections 87a, 87a are placed on the top ends of the separation-stop shafts 87, 87, respectively, and the separation-stop sections 87a, 87a are located at the position recessed portion 83d of the centering protrusion 83A. Since the separation-stop sections 87a, 87a are brought into contact with the bottom surface of the position recessed portion 83d, it is possible to prevent the drop from the centering shaft 81a of the centering protrusion 83A pushed upward by the forcing spring 84.

Figure 36:
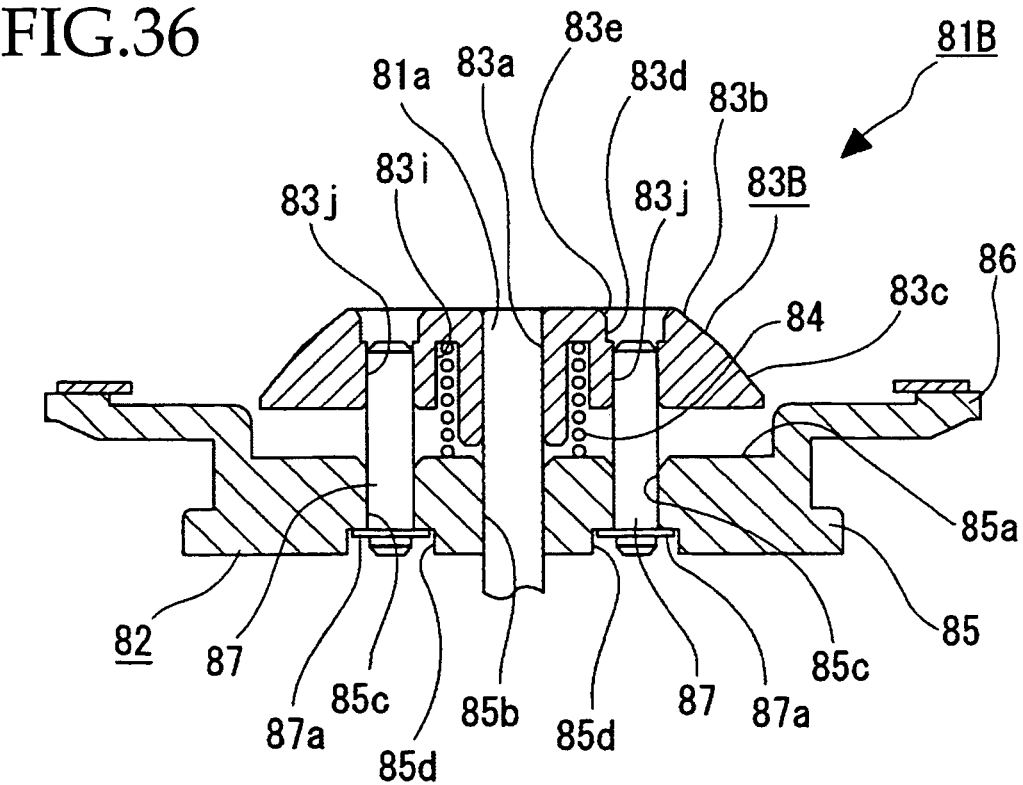
FIG. 36 is an enlarged sectional view showing a second variation example of a disc table.
Figure 37:
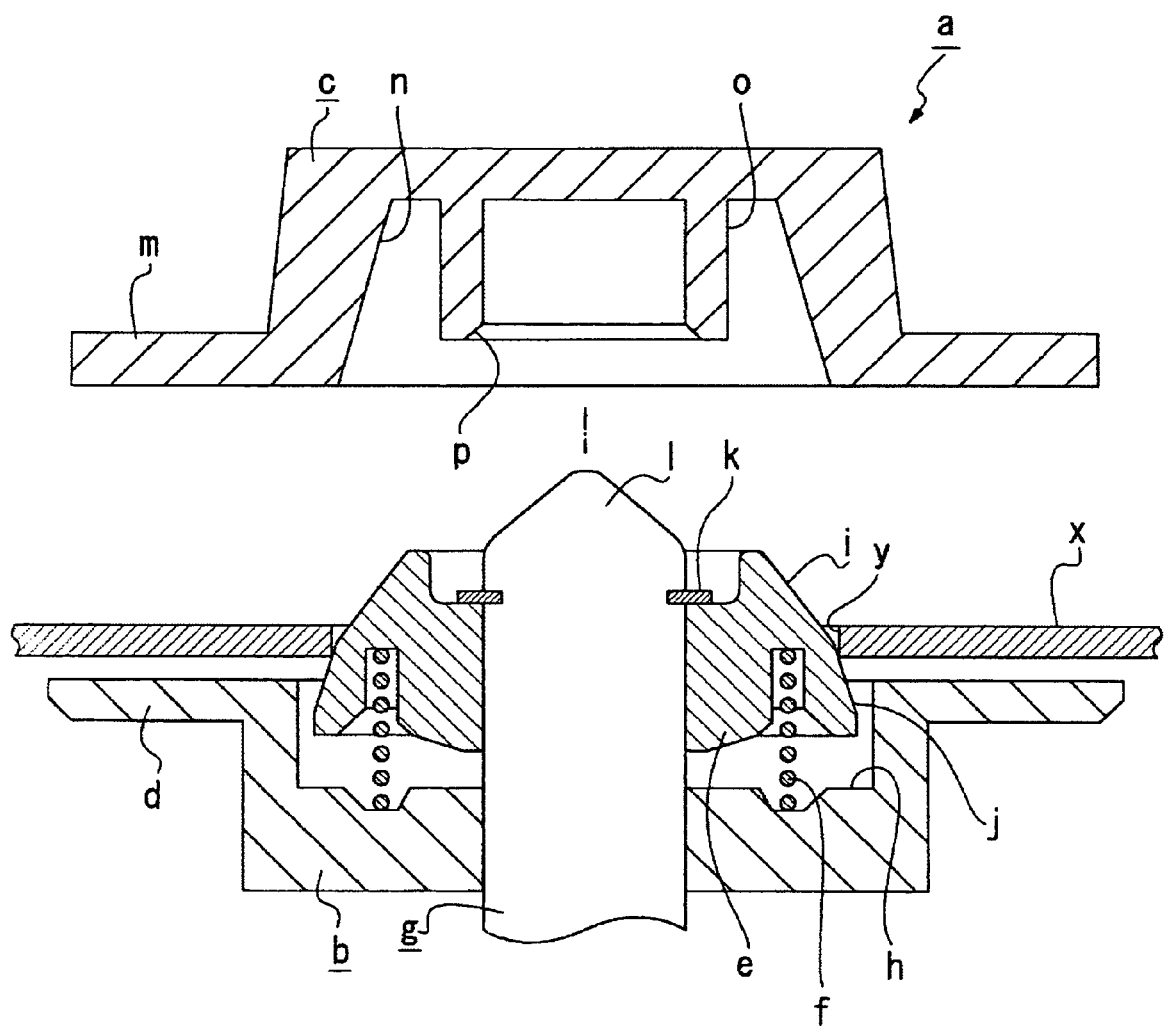
FIG. 37 is an enlarged sectional view showing a state before the disc-shaped recording medium is chucked, and shows, together with FIG. 38, a disc chucking mechanism in related art.
Figure 38:
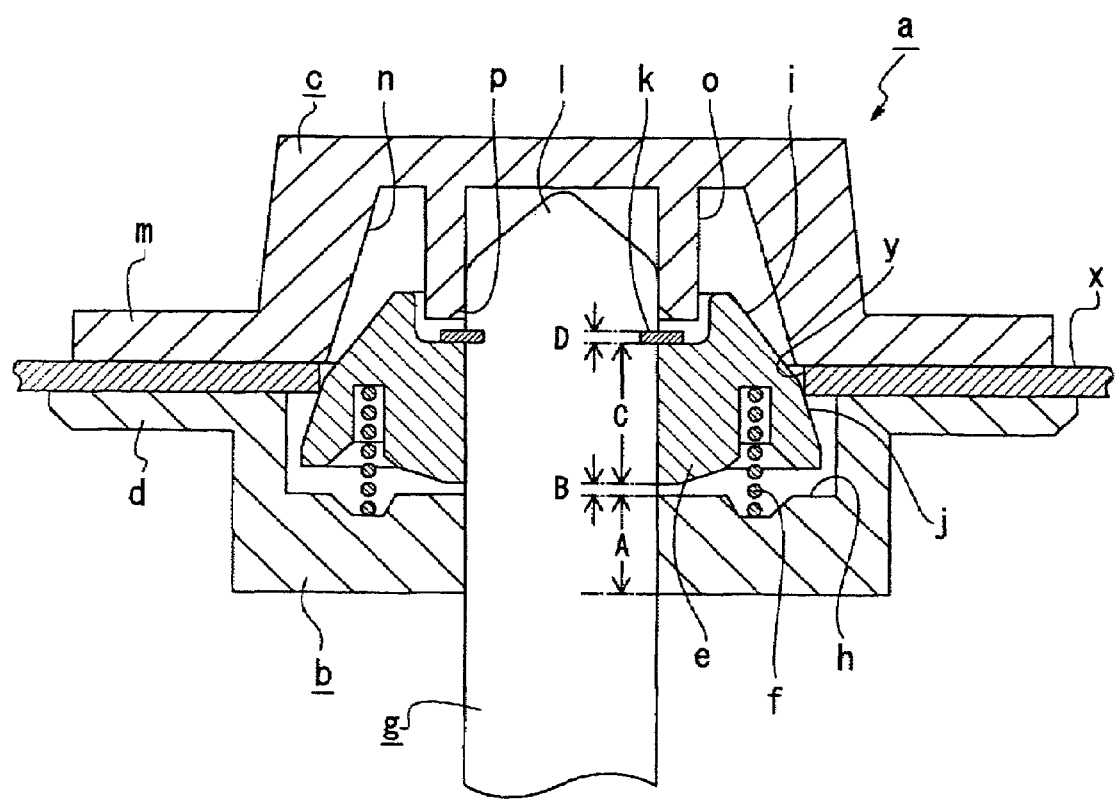
FIG. 38 is an enlarged sectional view showing a state in which a disc-shaped recording medium is chucked.

A second variation example of the disc table will be described below (Refer to FIG. 36). Furthermore, a disc table 81B according to the second variation example which will be described below is different only in that the position relation between the separation-stop shaft and the forcing spring, as compared with the above-mentioned disc table 81. Thus, as compared with the disc table 81, only the different portions are described in detail. The same symbols as the symbols given to the similar portions in the disc table 81 are given to the other portions, and their explanations are omitted.

The disc table 81B includes the table section 82, a centering protrusion 83B and the forcing spring 84.

In the disc table 81B, a spring support recessed portion 83i is formed on the inner circumferential side of the centering protrusion 83B, and shaft fixing holes 83i, 83i are formed on the outer side of the spring support recessed portion 83i, respectively. Thus, the forcing spring 84 is arranged on the inner side of the separation-stop shafts 87, 87.

Furthermore, even in the disc table 81B, similarly to the disc table 81A, the directions of the separation-stop shafts 87, 87 can be arranged such that the up and down directions are opposite.

Even in the disc table 81A according to the first variation example and the disc table 81B according to the second variation example as mentioned above, similarly to the disc table 81, the portion to place the separation-stop section on the central shaft 81a is not required, and the sufficient contact length of the table sections 82A, 82 and centering protrusions 83A, 83B to the central shaft 81a can be maintained, and the stable rotation operation may be secured at the time of rotation of the disc-shaped recording medium 100, and the recording medium driving apparatus 1 can be made thinner.

Also, similarly to the disc table 81, the position recessed portion 83d into which the positioning protrusion 73d of the chucking pulley 71 is inserted is formed on the disc tables 81A, 81B. Thus, the central shaft 81a to position the chucking pulley 71 and the disc tables 81A, 81B need not be upwardly protruded from the disc tables 81A, 81B. Correspondingly thereto, the recording medium driving apparatus 1 can be made thinner.

Moreover, even in the disc tables 81A, 81B, similarly to the disc table 81, the two separation-stop shafts 87, 87 are placed on the sides opposite to each other by 180° with having the central shaft 81a in between. Thus, the excellent balance may be secured at the time of the rotation operation.

In addition, even in the disc tables 81A, 81B, similarly to the disc table 81, the distances between the two separation-stop shafts 87, 87 and the central shaft 81a are made equal. Thus, the further excellent balance may be secured at the time of the rotation operation.

Furthermore, even in the disc tables 81A, 81B, similarly to the case of the disc table 81, three or more separation-stop shafts 87 can be placed.

Any of the shapes and structures of the respective sections described in the above-mentioned embodiments merely describes only one example of the concrete implementations in embodying the present invention. It should not be understood that they result in the limited interpretation of the technical range of the present invention.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A disc chucking mechanism comprising:
   a central shaft which serves as a motor shaft of a spindle motor;
   a table section, which is fixed to the central shaft and on which an inner circumferential section of a disc-shaped recording medium is placed;
   a chucking pulley for sandwiching the internal circumference portion of the disc-shaped recording medium together with the table section;
   a centering protrusion, which is movably supported by the central shaft in the shaft direction and inserted into a central hole of the disc-shaped recording medium, for centering the disc-shaped recording medium;
   a forcing means for forcing the centering protrusion to a direction away from the table section in the shaft direction of the central shaft; and
   a separation-stop shaft having a separation-stop section, which is positioned in such a way that the separation-stop section is substantially parallel to the central shaft, for preventing the centering protrusion from being separated from the central shaft.

2. The disc chucking mechanism according to claim 1, further comprising:
   a positioning protrusion protruding to a side of the table section, the positioning protrusion being formed on the chucking pulley; and
   a position recessed portion into which the positioning protrusion is inserted, the position recessed portion being formed on the centering protrusion.

3. The disc chucking mechanism according to claim 1, wherein:
   a plurality of separation-stop shafts are provided; and
   the plurality of separation-stop shafts are arranged at equal intervals in a direction around the central shaft.

4. The disc chucking mechanism according to claim 3, wherein distances from the central shaft to the plurality of separation-stop shafts are made equal.

5. A disc drive apparatus comprising the disc chucking mechanism of claim 1 and further comprising:
   a reproduction means for reproducing data from the disc-shaped recording medium placed on the table section.

6. The disc drive apparatus according to claim 5, further comprising:
   a positioning protrusion protruding to a side of the table section, the positioning protrusion being formed on the chucking pulley; and
   a position recessed portion into which the positioning protrusion is inserted, the position recessed portion being formed on the centering protrusion.

7. The disc drive apparatus according to claim 5, wherein:
a plurality of separation-stop shafts are provided; and
the plurality of separation-stop shafts are arranged at equal intervals in a direction around the central shaft.

8. The disc drive apparatus according to claim 7, wherein distances from the central shaft to the plurality of separation-stop shafts are made equal.

9. A disc chucking mechanism for chucking a disc-shaped recording medium by sandwiching an internal circumference section of the disc-shaped recording medium with a chucking pulley and a disc table rotating in conjunction with a rotation of a spindle motor, the disc chucking mechanism comprising:
a guiding member formed with at least two guide holes, the guide holes extending in a shaft direction of the disc table and being separated in a radial direction of the disc table;
a cam slider adapted to be slidable in the radial direction of the disc table and formed with cam holes, the number of which being the same as that of the guide holes, the cam holes being separated from each other in the radial direction of the disc table; and
a support arm including a supported shaft, rotatably supporting the chucking pulley and being adapted to be movable in a direction separating the chucking pulley from the disc table, the supported shaft being slidably engaged with a cam hole of the cam slider and a guide hole of the guide member; wherein:
the cam hole of the cam slider is formed with a horizontal section extending the radial direction of the disc table and an inclination section for moving the support arm in the direction separating the chucking pulley from the disc table by guiding the supported shaft if the cam slider is moved in the radial direction of the disc table, the inclination section being continued from an edge section of the horizontal section, the edge section being at a side opposite to a side of the disc table, and
at least the horizontal section of the cam hole that is formed at a most distant position from the disc table is formed at a side closer to the spindle motor in the shaft direction of the disc table in comparison with a horizontal section of another cam hole that is formed at a nearest position to the disc table.

10. The disc chucking mechanism according to claim 9, wherein:
the cam hole of the cam slider is formed with an acting section, the acting section being continued from an edge section of the inclination section, the edge section being opposite to the side of the disc table;
at least the acting section of the cam hole at a most distant position from the disc table is formed so as to be extending in the radial direction of the disc table; and
at least the acting section of the cam hole at a nearest position to the disc table is formed so as to incline to a same side of the inclination section, and an acting section of another cam hole at a most distant position from the disc table is formed with an inclination angle that is less than that of the inclination section.

11. A disc drive apparatus including the disc chucking mechanism of claim 9.

12. The disc drive apparatus according to claim 11, wherein:
the cam hole of the cam slider is formed with an acting section, the acting section being continued from an edge section of the inclination section, the edge section being opposite to the side of the disc table;
at least the acting section of the cam hole at a most distant position from the disc table is formed so as to be extending in the radial direction of the disc table; and
at least the acting section of the cam hole at a nearest position to the disc table is formed so as to incline to a same side of the inclination section, and an acting section of another cam hole at a most distant position from the disc table is formed with an inclination angle that is less than that of the inclination section.

13. A disc chucking mechanism for chucking a disc-shaped recording medium by sandwiching an internal circumference section of the disc-shaped recording medium with a chucking pulley and a disc table rotating in conjunction with a rotation of a spindle motor, the disc chucking mechanism comprising:
a guiding member formed with at least two guide holes, the guide holes extending in a shaft direction of the disc table and being separated in a radial direction of the disc table;
a cam slider adapted to be slidable in the radial direction of the disc table and formed with cam holes, the number of which being the same as that of the guide holes, the cam holes being separated from each other in the radial direction of the disc table; and
a support arm including a supported shaft, rotatably supporting the chucking pulley and being adapted to be movable in a direction separating the chucking pulley from the disc table, the supported shaft being slidably engaged with a cam hole of the cam slider and a guide hole of the guide member; wherein:
the cam hole of the cam slider is formed with an inclination section for moving the support arm in the direction separating the chucking pulley from the disc table by guiding the supported shaft if the cam slider is moved in the radial direction of the disc table and an acting section that is continued from an edge section of the inclination section, the edge section being at a side opposite to a side of the disc table,
at least the acting section of the cam hole at a most distant position from the disc table is formed so as to be extending in the radial direction of the disc table, and
at least the acting section of the cam hole at a nearest position to the disc table is formed so as to incline to a same side of the inclination section, and an acting section of another cam hole at a most distant position from the disc table is formed with an inclination angle that is less than that of the inclination section.

14. The disc chucking mechanism according to claim 13, wherein:
the cam hole of the cam slider is formed with a horizontal section extending the radial direction of the disc table, the horizontal section being continued from an edge section of the inclination section, the edge section being at a side of the disc table; and
at least the horizontal section of the cam hole that is formed at a most distant position from the disc table is formed at a side closer to the spindle motor in the shaft direction of the disc table in comparison with the horizontal section of another cam hole that is formed at a nearest position to the disc table.

15. A disc drive apparatus including the disc chucking mechanism of claim 13.

16. The disc drive apparatus according to claim 15, wherein:
the cam hole of the cam slider is formed with a horizontal section extending the radial direction of the disc table, the horizontal section being continued from an edge section of the inclination section, the edge section being at a side of the disc table; and at least the horizontal section of the cam hole that is formed at a most distant position from the disc table is formed at a side closer to the spindle motor in the shaft direction of the disc table in comparison with the horizontal section of another cam hole that is formed at a nearest position to the disc table.

* * * * *